United States Patent
Theobald et al.

(10) Patent No.: US 11,373,544 B2
(45) Date of Patent: Jun. 28, 2022

(54) INTERACTIVE READING ASSISTANT

(71) Applicant: Apple Inc., Cupertino, CA (US)

(72) Inventors: Barry-John Theobald, Sunnyvale, CA (US); Russell Y. Webb, San Jose, CA (US); Nicholas Elia Apostoloff, San Jose, CA (US)

(73) Assignee: APPLE INC., Cupertino, CA (US)

( * ) Notice: Subject to any disclaimer, the term of this patent is extended or adjusted under 35 U.S.C. 154(b) by 375 days.

(21) Appl. No.: 16/798,820

(22) Filed: Feb. 24, 2020

(65) Prior Publication Data

US 2020/0312183 A1    Oct. 1, 2020

Related U.S. Application Data

(60) Provisional application No. 62/824,158, filed on Mar. 26, 2019.

(51) Int. Cl.
    *G10L 15/22*  (2006.01)
    *G09B 19/00*  (2006.01)
    (Continued)

(52) U.S. Cl.
    CPC ............. *G09B 19/00* (2013.01); *G06F 3/013* (2013.01); *G06F 3/167* (2013.01); *G06T 11/00* (2013.01);
    (Continued)

(58) Field of Classification Search
    CPC ....... G10L 15/22; G10L 15/00; G10L 15/005; G10L 15/01; G10L 15/02; G10L 15/06;
    (Continued)

(56) References Cited

U.S. PATENT DOCUMENTS

| | | | |
|---|---|---|---|
| 9,489,864 | B2 | 11/2016 | Evanini |
| 9,928,754 | B2 | 3/2018 | Yoon et al. |

(Continued)

OTHER PUBLICATIONS

International Preliminary Report on Patentability for corresponding PCT International Appl. No. PCT/US2020/020758, dated Oct. 7, 2021.

(Continued)

*Primary Examiner* — Qi Han
(74) *Attorney, Agent, or Firm* — Fernando & Partners, LLP

(57) ABSTRACT

A method includes displaying a first set of text content characterized by a first difficulty level. The method includes obtaining speech data associated with the first set of text content. The method includes determining linguistic feature (s) within the speech data. The method includes in response to completion of the speech data, determining a reading proficiency value associated with the first set of text content and based on the linguistic feature(s). The method includes in accordance with determining the reading proficiency value satisfies change criteria, changing a difficulty level for a second set of text content. After changing the difficulty level, the second set of text content corresponds to a second difficulty level different from the first difficulty level. The method includes in accordance with determining the reading proficiency value does not satisfy the change criteria, maintaining the second set of text content at the first difficulty level.

20 Claims, 45 Drawing Sheets

(51) Int. Cl.
*G10L 15/02* (2006.01)
*G06F 3/01* (2006.01)
*G06F 3/16* (2006.01)
*G06T 11/00* (2006.01)
*G09B 5/06* (2006.01)
*G10L 25/51* (2013.01)

(52) U.S. Cl.
CPC ............... *G09B 5/06* (2013.01); *G10L 15/02* (2013.01); *G10L 15/22* (2013.01); *G10L 25/51* (2013.01); *G06T 2200/24* (2013.01)

(58) Field of Classification Search
CPC ..... G10L 15/08; G10L 15/18; G10L 15/1815; G10L 15/183; G10L 15/26; G10L 2015/0631–0638; G10L 2015/221–228
USPC .... 704/270.1, 270, 275, 276, 231, 235, 250, 704/255, 257
See application file for complete search history.

(56) References Cited

U.S. PATENT DOCUMENTS

| 2007/0011005 | A1* | 1/2007 | Morrison | G09B 5/06 704/231 |
| 2008/0140401 | A1* | 6/2008 | Abrash | G09B 19/06 704/251 |
| 2011/0066998 | A1* | 3/2011 | Scandura | G09B 7/00 717/100 |
| 2011/0159467 | A1 | 6/2011 | Peot et al. | |
| 2018/0277017 | A1* | 9/2018 | Cheung | G09B 5/06 |

OTHER PUBLICATIONS

"Wonderscope: An Augmented Reality iOS App for Kids", Retrieved from the Internet on Mar. 26, 2020: https://wonderscope.com/index.html, pp. 1-3.

* cited by examiner

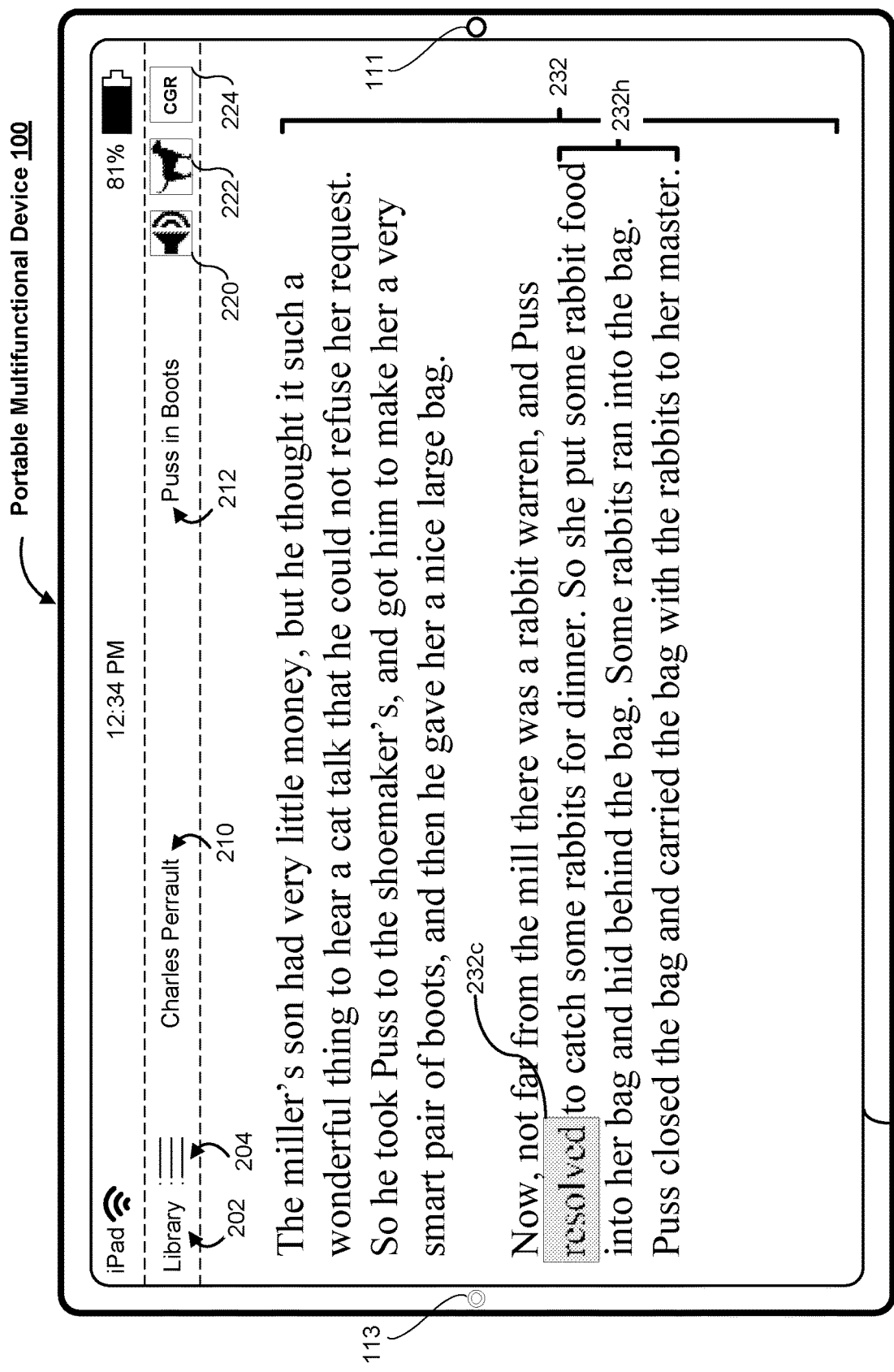

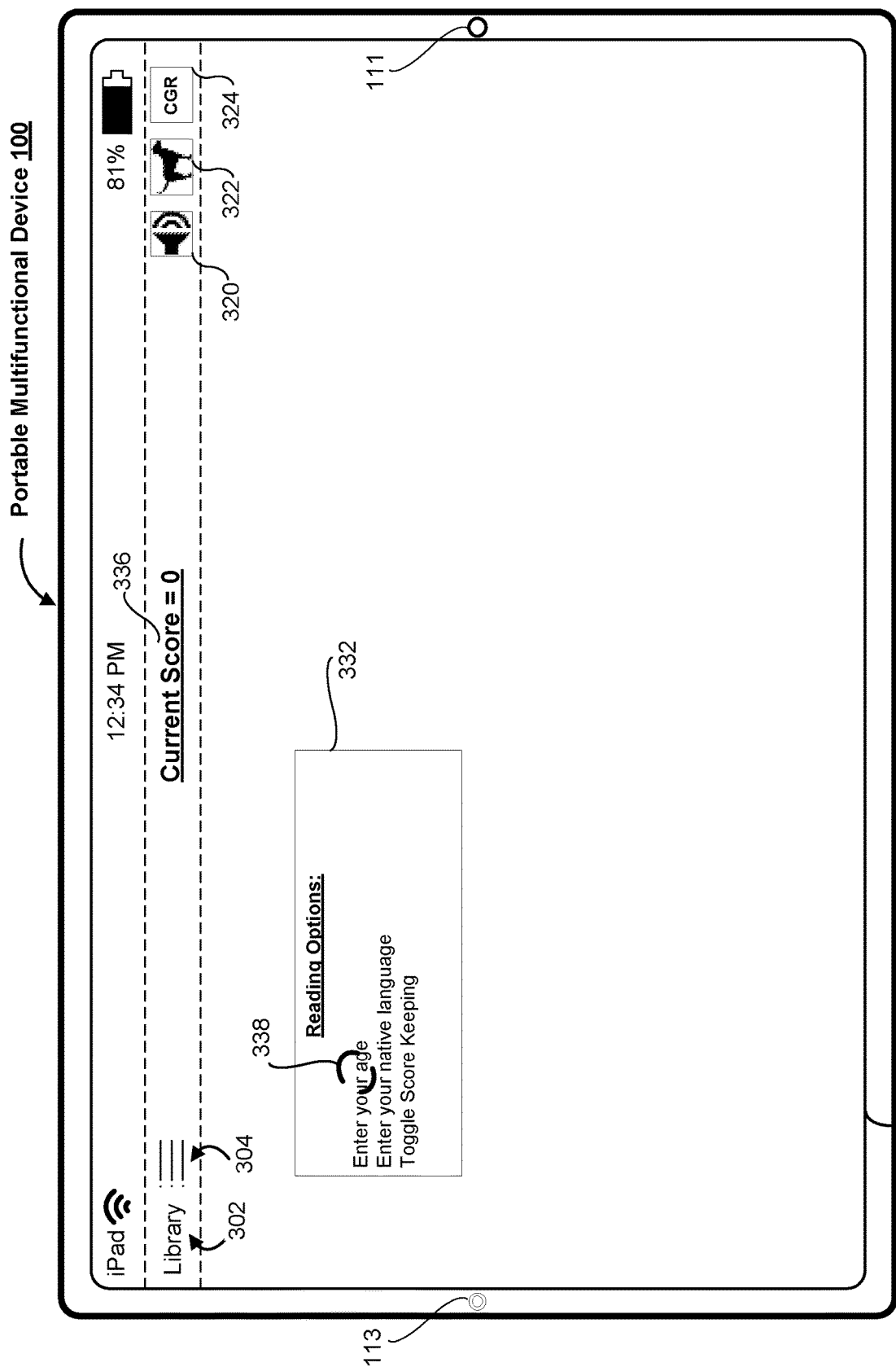

400

600

Speech characterization vector 610-1

| First Speech Data Portion 620-1 | Fluency Value 630a-1 | Intonation Value 630b-1 | Articulation Value 630c-1 | . . . | Sub-Value No. 630N-1 |

Speech characterization vector 610-2

| Second Speech Data Portion 620-2 | Fluency Value 630a-2 | Intonation Value 630b-2 | Articulation Value 630c-2 | . . . | Sub-Value No. 630N-2 |

Speech characterization vector 610-3

| Third Speech Data Portion 620-3 | Fluency Value 630a-3 | Intonation Value 630b-3 | Articulation Value 630c-3 | . . . | Sub-Value No. 630N-3 |

●
●
●

Speech characterization vector 610-M

| $M^{th}$ Speech Data Portion 620-M | Fluency Value 630a-M | Intonation Value 630b-M | Articulation Value 630c-M | . . . | Sub-Value No. 630N-M |

Figure 6

INTERACTIVE READING ASSISTANT

CROSS-REFERENCE TO RELATED APPLICATION

This application claims priority to U.S. Provisional Patent App. No. 62/824,158 filed on Mar. 26, 2019, which is hereby incorporated by reference in its entirety.

TECHNICAL FIELD

The present disclosure relates to an interactive reading assistant, and, in particular, modifying text content based on reading and/or speech proficiency values.

BACKGROUND

Current voice detection systems are able to detect the presence of speech of a human user, and determine certain sounds (e.g., phonemes) and words within the detected speech. A variety of applications may be implemented based on the determined sounds and words. One of these applications is assisting a user (e.g., children or polyglots) in speaking (e.g., uttering) a particular language.

In certain situations, however, current voice detection systems are not equipped to effectively assist a user in reading. Current voice detection systems are unable to assess whether certain vocalizations (e.g., utterances) made by a user match corresponding expected values. For example, a user with a physical condition or attribute, such as a speech impediment or an underdeveloped vocal tract, produces a type of vocalization that is reflective of the physical condition or attribute. A current voice detection system may have difficulty recognizing the type of vocalization. Accordingly, the current voice detection system is unable to provide helpful feedback in order to aid proper reading (e.g., pronunciation) of known text content. As another example, content is sometimes too complex or not complex enough (e.g., dull or boring) to sufficiently engage a user to read. A user without useful feedback or an unengaged user ultimately spends more time to complete a particular language lesson, resulting in greater resource utilization (e.g., greater processing and memory utilization, reduced battery life, greater wear-and-tear, etc.). Thus, it would be useful to provide reading assistance in response to an assessment of a particular type of user vocalization, and in a manner that engages and/or encourages the user to read.

SUMMARY

In accordance with some implementations, a method is performed at an electronic device with a display device, an audio sensor, one or more processors, and a non-transitory memory. The method includes displaying, via the display device, a first set of text content that is characterized by a first difficulty level. The method further includes obtaining speech data associated with the first set of text content from the audio sensor. The method further includes determining one or more linguistic features within the speech data. The method further includes in response to completion of the speech data associated with the first set of text content, determining a reading proficiency value associated with the first set of text content. The reading proficiency value is based on the one or more linguistic features. The method further includes in accordance with a determination that the reading proficiency value satisfies one or more change criteria, changing a difficulty level for a second set of text content, wherein, after changing the difficulty level for the second set of text content, the second set of text content corresponds to a second difficulty level that is different from the first difficulty level associated with the first set of text content. The method further includes in accordance with a determination that the reading proficiency value does not satisfy the one or more change criteria, maintaining the difficulty level for the second set of text content at the first difficulty level associated with the first set of text content.

In accordance with some implementations, a method is performed at an electronic device with a display device, an audio sensor, one or more processors, and a non-transitory memory. The method includes obtaining a speech proficiency value indicator indicative of a speech proficiency value associated with a user of the electronic device. The method further includes in response to determining that the speech proficiency value satisfies a threshold proficiency value: displaying training text via the display device; obtaining, from the audio sensor, speech data associated with the training text, wherein the speech data is characterized by the speech proficiency value; determining, using a speech classifier, one or more speech characterization vectors for the speech data based on linguistic features within the speech data; and adjusting one or more operational values of the speech classifier based on the one or more speech characterization vectors and the speech proficiency value.

In accordance with some implementations, an electronic device includes an audio sensor, one or more processors, a non-transitory memory, a display device, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 3A-3L are additional examples of a user interface for a reading assistant in accordance with some implementations.

FIG. 6 are examples of representations of speech characterization vectors according to some implementations.

SUMMARY

Figure 1:
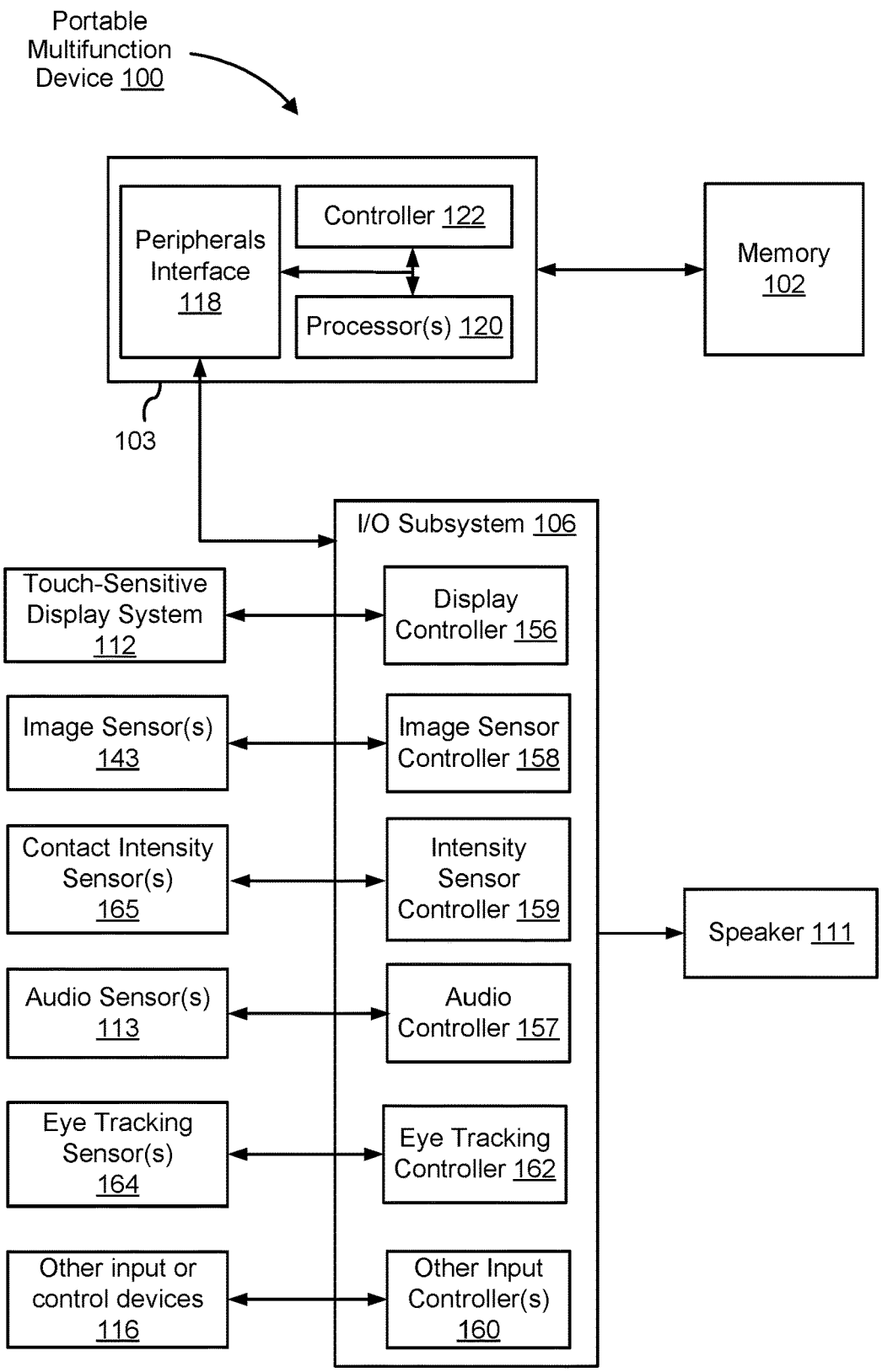
FIG. 1 is a block diagram of an example of a portable multifunction device in accordance with some implementations.

Various implementations herein disclose systems, methods, and devices that provide reading assistance. Based on a user's level of assessed reading proficiency and/or engagement with respect to presented text content (e.g., a word in a story), displayed text content may be modified. For example, in some implementations, a portion of the text content has an appearance that is distinguished from the remainder of the text content until the portion is properly pronounced, at which point another portion of the text content is made to be distinguished. As another example, in some implementations, in response to determining a lack of reading proficiency and/or lack of engagement with the text content, the difficulty (e.g., complexity, richness) of the story changes or another story is presented. Accordingly, in some implementations, display of text content is changed in order to encourage the user to continue reading.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, image sensor(s) 143 (e.g., camera), contact intensity sensor(s) 165, audio sensor(s) 113 (e.g., microphone), eye tracking sensor(s) 164 (e.g., included within a head-mounted display (HMD)), and other input or control device(s) 116. For example, the electronic device 100 corresponds, to a mobile phone, tablet, laptop, wearable computing device, head-mounted device (HMD), head-mounted enclosure, or the like In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.).

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the environment. In some implementations, at least one contact intensity sensor 165 is collocated with, or proximate to, a touch-sensitive surface of the electronic device 100. In some implementations, at least one contact intensity sensor 165 is located on the back of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mounted display (HMD) or within a heads-up display.

Figure 2A:
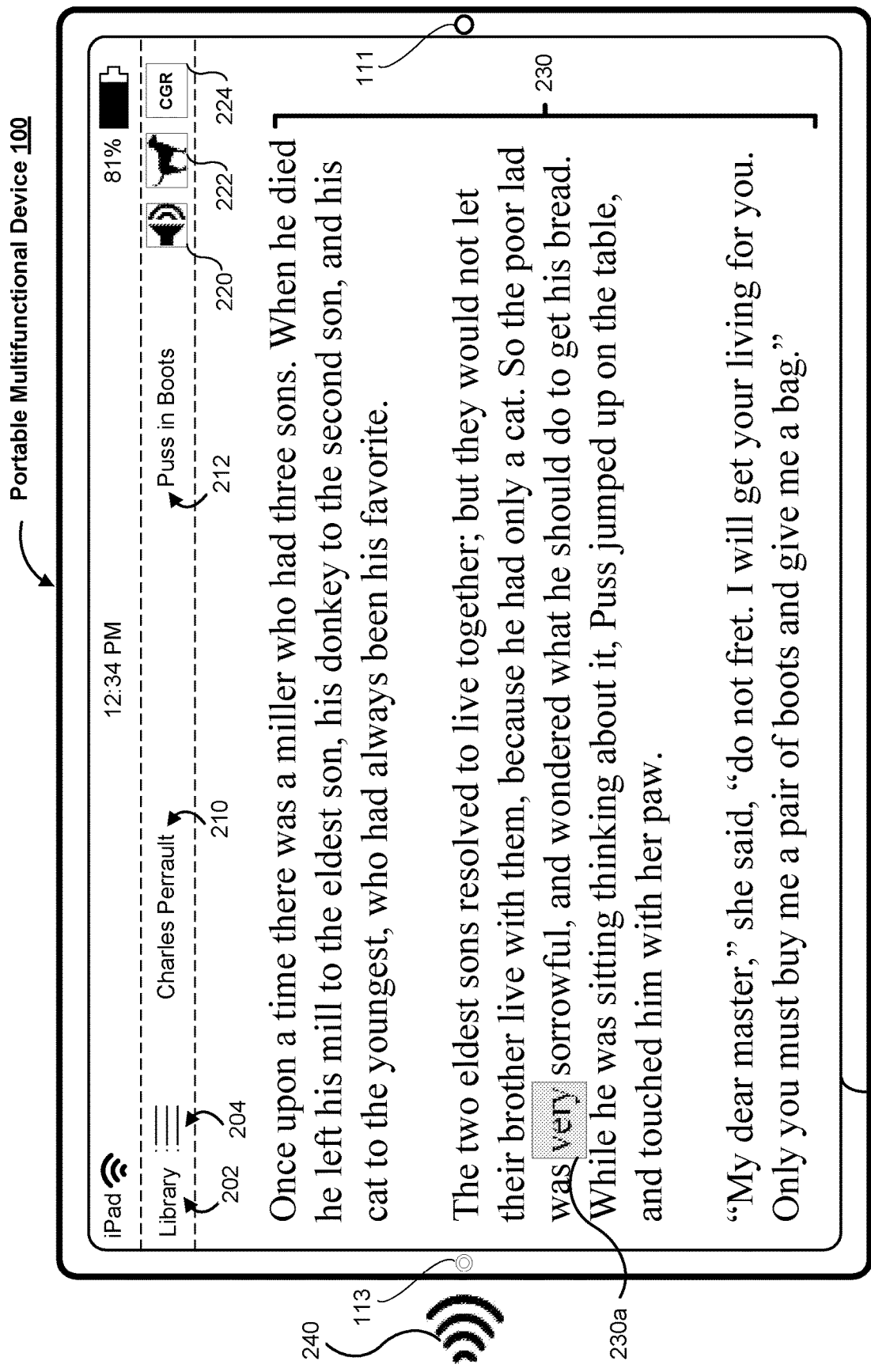
FIGS. 2A-2Y are examples of a user interface for a reading assistant in accordance with some implementations.
Figure 2B:
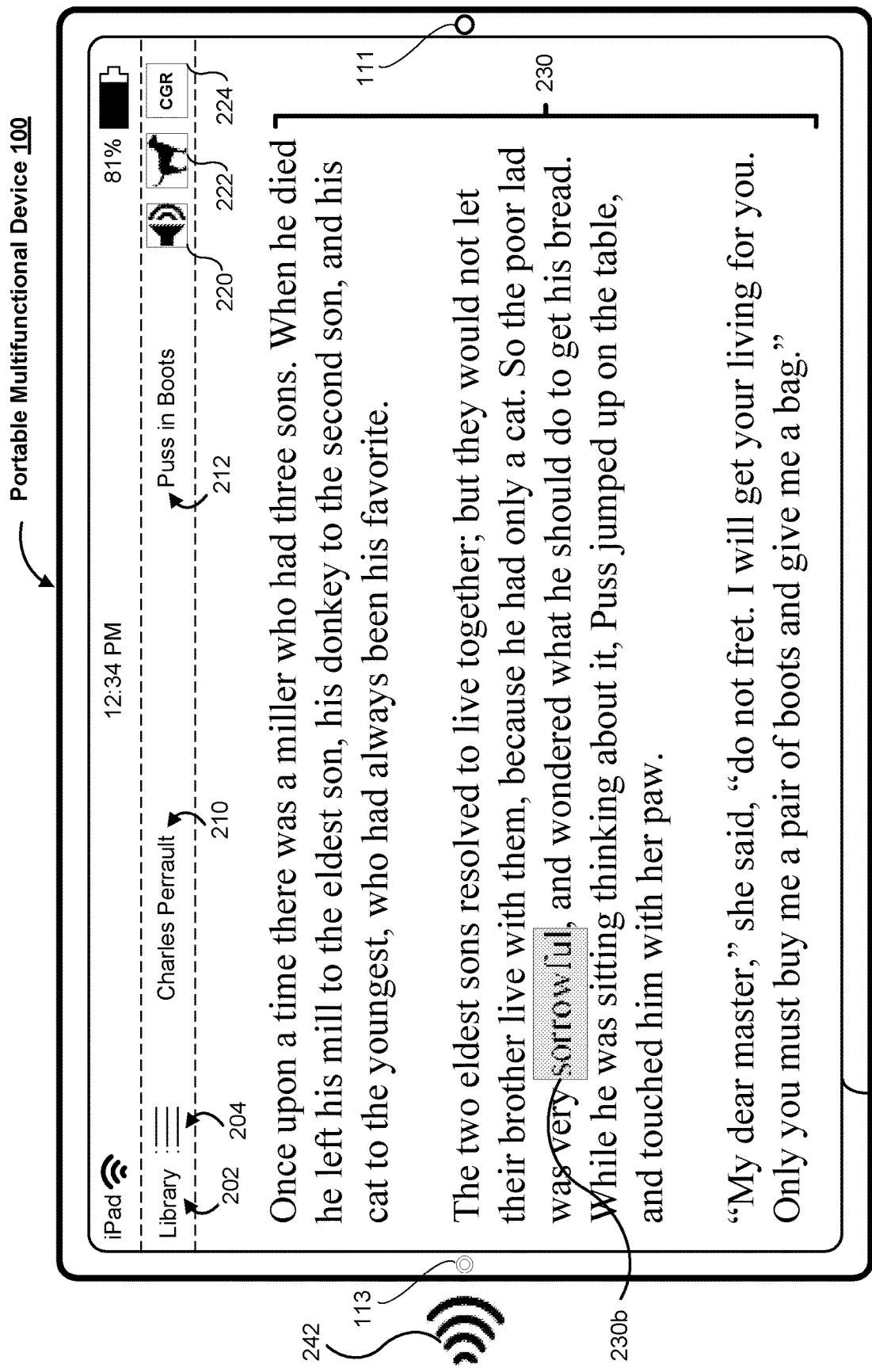
Figure 2C:
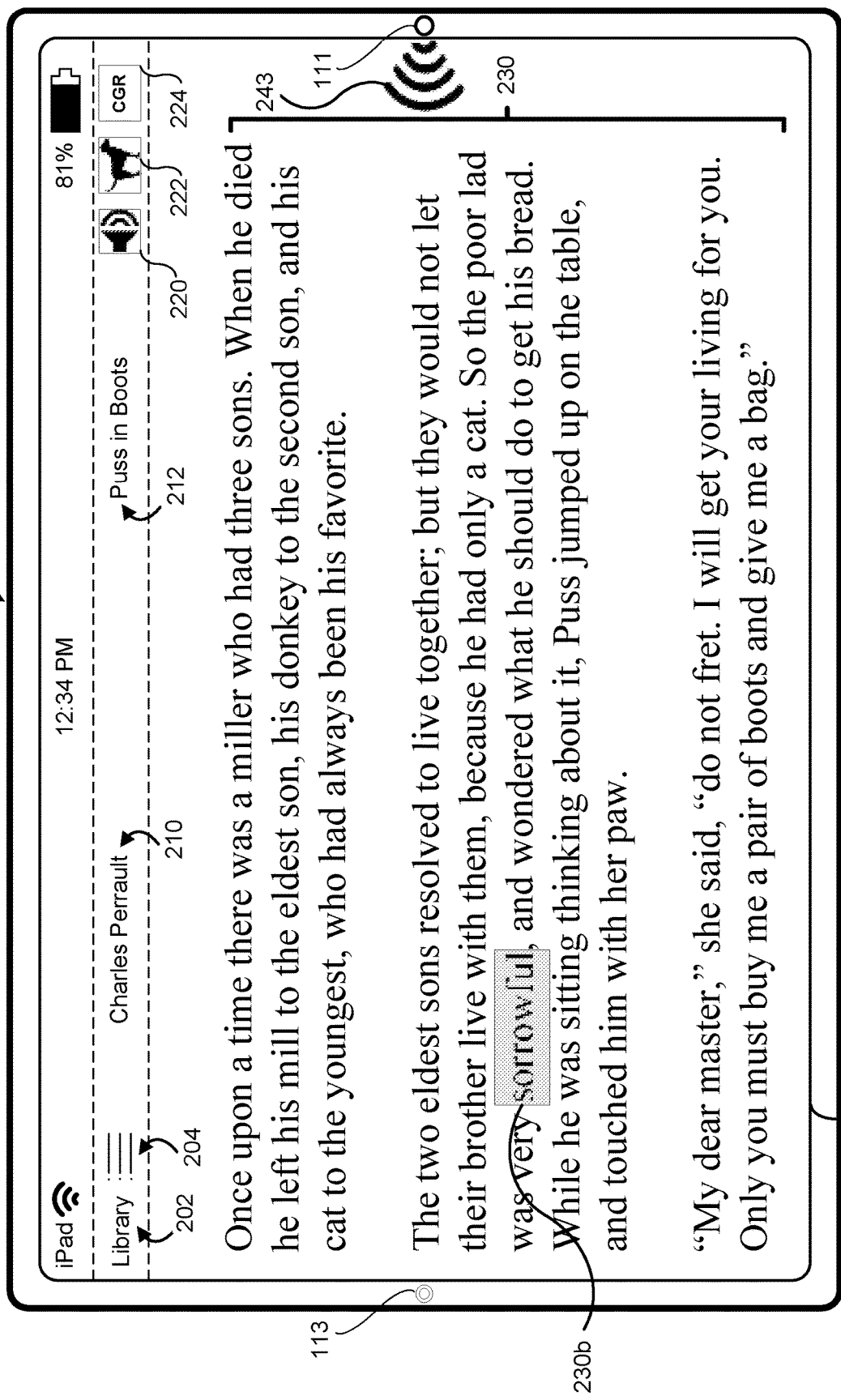
Figure 2D:
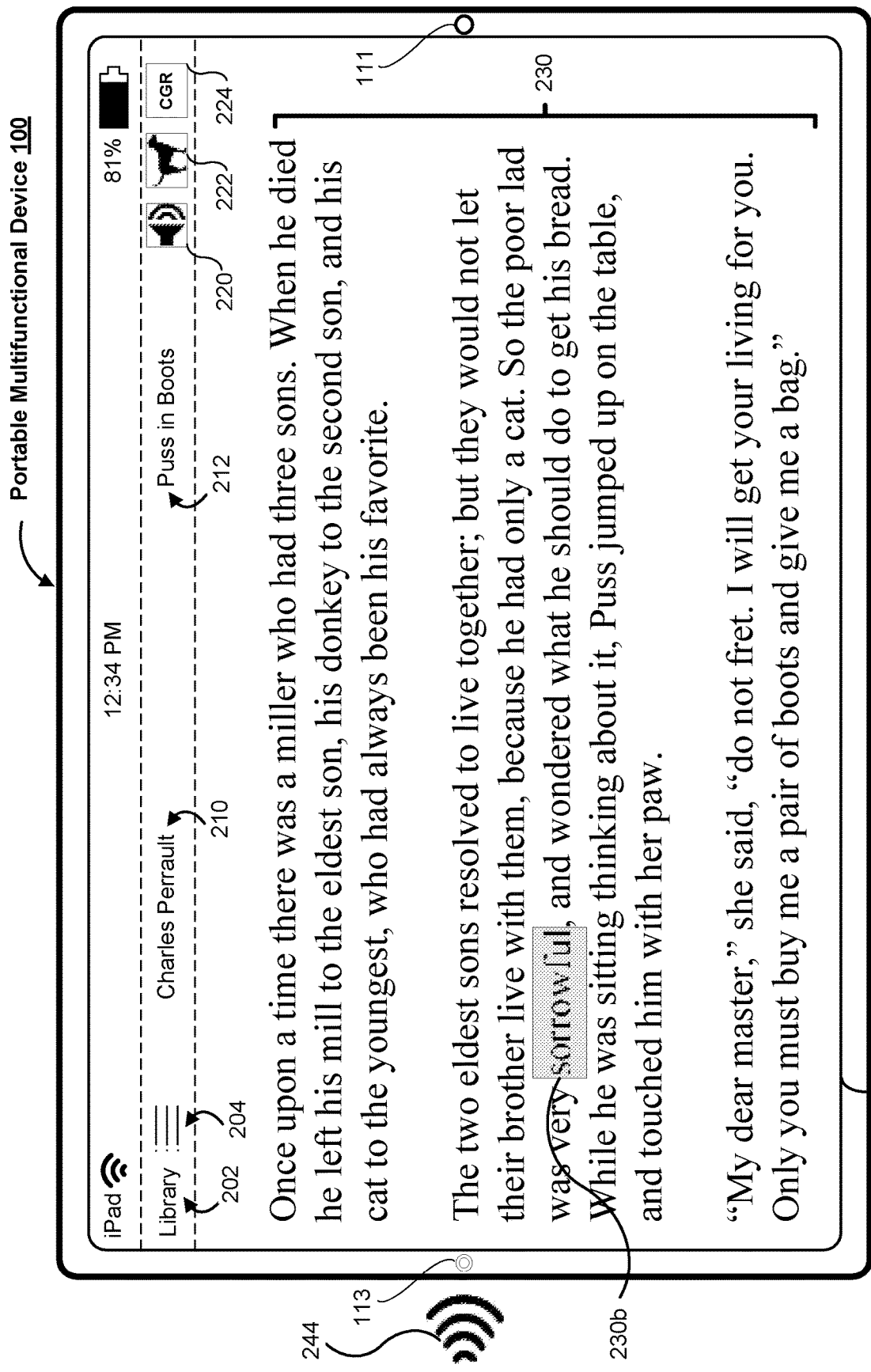
Figure 2E:
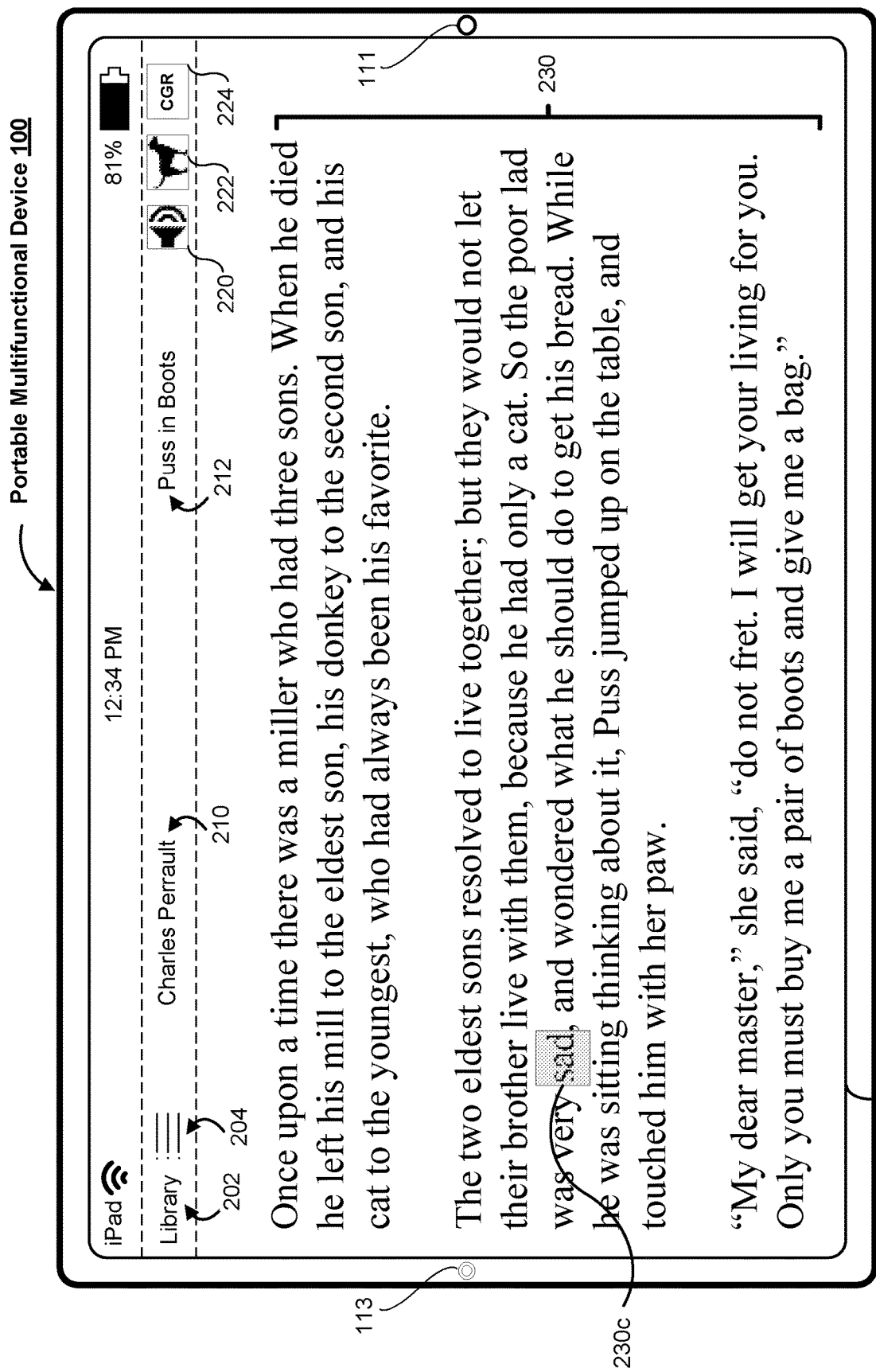
Figure 2F:
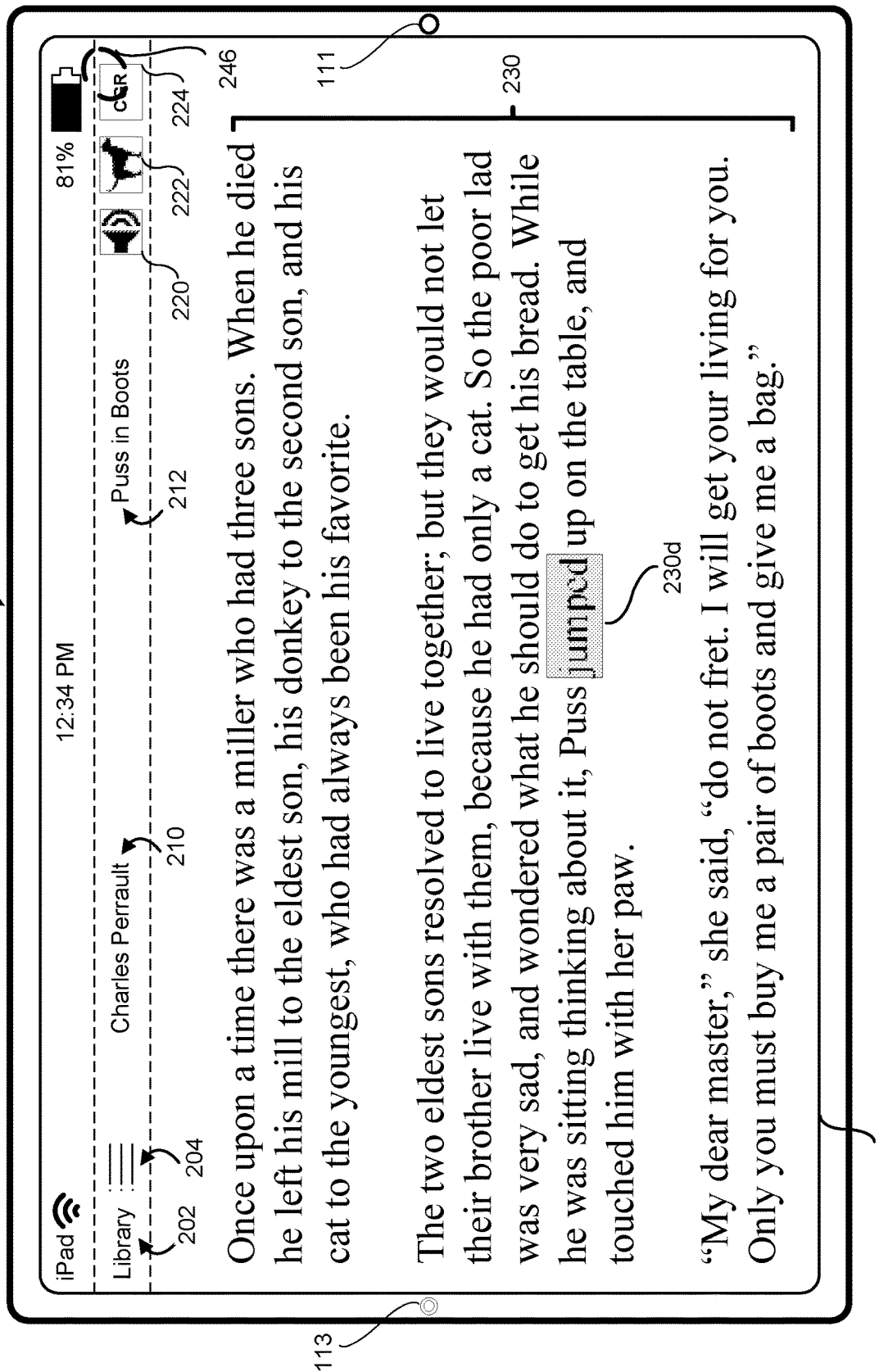
Figure 2G:
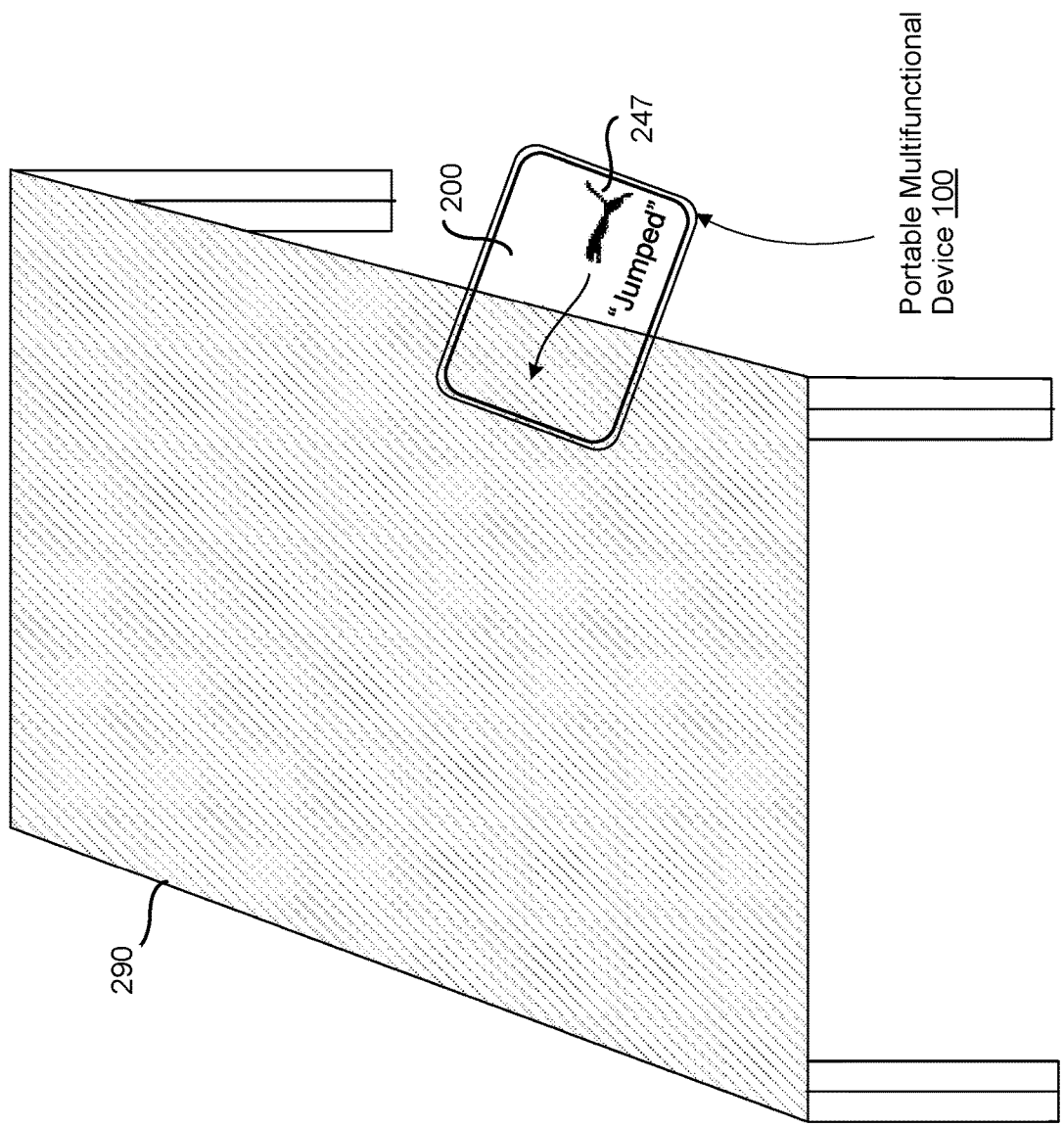
Figure 2H:
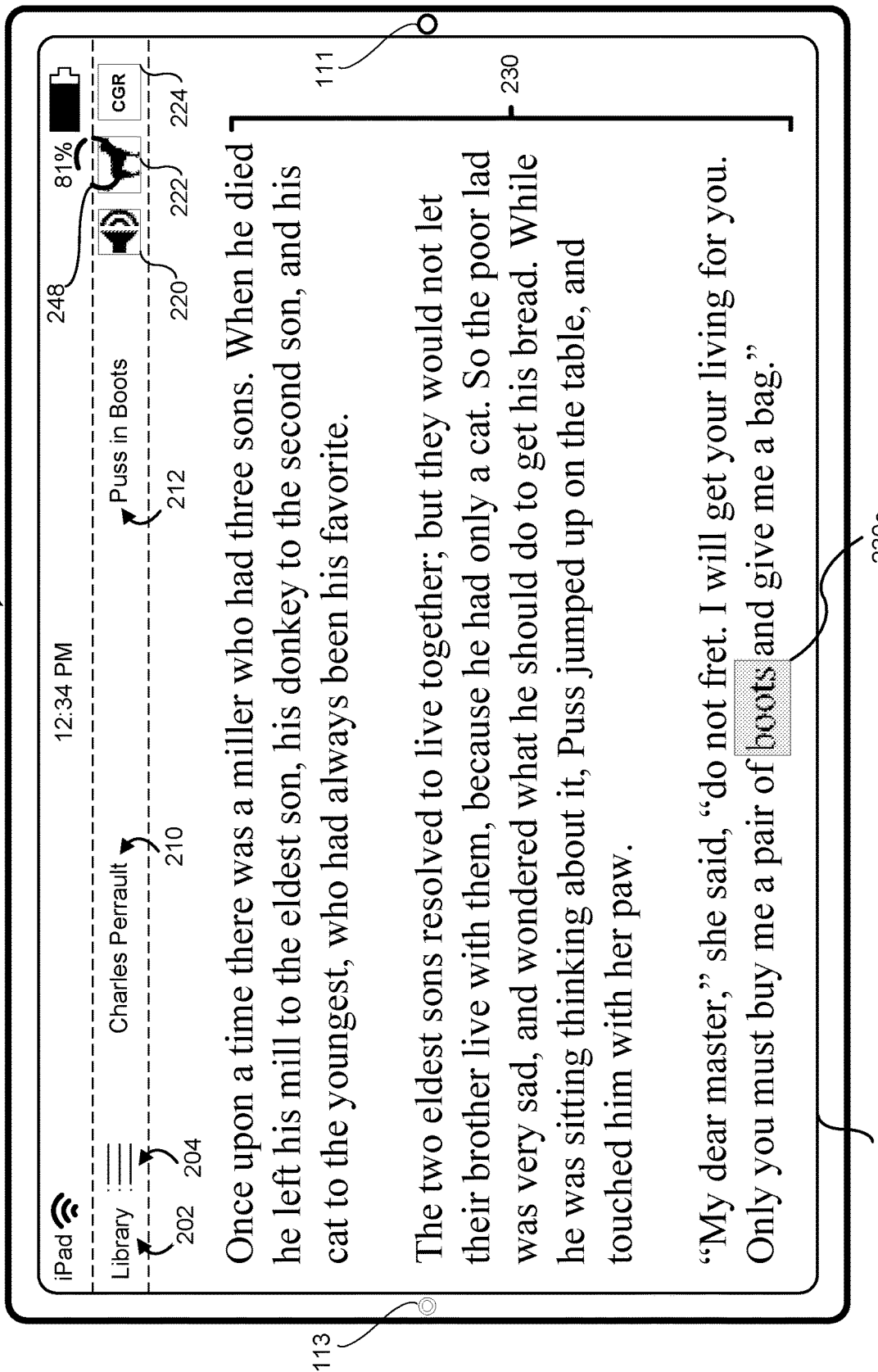
Figure 2I:
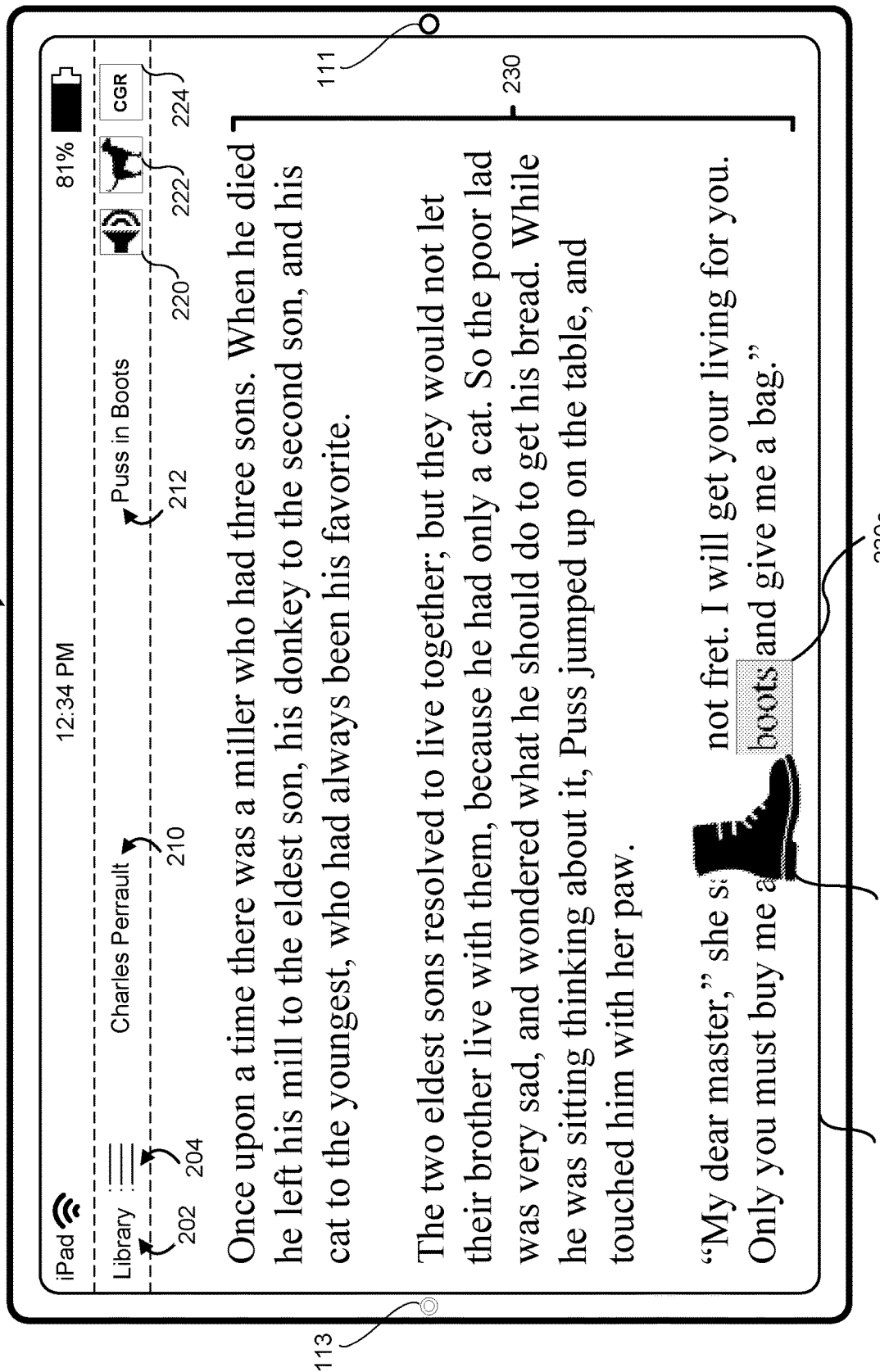
Figure 2J:
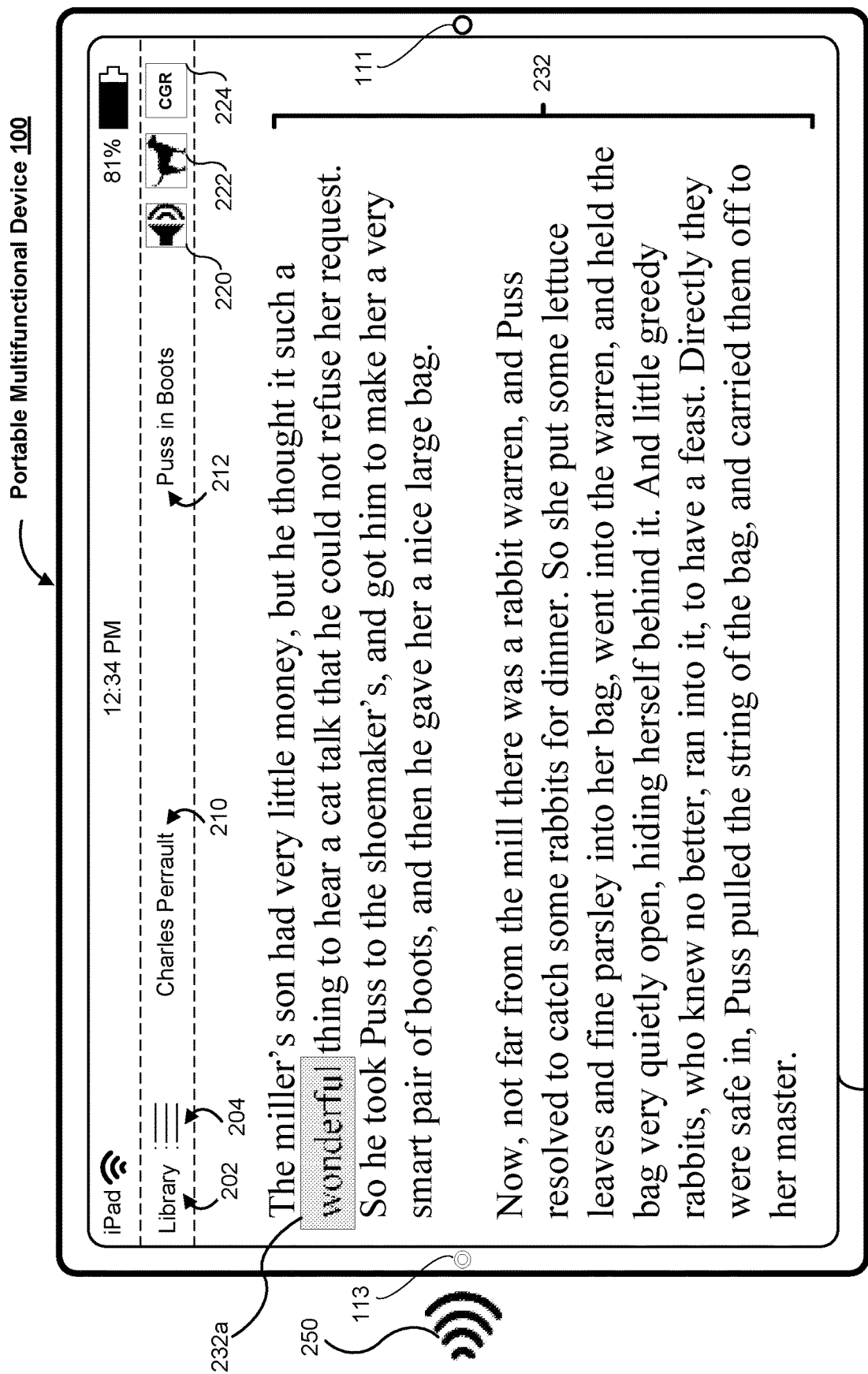
Figure 2K:
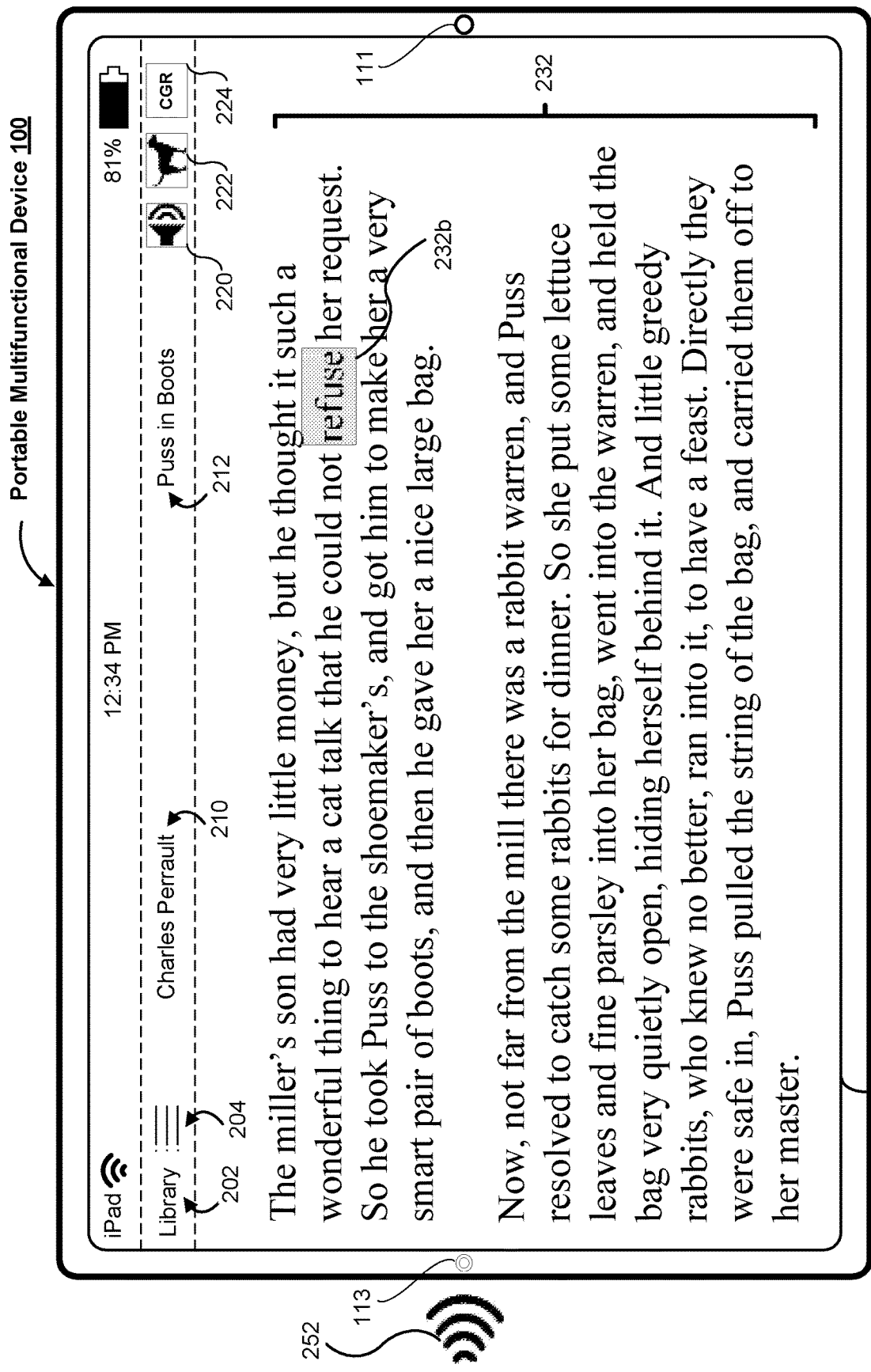
Figure 2L:
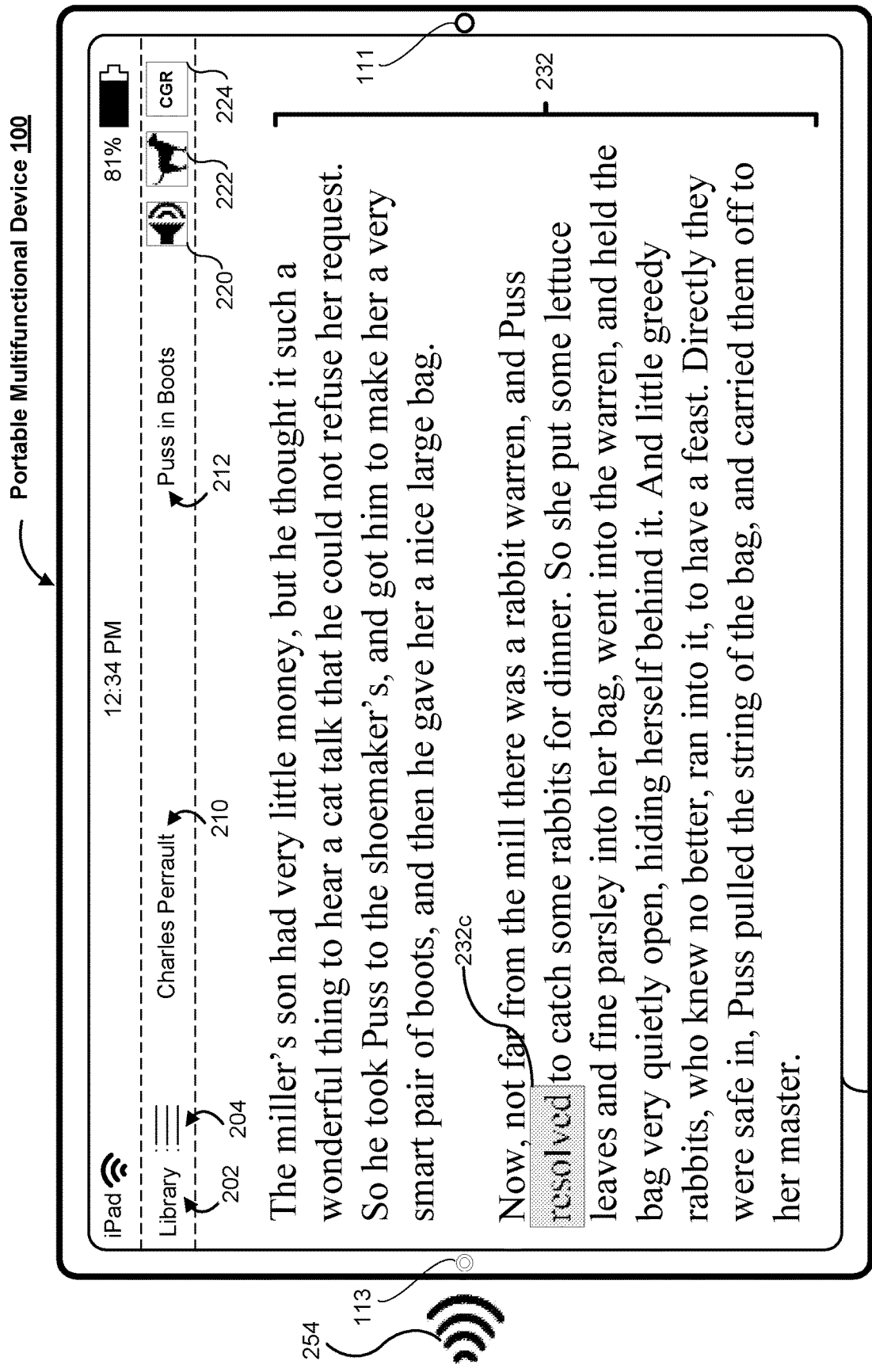
Figure 2M:
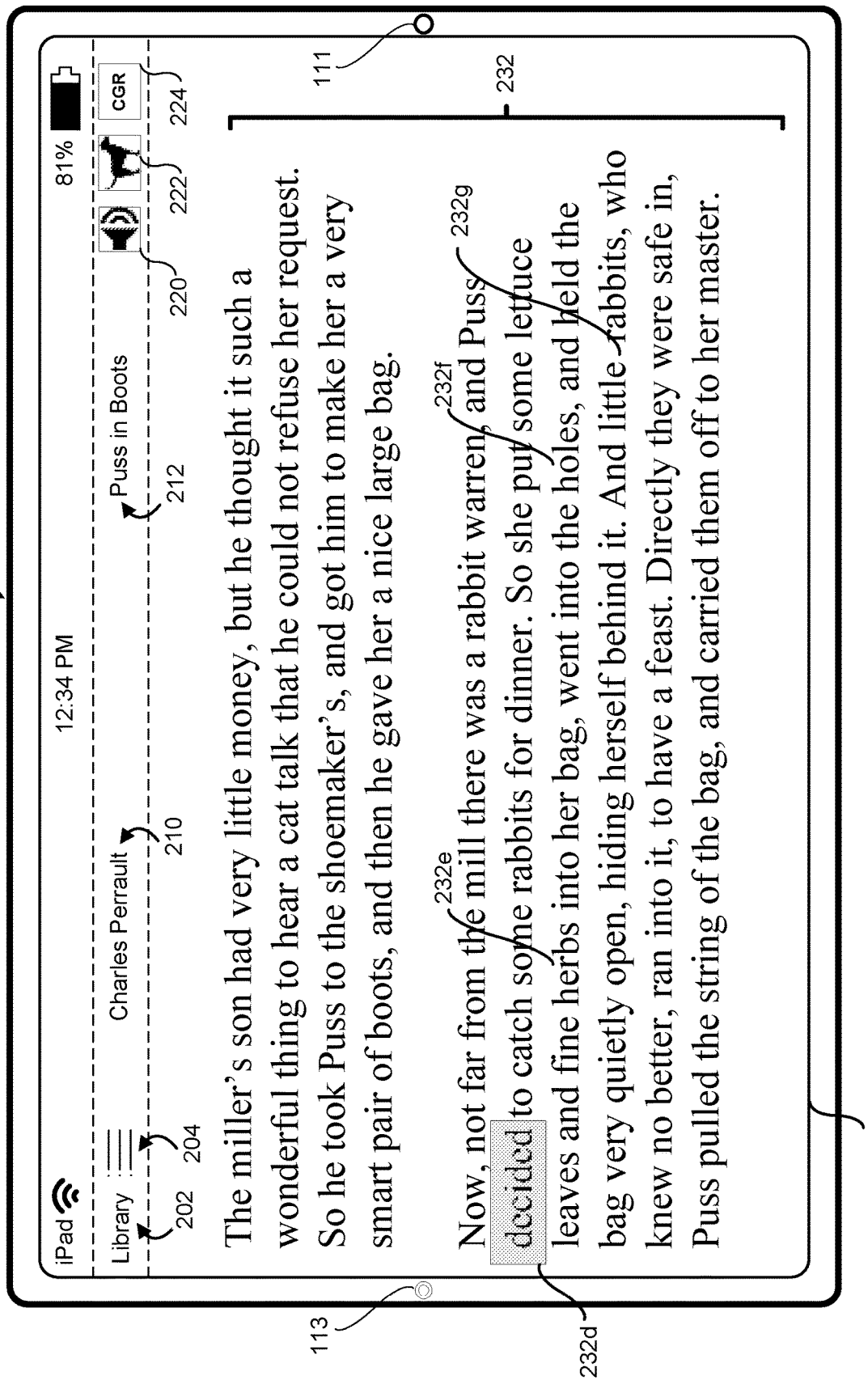
Figure 2O:
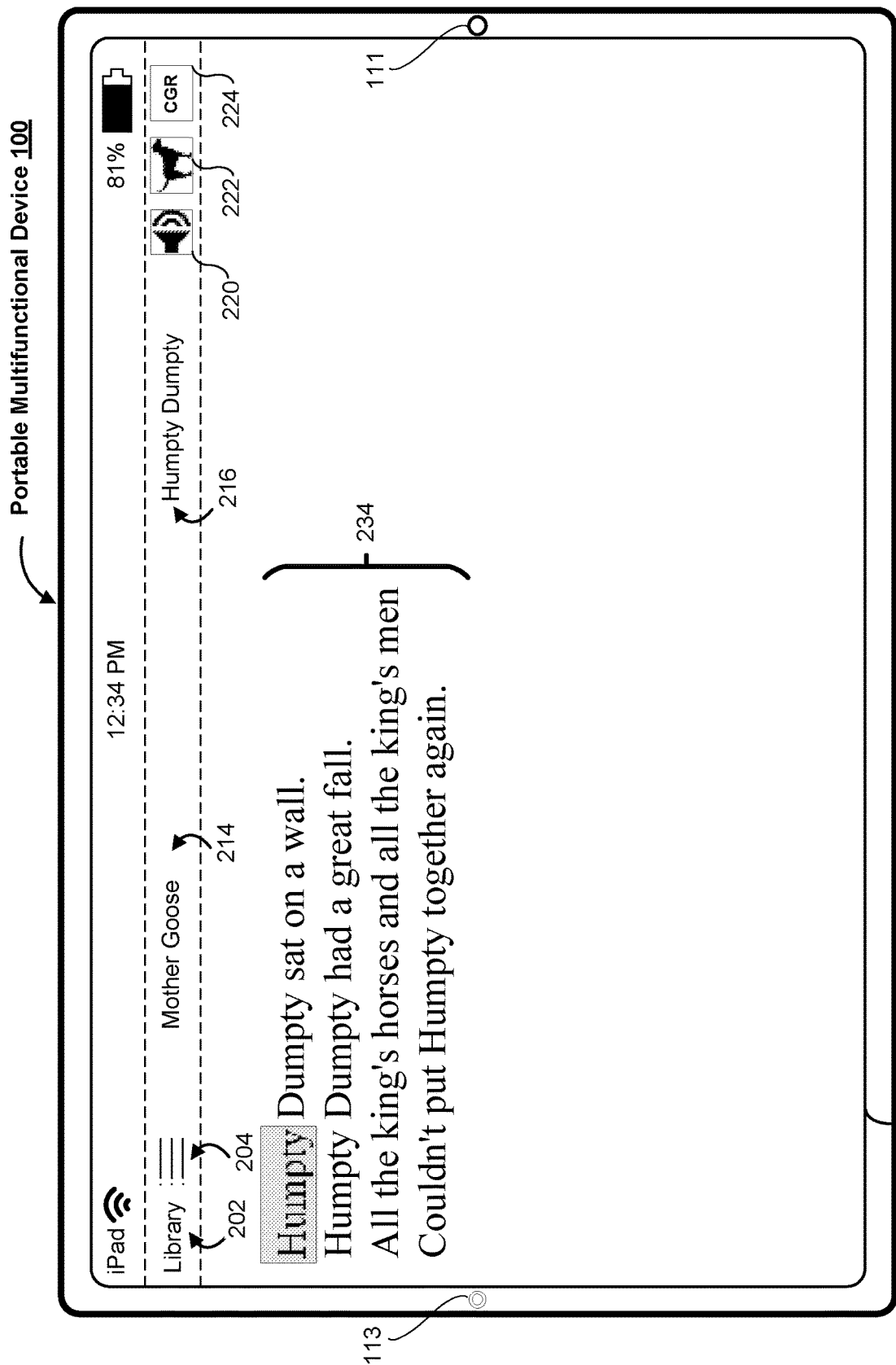
Figure 2P:
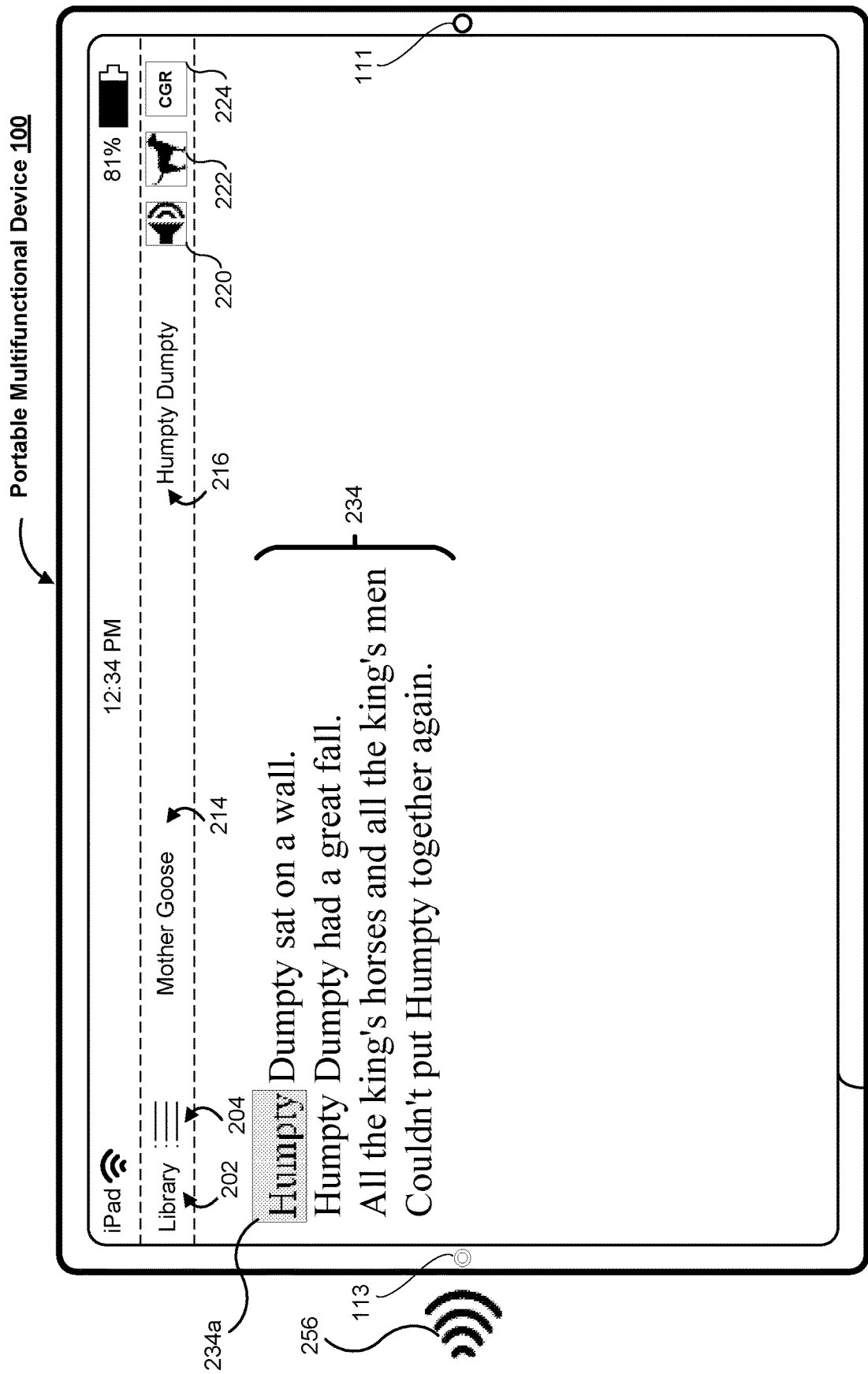
Figure 2Q:
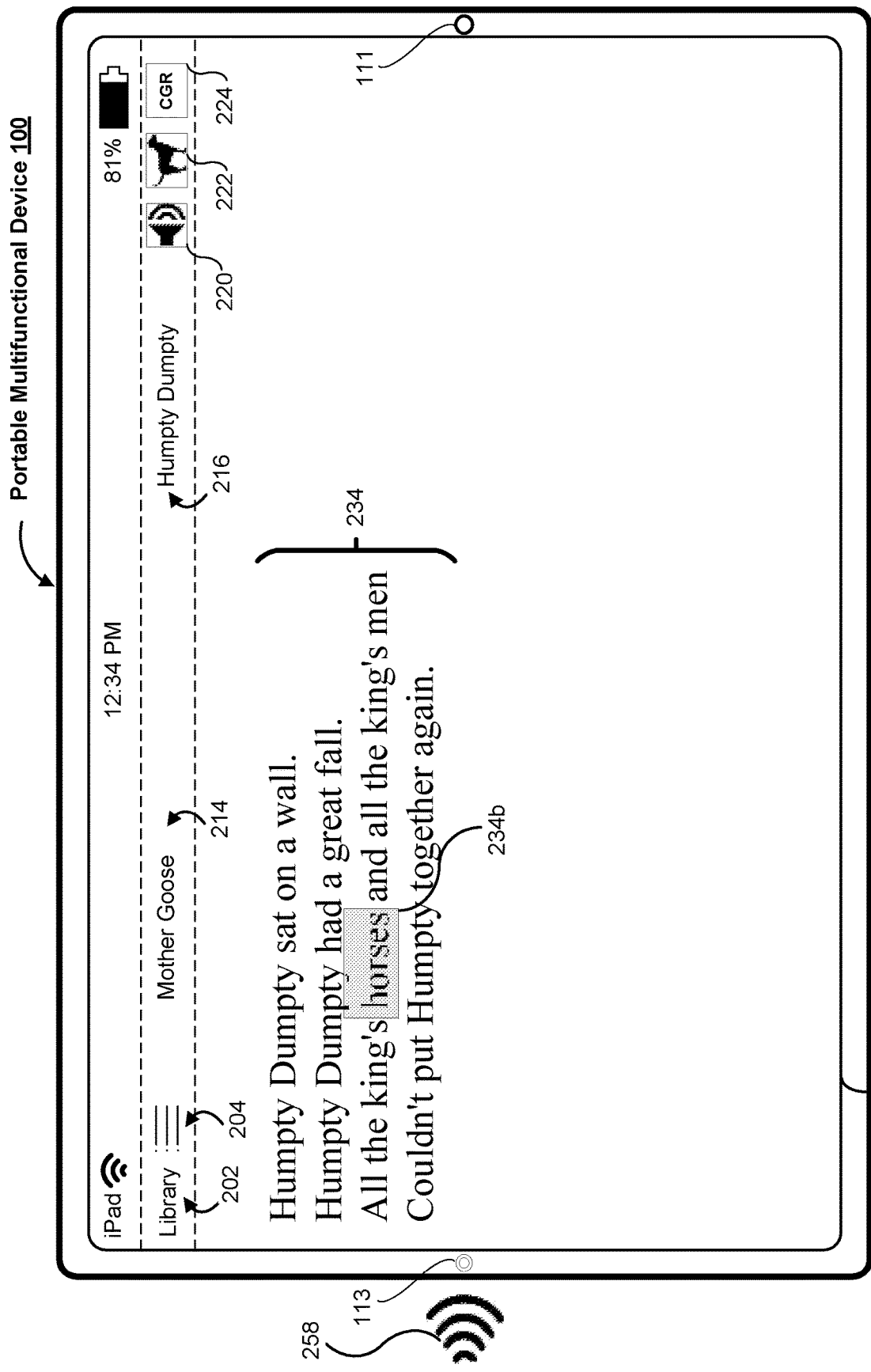
Figure 2R:
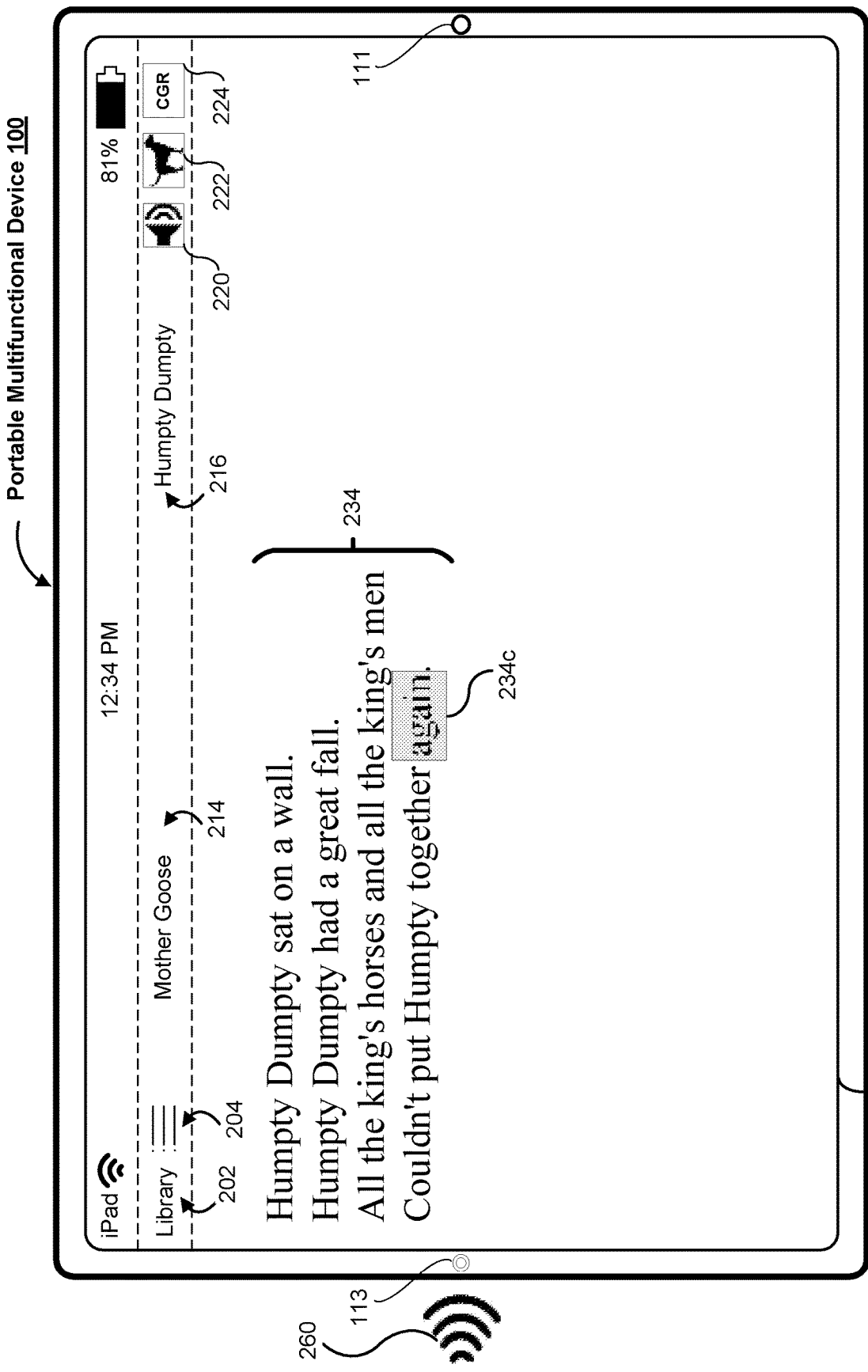
Figure 2S:
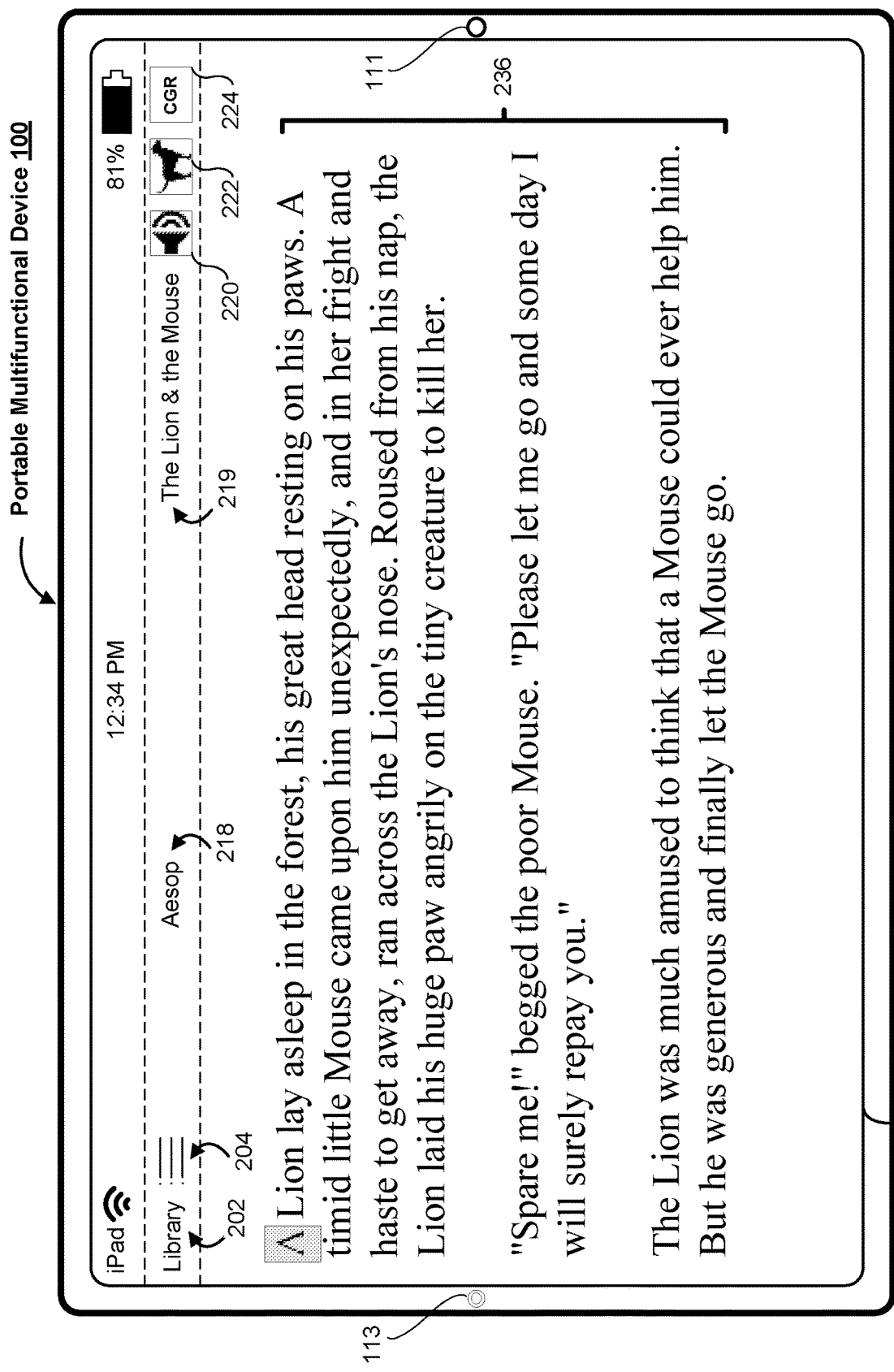
Figure 2T:
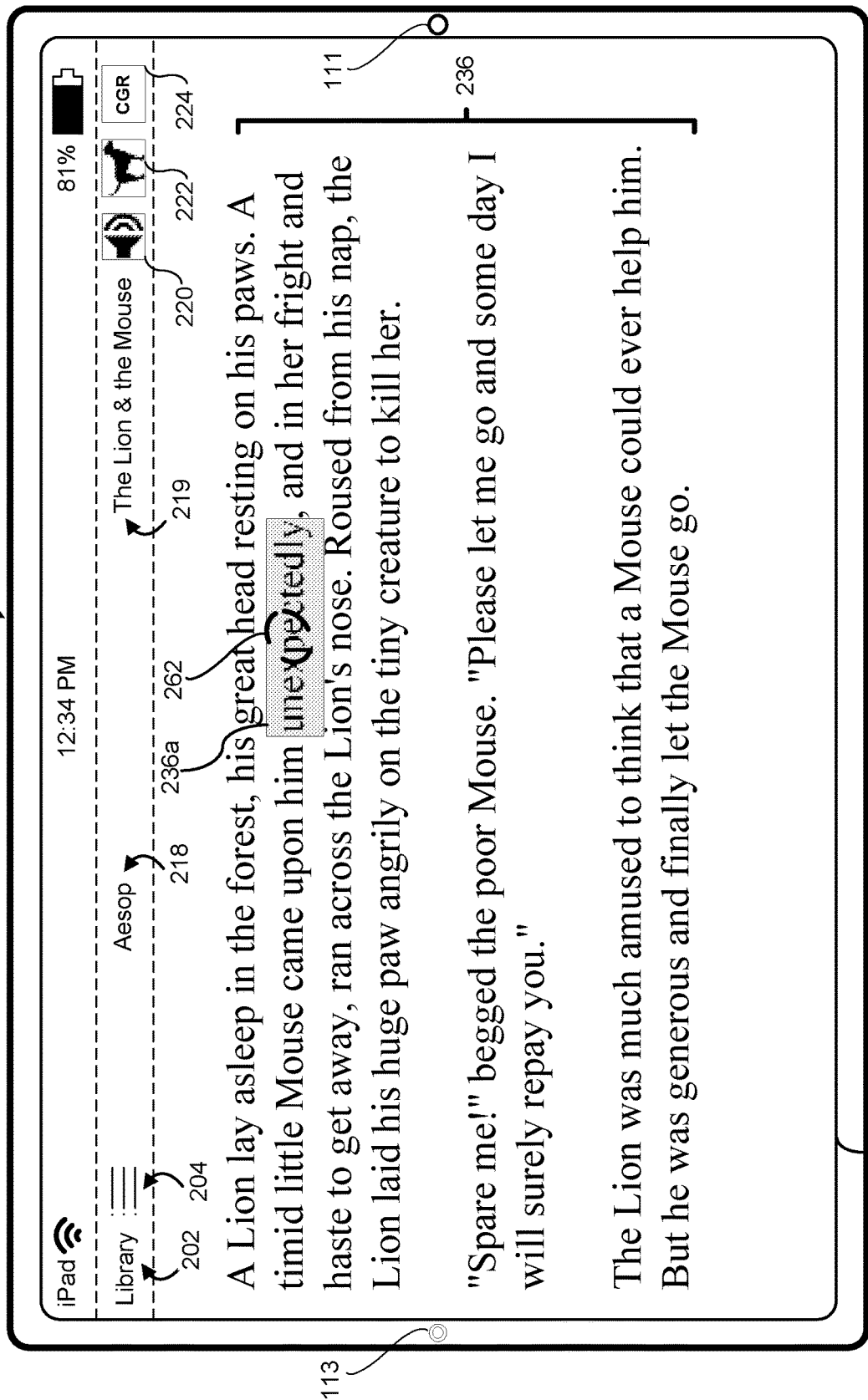
Figure 2U:
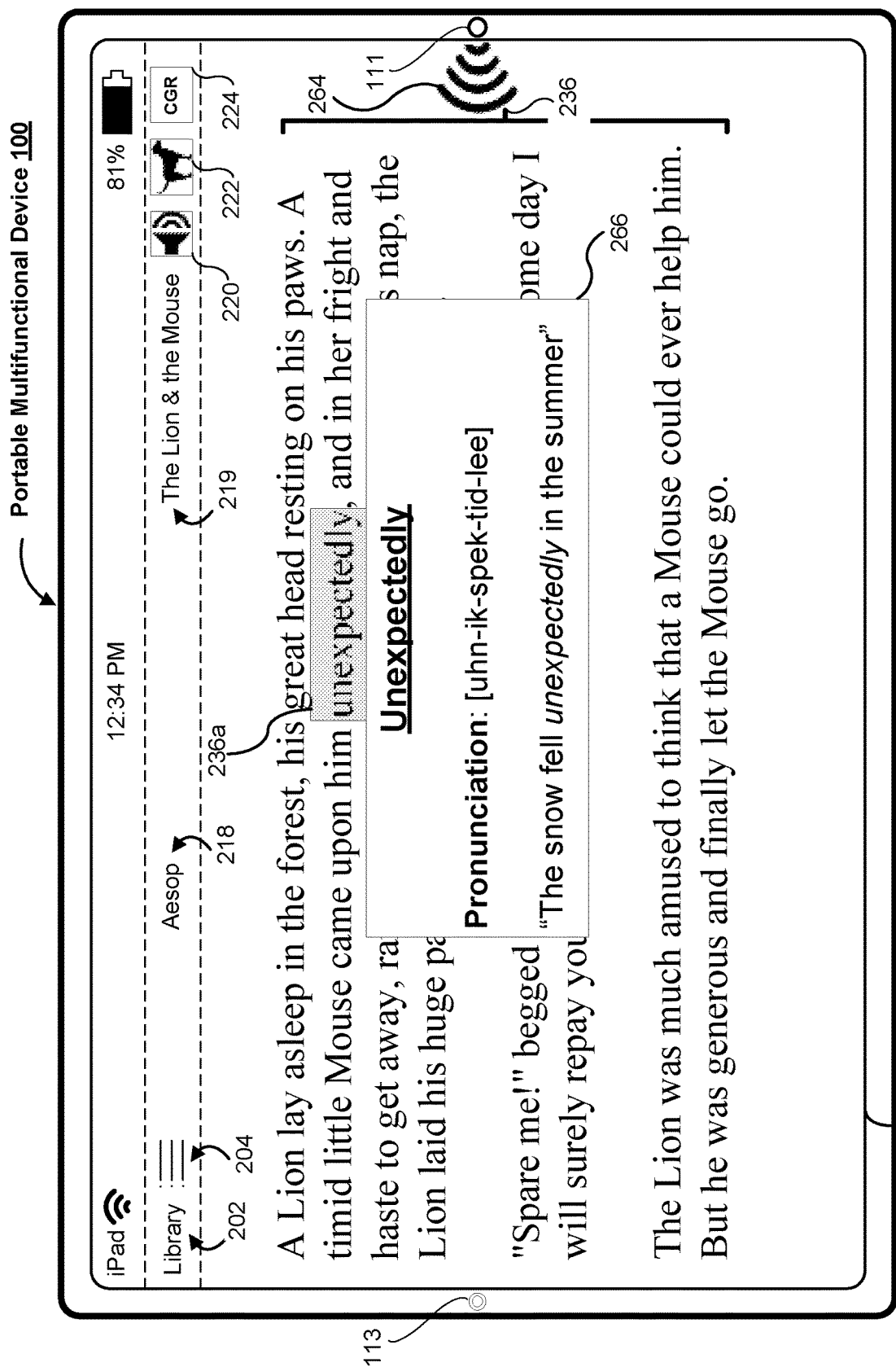
Figure 2V:
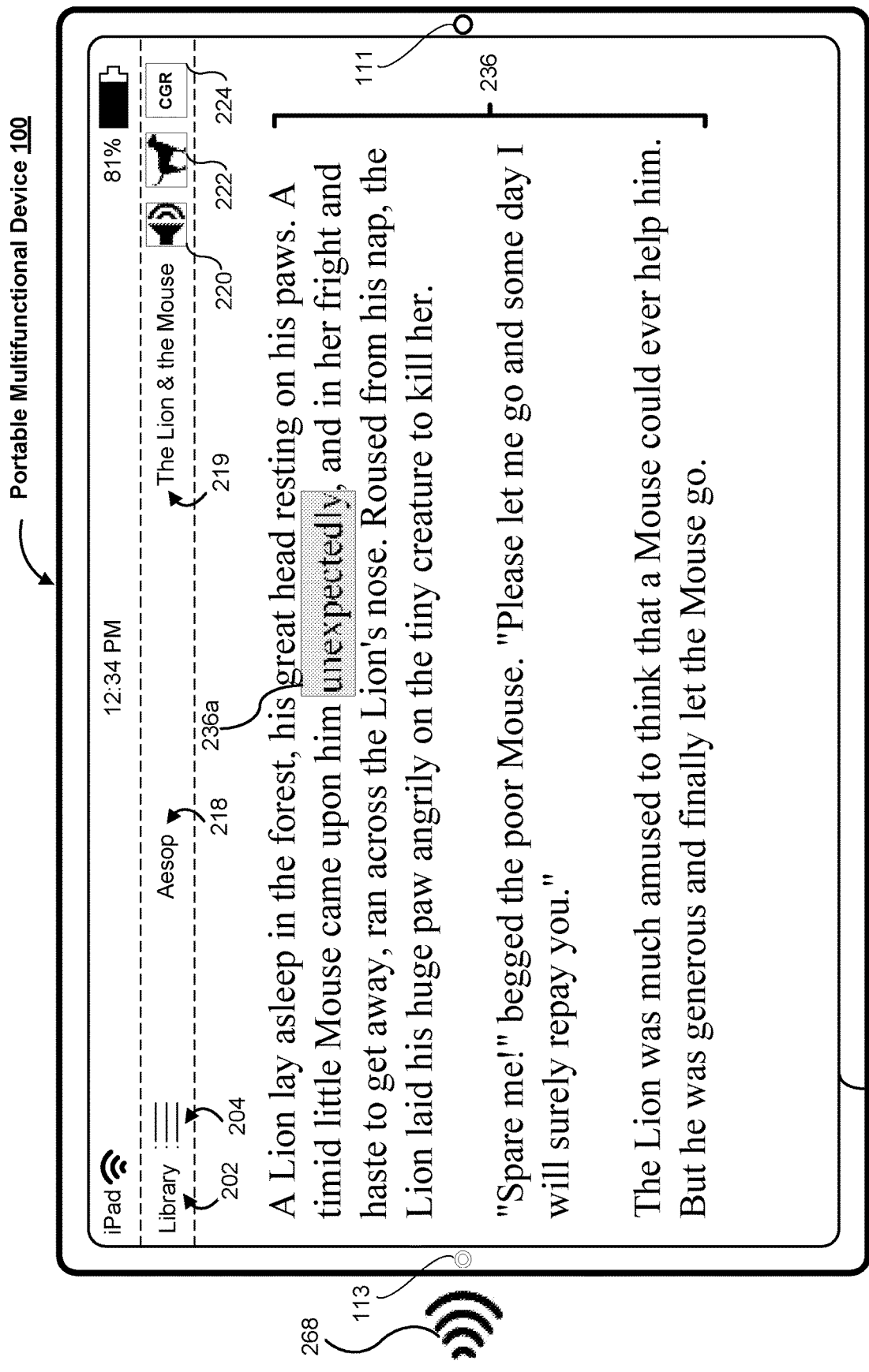
Figure 2W:
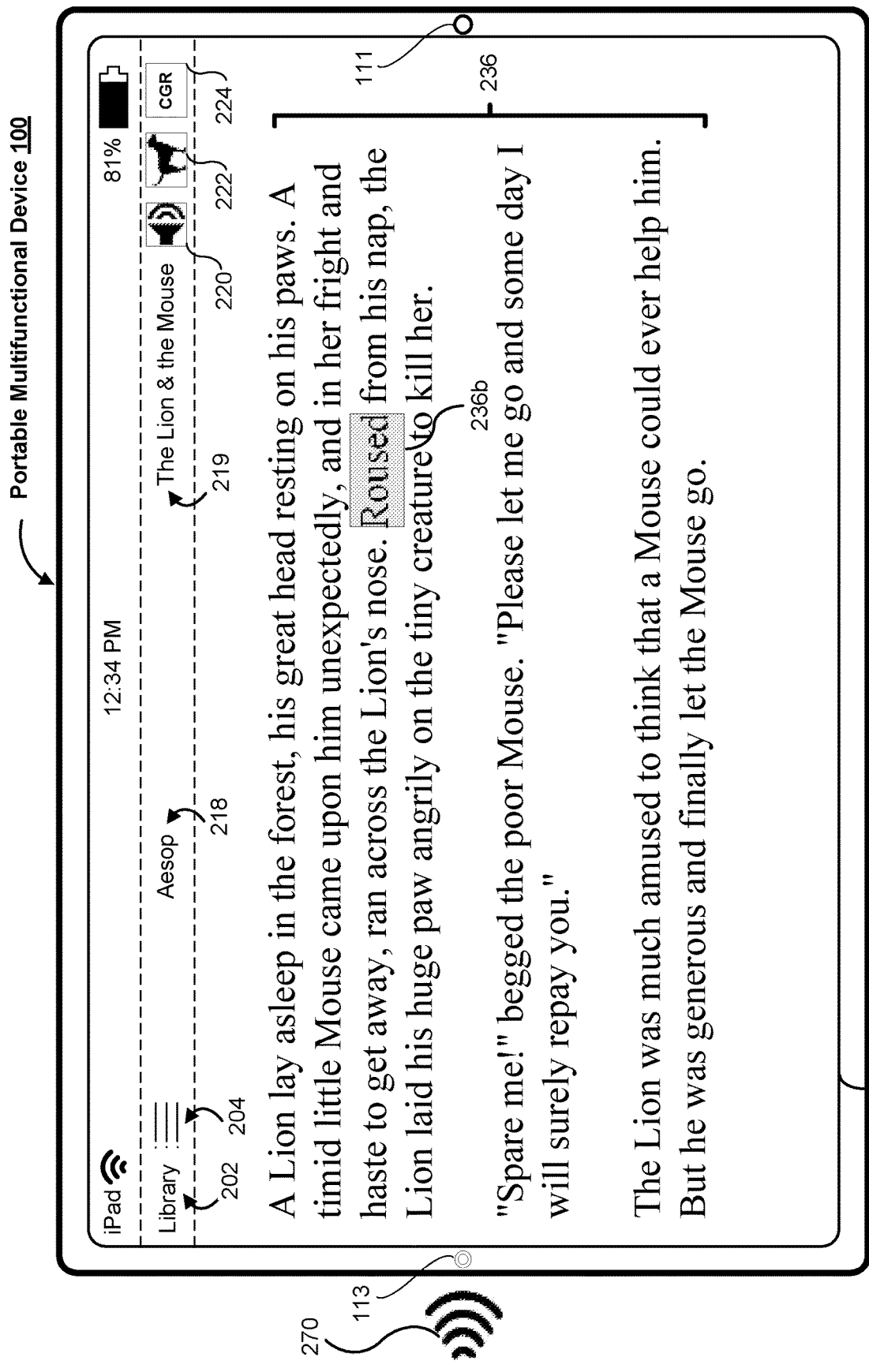
Figure 2X:
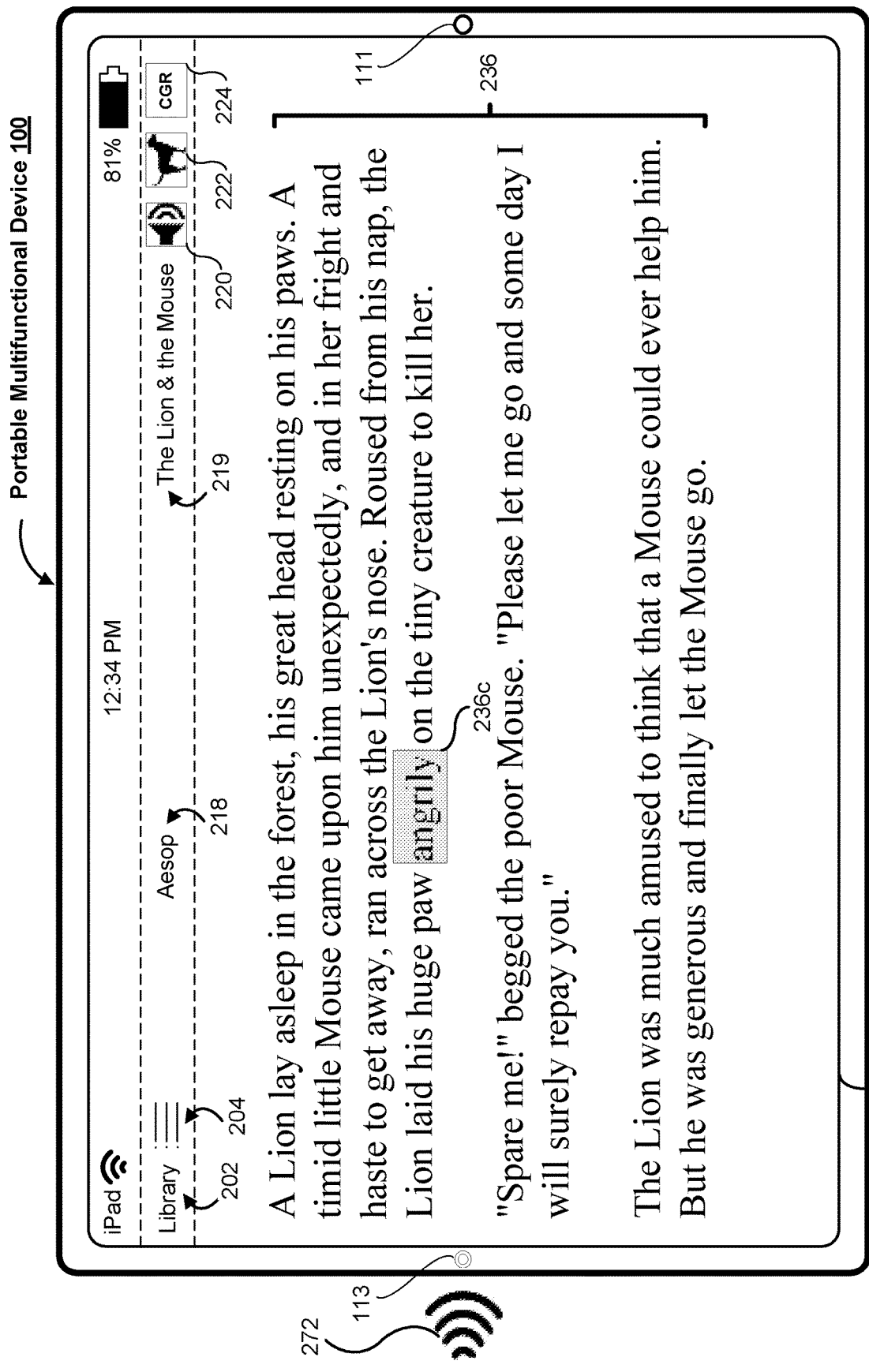
Figure 2Y:
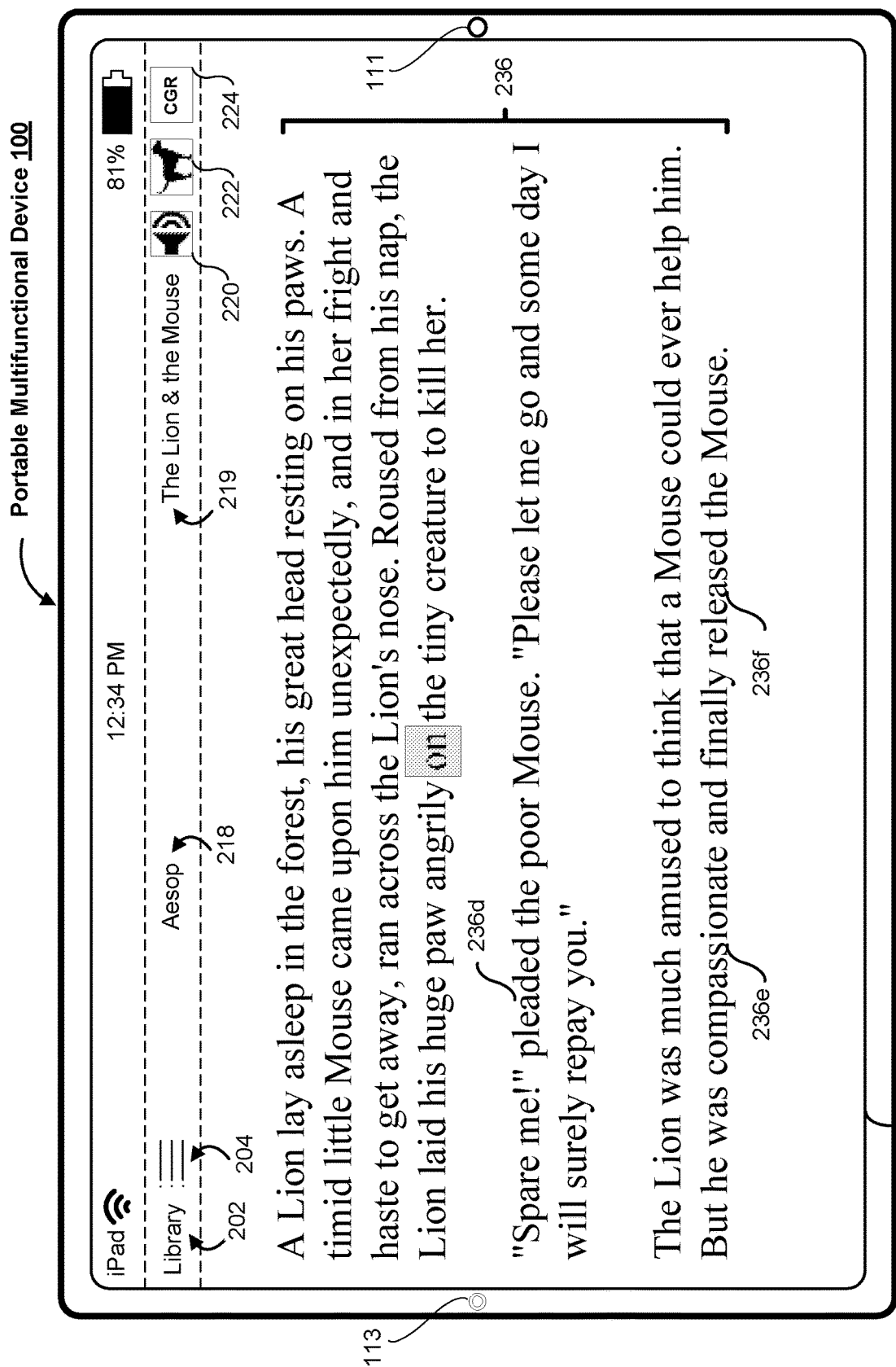

FIGS. 2A-2Y are examples of a user interface 200 for a reading assistant in accordance with some implementations. As illustrated in FIG. 2A-2Y, the user interface 200 and associated processes are implemented on the portable multifunction device 100 shown in FIG. 1. However, one of ordinary skill in the art will appreciate that the user interface 200 may be implemented on another device, such as a device including greater or fewer of the components of the portable multifunction device 100 in FIG. 1.

As illustrated in FIG. 2A, the electronic device 100 displays the user interface 200 including a set of text content 230. As indicated by an author indicator 210 and a title indicator 212, respectively, the set of text content 230 corresponds to "Puss in Boots" authored by "Charles Perrault."

The user interface 200 includes various affordances by which the electronic device 100 obtains various inputs for changing operations of the reading assistant. According to various implementations, inputs to the affordances (e.g., tap gestures) are obtained via a touch-sensitive display system, such as the touch-sensitive display system 112 in FIG. 1. As illustrated in FIG. 2A, inputs to a library affordance 202 specify which text content (e.g., story, web article, white paper, etc.) the electronic device 100 displays. Inputs to a context affordance 204 specify context-related information (e.g., age, native language, preferences, etc.) associated with a user of the electronic device 100. Inputs to an auditory help affordance 220 cause the electronic device 100 to provide auditory-based reading assistance. Inputs to an image help affordance 222 cause the electronic device 100 to provide image-based assistance. Inputs to a computer-generated reality (CGR) help affordance 224 cause the electronic device 100 to provide CGR-based assistance. One of ordinary skill in the art will appreciate that the user interface 200 may include more or fewer of the affordances illustrated in FIG. 2.

As illustrated in FIG. 2A, the electronic device 100 displays a first appearance of a first portion of the set of text content 230 that corresponds to text "very" 230*a*. The first portion is distinguished from the remainder of the set of text content 230 that corresponds to text "very" 230*a*. Namely, the first appearance of the first portion corresponds to a rectangular box highlighting the text "very" 230*a*. One of ordinary skill in the art will appreciate that the first portion of the set of text content 230 that corresponds to the text "very" 230*a* may be distinguished from the remainder of the set of text content 230 in any number of ways, such as being bolded, underlined, or italicized text, an object adjacent to the text (e.g., a bouncing ball under the text), different text size or style, and/or the like.

As further illustrated in FIG. 2A, an audio sensor (e.g., microphone) 113 obtains an audio input 240 that corresponds to the text "very" 230*a*, such as a speech input from a user, and converts the audio input 240 to speech data (e.g., audible signal data). Hereinafter, for the sake of brevity, a particular audio input and corresponding speech data that is generated from the particular audio input are referred to using the same annotation number. For example, speech data 240 is generated from the audio input 240.

The speech data 240 corresponds to a pronunciation of the text "very" 230*a* that is within an acceptable level of error (e.g., correct pronunciation). Moreover, the electronic device 100 determines one or more linguistic features within the speech data 240. In response to completion of the speech data 240 associated with the text "very" 230*a*, the electronic device 100 determines a reading proficiency value associated with the text "very" 230*a*. The reading proficiency value is based on the one or more linguistic features.

Moreover, the electronic device 100 determines that the reading proficiency value associated with the text "very" 230*a* does not satisfy one or more change criteria because the speech data 240 corresponds to a correct pronunciation to the text "very" 230*a*. In response, the electronic device 100 maintains a difficulty level for subsequent portions of the set of text content 230 in FIG. 2B. Namely, the set of text content 230 in FIG. 2B matches the set of text content 230 in FIG. 2A.

As further illustrated in FIG. 2B, in response to determining that a comparison between the text "very" 230*a* and the one or more linguistic features satisfies one or more reading proficiency criteria, the electronic device 100 displays a second appearance of a second portion 230*b* of the set of text content 230 that corresponds to text "sorrowful." The second portion 230*b* is distinguished from the remainder of the set of text content 230.

As further illustrated in FIG. 2B, the audio sensor 113 obtains audio input 242 that corresponds to the text "sorrowful" 230*b* and converts the audio input 242 to speech data 242. The speech data 242 corresponds to a pronunciation of the text "sorrowful" 230*b* that is not within an acceptable level of error (e.g., incorrect pronunciation). The electronic device 100 determines one or more linguistic features within the speech data 242. Moreover, in response to completion of the speech data 242 associated with the text "sorrowful" 230*b*, the electronic device 100 determines a reading proficiency value associated with the text "sorrowful" 230*b*. The reading proficiency value is based on the one or more linguistic features.

In response to determining that the reading proficiency value associated with the text "sorrowful" 230*b* does not satisfy the one or more change criteria, the electronic device 100 maintains a difficulty level for subsequent portions of the set of text content 230 in FIG. 2C. Namely, the set of text content 230 in FIG. 2C matches the set of text content 230 in FIG. 2B.

As further illustrated in FIG. 2C, in response to determining that a comparison between the text "sorrowful" 230*b* and the one or more linguistic features does not satisfy the one or more reading proficiency criteria, the electronic device 100 maintains the second appearance of a second portion of the set of text content 230 that corresponds to the text "sorrowful" 230*b*. In some implementations, in response to determining that the one or more reading proficiency criteria are not satisfied, a speaker 111 of the electronic device 100 plays a speech sample 243 that corresponds to a proper pronunciation of the word "sorrowful" 230*b* in order to provide reading assistance, as illustrated in FIG. 2C.

As illustrated in FIG. 2D, the audio sensor 113 obtains an audio input 244 that corresponds to the text "sorrowful" 230*b* and converts the audio input 244 to speech data 244. The speech data 244 corresponds to a pronunciation of the text "sorrowful" that is not within an acceptable level of error (e.g., incorrect pronunciation). The electronic device 100 determines one or more linguistic features within the speech data. Moreover, in response to completion of the speech data 244 associated with the text "sorrowful" 230*b*, the electronic device 100 determines a reading proficiency value associated with the text "sorrowful" 230*b*. The reading proficiency value is updated in order to reflect successive (e.g., two-in-a-row) mispronunciations of the text "sorrowful" 230*b*.

The electronic device 100 determines that the reading proficiency value satisfies one or more change criteria because of the two successive mispronunciations of the text "sorrowful" 230*b*. In other words, the electronic device 100 determines that the currently displayed set of text content 230 is too difficult (e.g., too advanced) for the reading proficiency value associated with the user of the reading assistant. One of ordinary skill in the art will appreciate that other implementations include different change criteria, such as more or fewer successive mispronunciations of text content.

One of ordinary skill in the art will further appreciate that other implementations include the change criteria being satisfied when the text content is not challenging enough. For example, in some implementations, the change criteria is satisfied when a sufficient number of words in a row are correctly pronounced or a lack of mispronunciations of words with respect to a certain amount of text content (e.g., less than a 5% mispronunciation rate). As another example, in some implementations, eye gaze data obtained via eye tracking sensor(s) (e.g., the eye tracking sensor(s) 164 in FIG. 1) indicates a gaze of the user is not focused on the text content, which may be a sign of a lack of engagement (e.g., boredom). As yet another example, certain characteristics of speech data, such as low volume, low speed, lack of inflection, etc., may indicate a lack of engagement. As yet another example, the change criteria is satisfied when the fluency (e.g., rate of speech) satisfies a threshold value.

As illustrated in FIG. 2E, in response to determining that the reading proficiency value satisfies the one or more change criteria, the electronic device 100 replaces the text "sorrowful" 230*b* with a new, third portion of the set of text content 230 that corresponds to text "sad" 230*c*, in order to reduce a difficulty level associated with the text "sorrowful" 230*b*. Moreover, in response to determining that a comparison between the text "sorrowful" 230*b* and the one or more linguistic features does not satisfy the one or more reading proficiency criteria in FIG. 2D, the electronic device 100 foregoes distinguishing the next word ("and") and displays a third appearance of the new text "sad" 230*c* as distinguished from the remainder of the set of text content 230 in FIG. 2E.

As illustrated in FIG. 2F, the electronic device 100 displays a fourth appearance of a fourth portion of the set of text content 230 that corresponds to text "jumped" 230*d*. The text "jumped" 230*d* is distinguished from the remainder of the set of text content 230. As further illustrated in FIG. 2F, the electronic device 100 obtains an input 246 (e.g., a tap gesture or tap input) at a location that corresponds to the CGR help affordance 224 in order to request the electronic device 100 to provide CGR-based help.

As illustrated in FIG. 2G, in response to obtaining the input 246, the electronic device 100 displays CGR content 247 representative of the text content "jumped" 230*d*. In some implementations, as illustrated in FIG. 2G, the electronic device 100 obtains pass-through image data (e.g., via an image sensor 143 in FIG. 1) indicative of a table 290 and displays augmented reality (AR) content 247 corresponding to a cat jumping onto the table 290 in order to provide a visual-based assistance. One of ordinary skill in the art will appreciate that, in some implementations, the electronic device 100 may display other CGR content, such as virtual reality (VR) content (e.g., without regard to the real physical world) and/or mixed reality (MR) content. One of ordinary skill in the art will appreciate that, in some implementations, the electronic device 100 may accompany the CGR content 247 with audio-based assistance (e.g., via the speaker 111) and/or other visual-based assistance.

As illustrated in FIG. 2H, the electronic device 100 displays a fifth appearance of a fifth portion of the set of text content 230 that corresponds to text "boots" 230*e*. The text "boots" 230*e* is distinguished from the remainder of the set of text content 230. As further illustrated in FIG. 2H, the electronic device 100 obtains an input 248 that at a location that corresponds to the image help affordance 222 in order to request the electronic device 100 to provide image-based help.

As illustrated in FIG. 2I, in response to obtaining the input 248, the electronic device 100 displays an image 249 that corresponds to a representation of a boot. The image 249 may be proximate to the corresponding text "boot" 230*e* in order to further aid with assistance. One of ordinary skill in the art will appreciate that the nature of the image (e.g., type and number of image(s), location, orientation, etc.) may be different according to different implementations. For example, in some implementations, the electronic device 100 displays a series of images (e.g., a video stream) in response to obtaining an input corresponding to the image help affordance 222.

As illustrated in FIGS. 2J-2M, the electronic device 100 modifies a set of text content 232 based on respective determined reading proficiency values associated with sets of obtained speech data corresponding to audio inputs. As illustrated in FIG. 2J, the electronic device 100 displays the set of text content 232 that corresponds to a later portion of the "Puss in Boots" story 212 as compared with FIGS. 2A-2I (e.g., such as the next page in the story). As further illustrated in FIG. 2J, the audio sensor 113 obtains an audio input 250 that corresponds to highlighted text "wonderful" 232*a* and converts the audio input 250 to speech data 250. The speech data 250 corresponds to a pronunciation of the text "wonderful" 232*a* that is not within an acceptable level of error (e.g., incorrect pronunciation).

Subsequently, as illustrated in FIG. 2K, the audio sensor 113 of the electronic device 100 obtains an audio input 252 that corresponds to the text "refuse" 232*b* and converts the audio input 252 to speech data 252. The speech data 252 corresponds to a pronunciation of the text "refuse" 232*b* that is not within an acceptable level of error (e.g., incorrect pronunciation).

Subsequently, as illustrated in FIG. 2L, the audio sensor 113 of the electronic device 100 obtains an audio input 254 that corresponds to the text "resolved" 232*c* and converts the audio input 254 to speech data 254. The speech data 254 corresponds to a pronunciation of the text "resolved" 232*c* that is not within an acceptable level of error (e.g., incorrect pronunciation).

Based on the three incorrectly pronounced word within the set of text content 232*s*, as described above with reference to FIGS. 2J-2L, the electronic device 100 determines that the reading proficiency value satisfies one or more change criteria. In response to determining that the reading proficiency value satisfies the one or more change criteria, the electronic device 100 changes a difficulty of the set of text content 232 in FIG. 2M. In some implementations, the electronic device 100 changes difficulty level of text content on a word-by-word basis. For example, in FIG. 2M the electronic device 100 changes the set of text content 232 that was displayed in FIG. 2L as follows: replaces the text "resolved" 232*c* with text "decided" 232*d*, replaces previously displayed text "parsley" with text "herbs" 232*e*, replaces previously displayed text "warren" with text "holes" 232*f*, and removes previously displayed text "greedy" as indicated by 232*g*. In this way, the electronic device 100 assists a user by reducing the difficulty of text content that is too difficult for the user.

In some implementations, rather than changing text content on a word-by-word basis, the electronic device 100 performs a more nuanced modification of text content. For example, as compared with FIG. 2L, the electronic device 100 changes the set of text content 232 by generating a simplified second paragraph 232h, which includes simplified words and sentence structure (e.g., shorter sentences), as illustrated in FIG. 2N.

In some implementations, rather than modifying portions of text content of the same story as was illustrated in FIGS. 2M and 2N, in response to determining satisfaction of the change criteria the electronic device 100 displays a different story associated with a different difficulty level. For example, the electronic device 100 replaces the text content 232 associated with the "Puss in Boots" story 212 in FIG. 2L with a set of text content 234 associated with a less complex "Humpty Dumpty" story (as indicated by title indicator 216) written by "Mother Goose" (as indicated by author indicator 214), as illustrated in FIG. 2O.

In some implementations, satisfaction of the change criteria results in more complex text content, such as more complex sentences, sentence structure, grammar, punctuation, and/or the like. For example, as illustrated in FIGS. 2P-2R, the audio sensor 113 of the electronic device 100 obtains audio inputs 256, 258, and 260 corresponding to correct pronunciations of respective distinguished text "Humpty" 234a, "horses" 234b, and "again" 234c. Because of the three correctly pronounced words, and optionally other correctly pronounced words with respect to the set of text content 234 not illustrated for the sake of brevity, the electronic device 100 determines that the reading proficiency value satisfies one or more change criteria. However, unlike with respect to the previous examples, the electronic device 100 determines that more (not less) complex text content is appropriate based on the satisfaction of the change criteria. Accordingly, in response to determining that the reading proficiency value satisfies the one or more change criteria, the electronic device 100 in FIG. 2S replaces the set of text content 234 associated with "Humpty Dumpty" 216 with a set of text content 236 associated with a different, more complex story, "The Lion & the Mouse" 219 written by "Aesop" 218.

Subsequently, as illustrated in FIG. 2T, the electronic device 100 displays text "unexpectedly" 236a with an appearance that is distinguished from the remainder of the text content 236. As further illustrated in FIG. 2T, the electronic device 100 obtains an input 262 at a location corresponding to the text "unexpectedly" 236a, such as an input to a touch-sensitive surface of the electronic device 100. For instance, a user may provide the input 262 because she wants help pronouncing the word "unexpectedly" 236a.

In response to detecting the input 262, the electronic device 100 plays, via the speaker 111, a speech sample 264 that corresponds to a proper pronunciation of the text "unexpectedly" in FIG. 2U. Alternatively, in some implementations, the electronic device 100 plays the speech sample 264 in response to obtaining an input corresponding to the auditory help affordance 220 (not shown). Moreover, the electronic device 100 displays a reading assistant interface 266 in FIG. 2U in response to detecting the input 262. The reading assistant interface 266 includes a pronunciation guide for the word "unexpectedly" 236a and an example usage of the text "unexpectedly" 236a in a sentence. One of ordinary skill in the art will appreciate that, in some implementations, the reading assistant interface 266 may include various other information related to the text "unexpectedly" 236a.

As illustrated in FIGS. 2V-2X, the audio sensor 113 of the electronic device 100 obtains respective audio inputs 268, 270, and 272 corresponding to correct pronunciations of distinguished text "unexpectedly" 236a, "Roused" 236b, and "angrily" 236c. Because of the three correctly pronounced words, and optionally other correctly pronounced words with respect to the text content 236 not illustrated for the sake of brevity, the electronic device 100 determines that the reading proficiency value satisfies one or more change criteria. In some implementations, the one or more change criteria is satisfied when, in addition enough correctly pronounced words, the words are read with sufficient fluency, articulation, and/or the like.

In response to determining that the reading proficiency value satisfies the one or more change criteria, the electronic device 100 increases a difficulty level associated with subsequent text content of the set of text content 236 in FIG. 2Y. Namely, as illustrated in FIG. 2Y, the electronic device 100 replaces the previously displayed text "begged" with text "pleaded" 236d, replaces previously displayed text "generous" with text "compassionate" 236e, and replaces previously displayed text "let the mouse go" with text "released the mouse" 236f. In this way, the electronic device 100 assists a user by increasing the difficulty of text content that may have been failing to sufficiently engage the attention of the user.

FIGS. 3A-3L are additional examples of a user interface 300 for a reading assistant in accordance with some implementations. As illustrated in FIGS. 3A-3L, the user interface 300 and associated processes are implemented on the portable multifunction device 100 shown in FIG. 1. However, one of ordinary skill in the art will appreciate that the user interface 300 may be implemented on another device, such as a device including greater or fewer of the components of the portable multifunction device 100 in FIG. 1.

As illustrated in FIGS. 3A-3F, the electronic device 100 obtains various inputs corresponding to various types of data. Based on the data, the electronic device 100 determines a reading proficiency value. The electronic device 100 may use the reading proficiency value to modify displayed text content in order to modify its difficulty level (e.g., to simplify for a struggling reader or make more challenging for a disengaged reader), distinguish an appearance of a portion of a set of text content from the remainder of the set of text content, etc. One of ordinary skill in the art will appreciate that the inputs described below with reference to FIGS. 3A-3F are merely illustrative and not exhaustive.

Figure 3A:
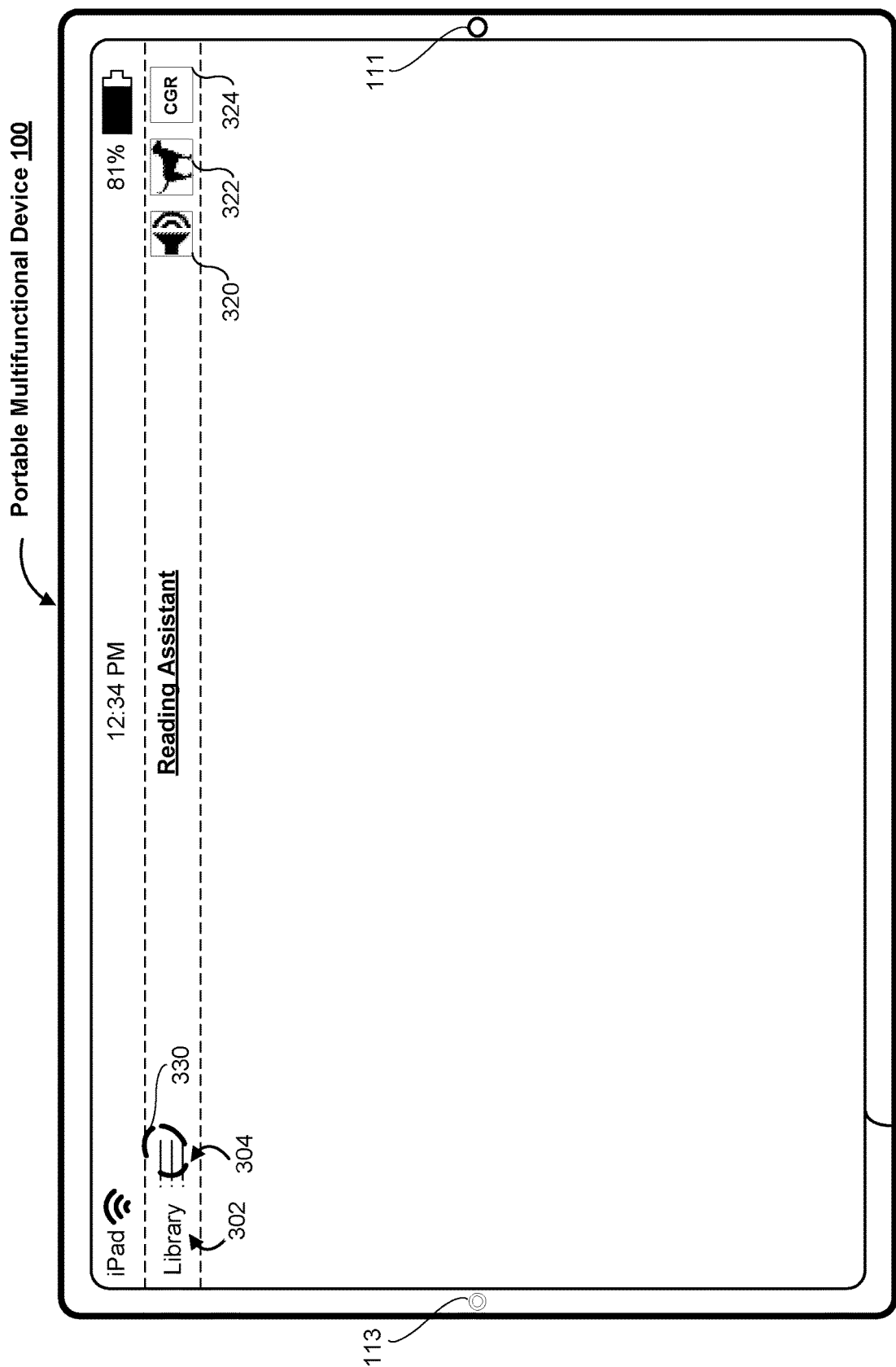
Figure 3B:
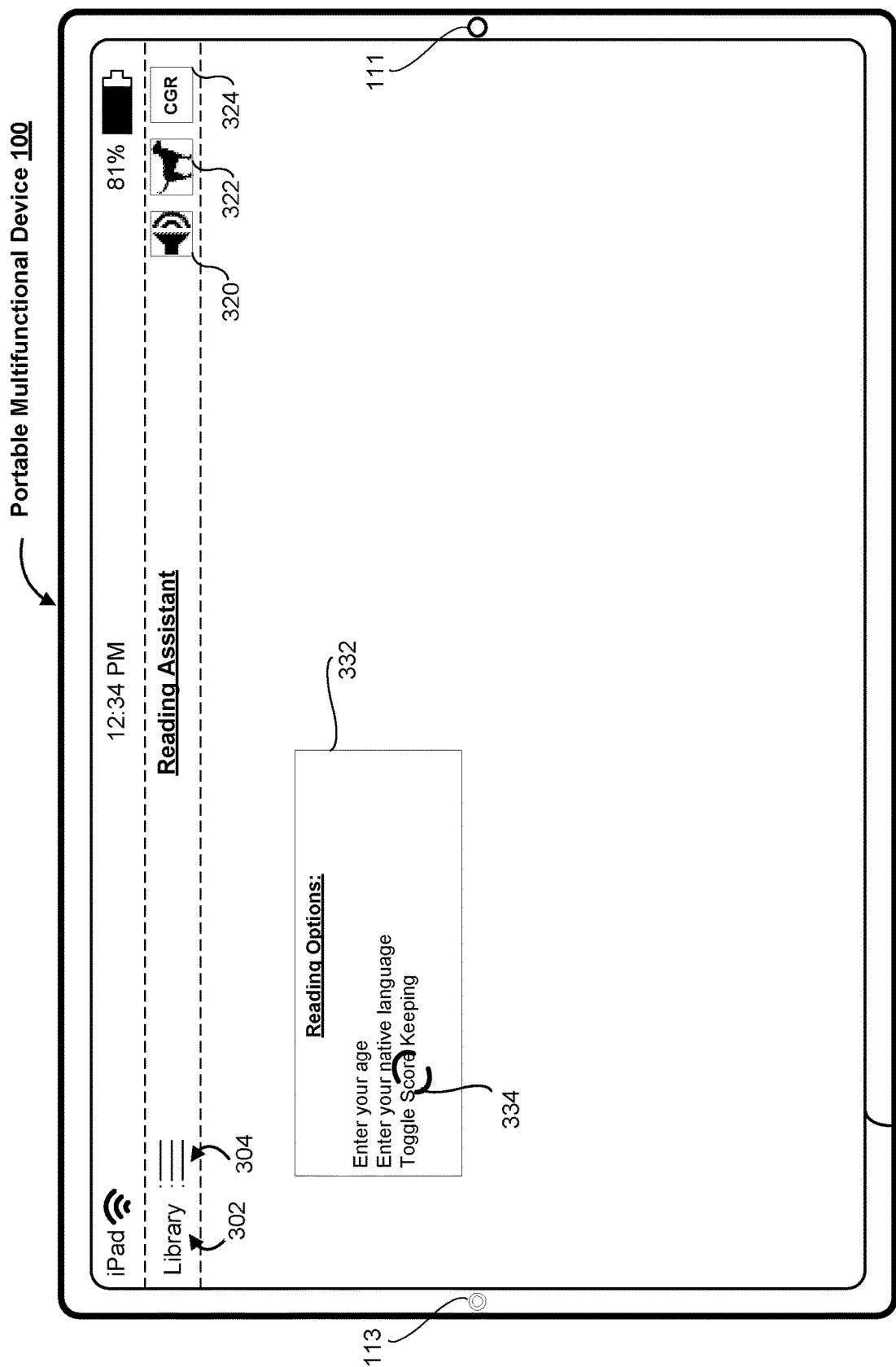
Figure 3D:
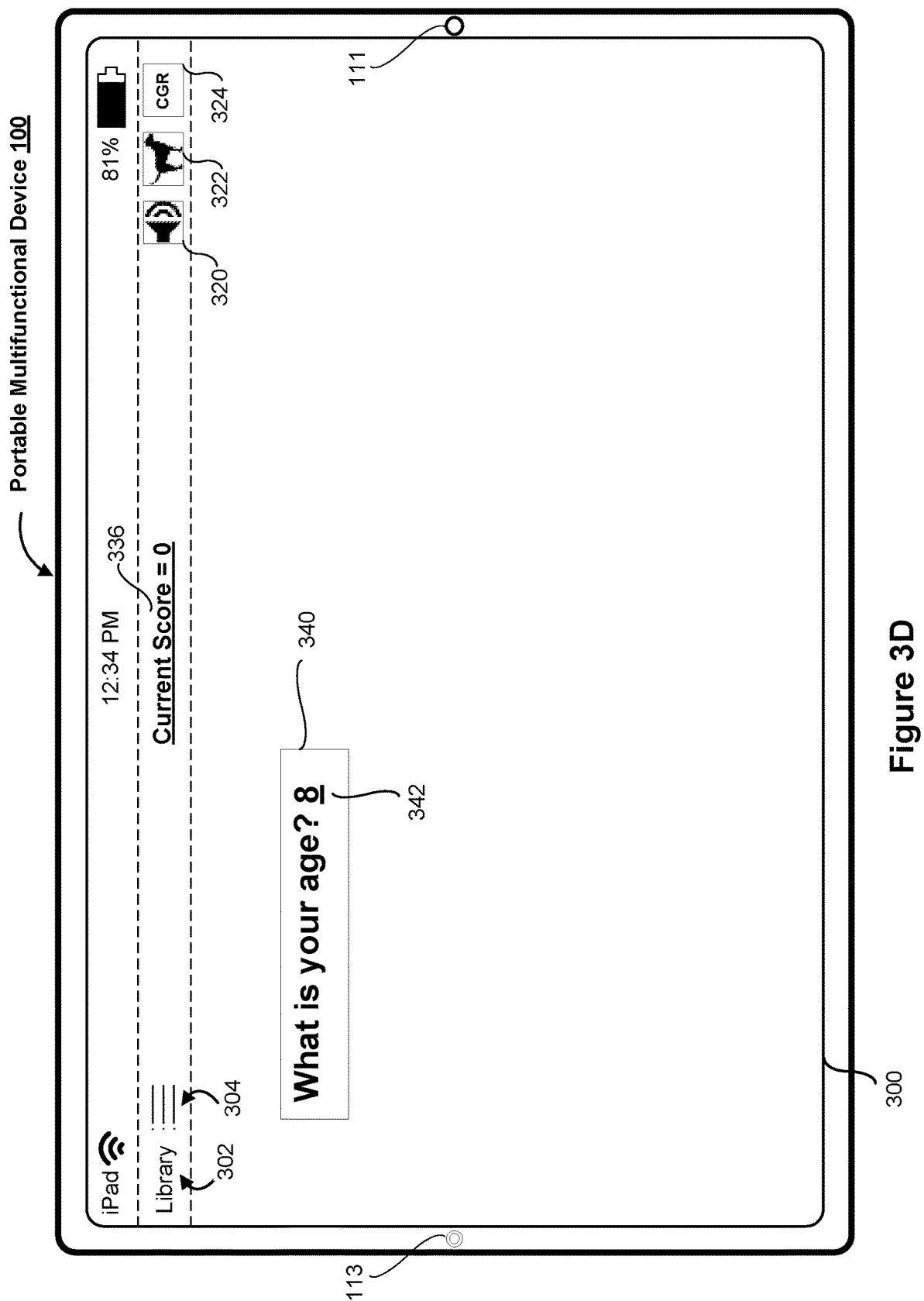

To that end, as illustrated in FIG. 3A, the electronic device 100 obtains an input 330 (e.g., a tap gesture) at a location corresponding to a context affordance 304. In response to obtaining the input 330 in FIG. 3A, the electronic device 100 displays an interface 332 in FIG. 3B. The interface 332 includes three affordances (or fields) for providing context data: "Enter your age;" "Enter your native language;" and "Toggle Score Keeping." One of ordinary skill in the art will appreciate that the interface 332 may include more or fewer affordances of various types. As illustrated in FIG. 3B, the electronic device 100 obtains an input 334 at a location corresponding to the "Toggle Score Keeping" affordance.

In response to obtaining the input 334 in FIG. 3B, the electronic device 100 enables a scoring mode, as indicated by displaying a score indicator 336 beginning with "Current Score" value of "0" in FIG. 3C. As will be described below, as uttered speech inputs corresponding to displayed text content are properly or improperly pronounced, the electronic device 100 modifies the score value associated with the score indicator 336. In effect, the score indicator 336 provides a gamification feature to the reading assistant in order to help stimulate a user's attention with displayed text content.

As further illustrated in FIG. 3C, the electronic device 100 obtains an input 338 corresponding to the "Enter your age"

affordance within the interface 332. In response to obtaining the input 338 in FIG. 3C, the electronic device 100 displays an age input interface 340 in FIG. 3D. The electronic device 100, in FIG. 3D, obtains an input 342 specifying eight years old as the age of the user (e.g., the reader). Based on the specified age, the electronic device 100 may display text content of an appropriate level of difficulty (e.g., complexity).

Figure 3E:
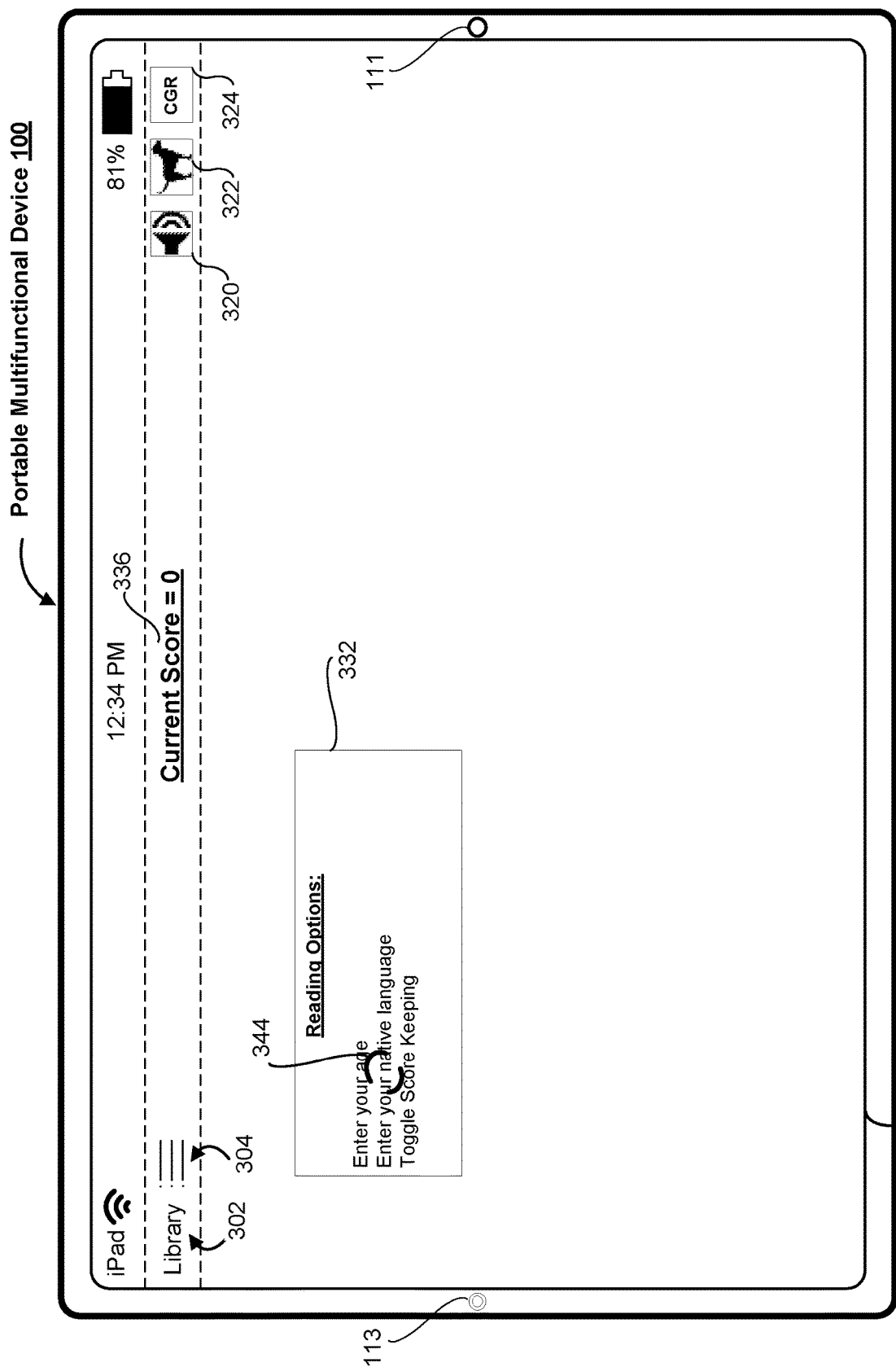
Figure 3F:
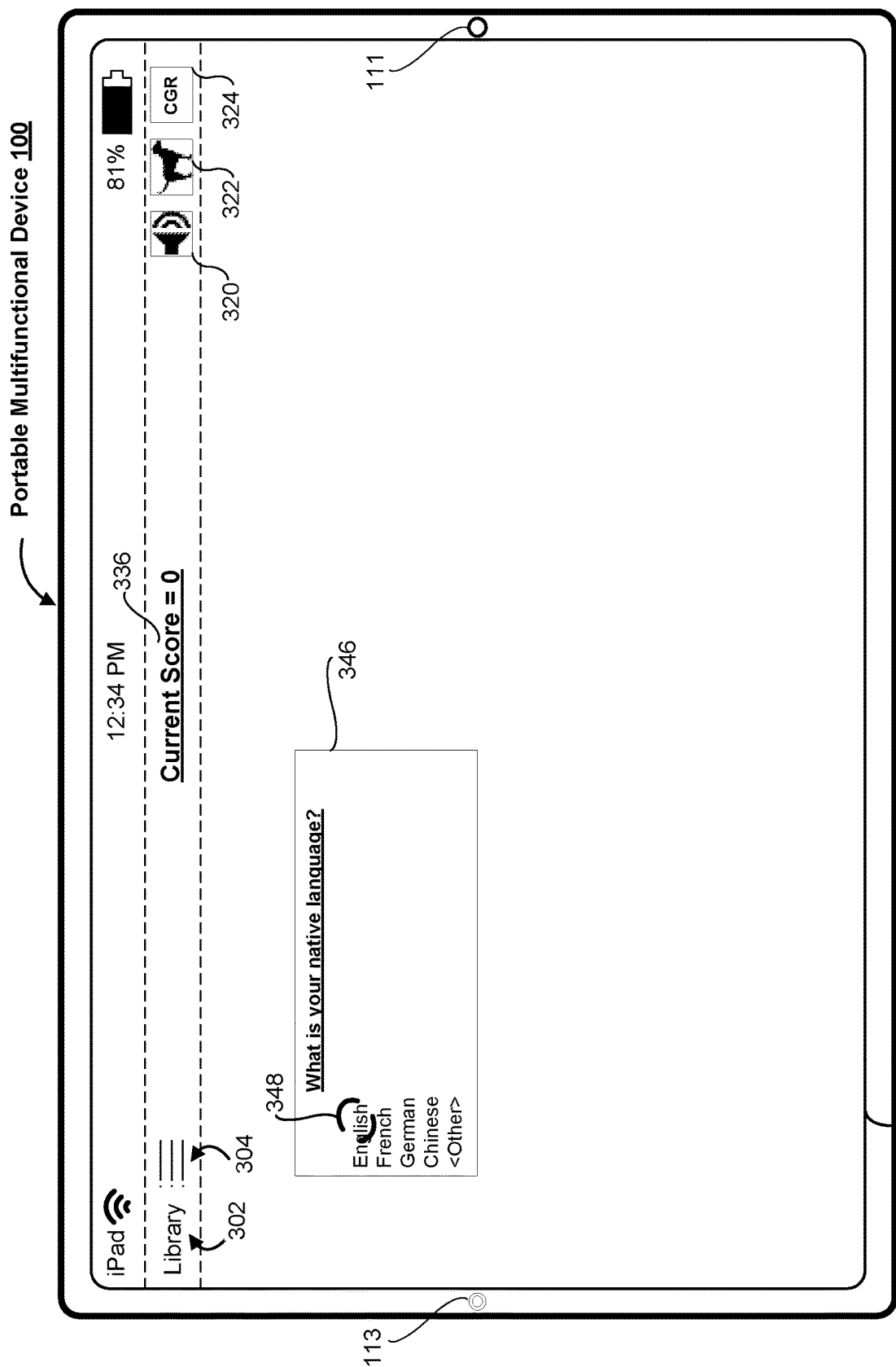

As illustrated in FIG. 3E, the electronic device 100 redisplays the interface 332 and obtains an input 344 corresponding to the "Enter your native language" affordance. In response to obtaining the input 344 in FIG. 3E, the electronic device 100 displays a native language input interface 346 in FIG. 3F including a plurality of language options. The electronic device 100, in FIG. 3F, obtains an input 348 specifying "English" as the native language of the user. In some implementations, based on the specified native language, the electronic device 100 displays text content of the same language. Although not illustrated, in some implementations, the interface 332 includes an affordance that enables a user to set the language of the displayed text content, which may not necessarily be the native language of the user. For example, the user may be attempting to learn a second language.

Figure 3G:
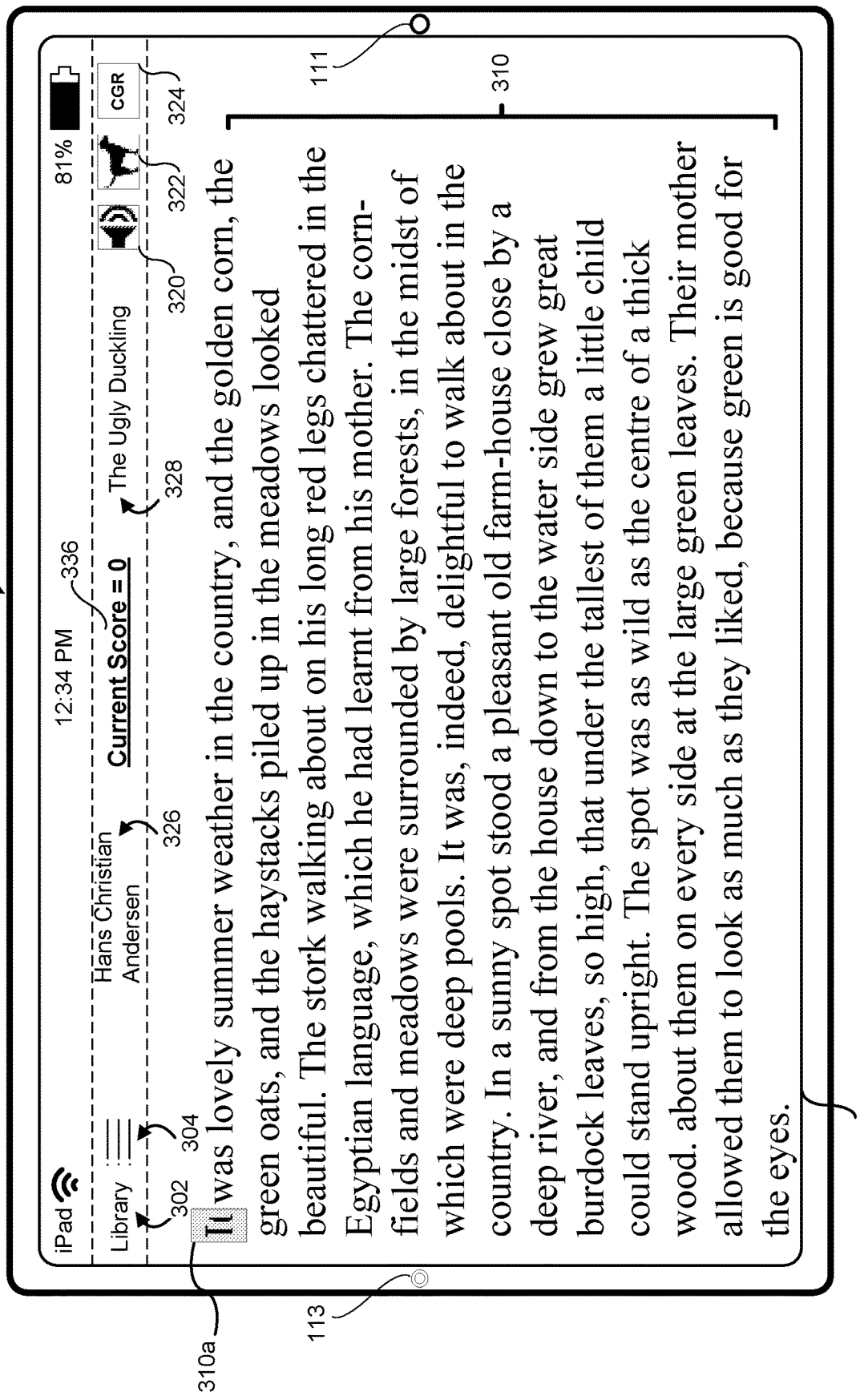

In response to obtaining the various data inputs, as described above with reference to FIGS. 3C-3F, the electronic device 100 displays a set of text content 310 in FIG. 3G. The set of text content 310 corresponds to "The Ugly Duckling" story 328 authored by "Hans Christian Andersen" 326.

Figure 3H:
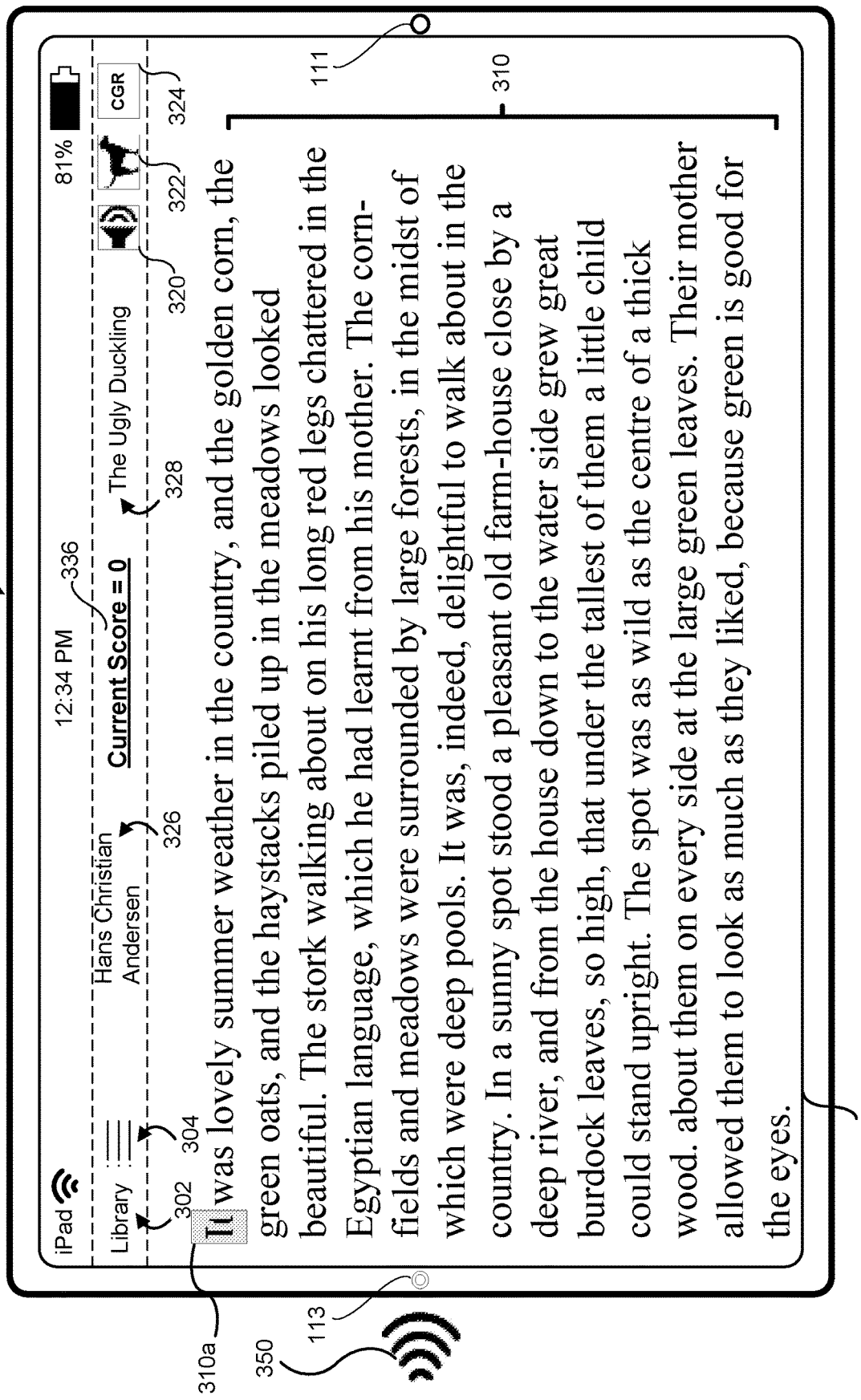

As illustrated in FIG. 3H, the electronic device 100 displays a first appearance of a first portion of the set of text content 310 that corresponds to text "It" 310a. As further illustrated in FIG. 3H, an audio sensor 113 of the electronic device 100 obtains speech data 350 corresponding to a correct pronunciation of the first portion of the set of text content 310 that corresponds to text "It" 310a. The first portion is distinguished from the remainder of the set of text content 310 that corresponds to text "It" 310a. Based on the text "It" 310a being properly pronounced, and optionally other portions of the set of text content 310 being properly pronounced (not illustrated for the sake of brevity), the electronic device 100 increases the score value to "4," as indicated by the score indicator 336 in FIG. 3I. One of ordinary skill in the art will appreciate that whether and how the score value changes may differ according to different implementations.

Figure 3I:
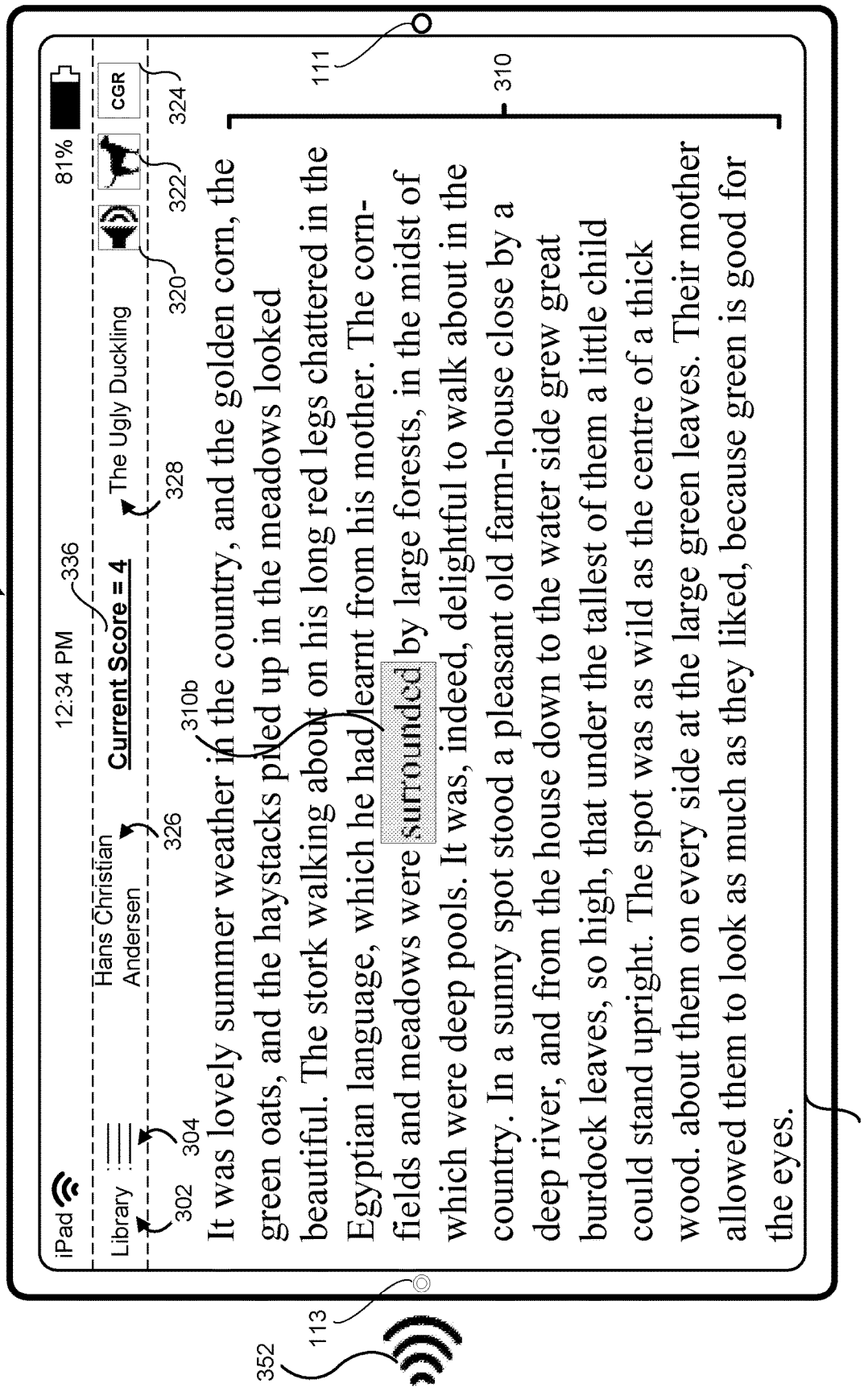

As illustrated in FIG. 3I, the electronic device 100 displays a second appearance of a second portion of the set of text content 310 that corresponds to text "surrounded" 310b. As further illustrated in FIG. 3I, the electronic device 100 displays text "surrounded" 310b as having a distinguished appearance from the remainder of the set of text content 310. As further illustrated in FIG. 3I, the audio sensor 113 of the electronic device 100 obtains speech data 352 corresponding to a correct pronunciation of distinguished text "surrounded" 310b of the set of text content 310. In response to determining that the speech data 352 corresponds to a correct pronunciation of text "surrounded" 310b, the electronic device 100 increases the score value to "5," as indicated by the score indicator 336 in FIG. 3J.

Figure 3J:
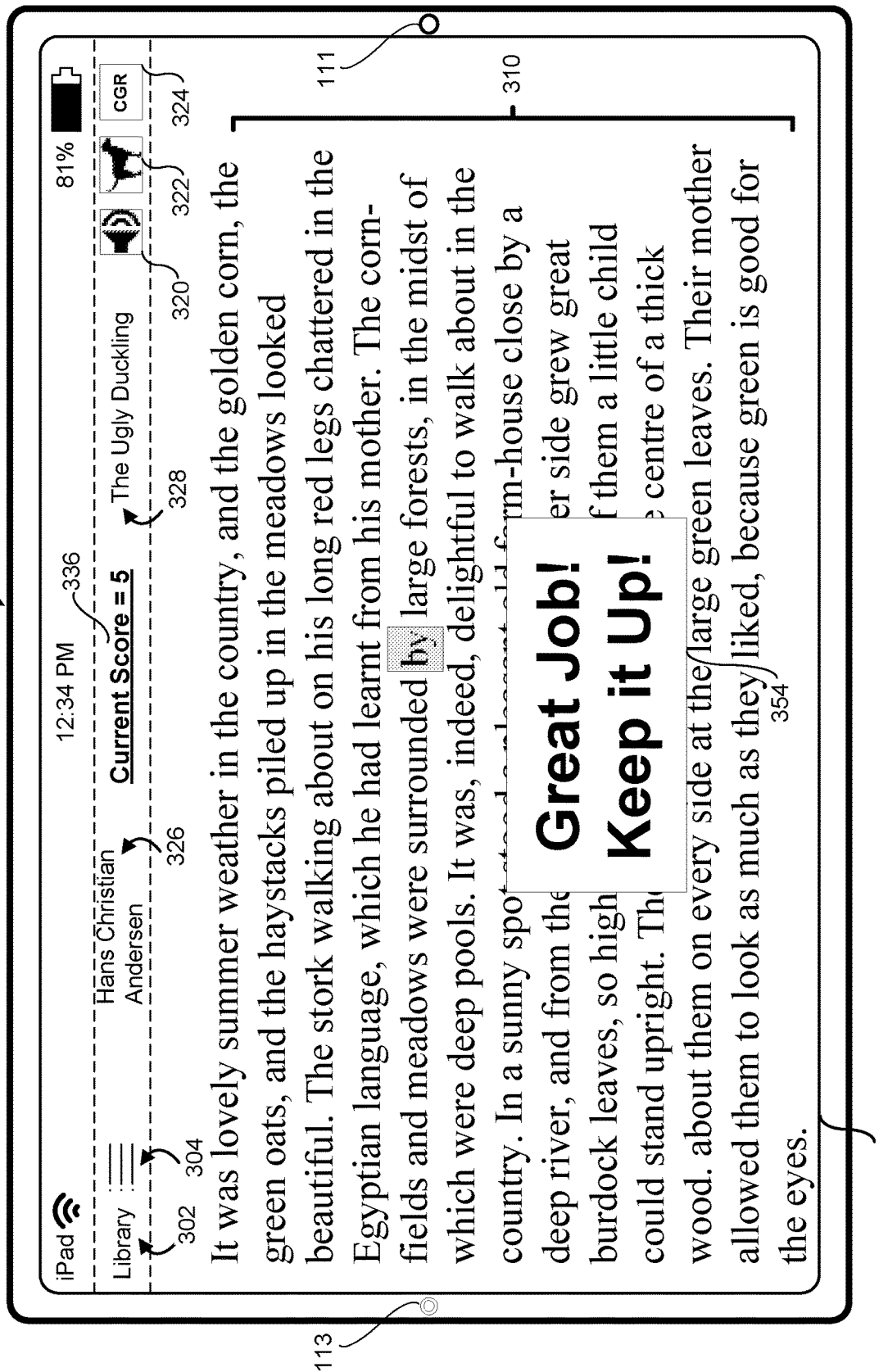

Moreover, the electronic device 100 displays a successful reading indication 354 in FIG. 3J. One of ordinary skill in the art will appreciate that, in some implementations, the successful reading indication 354 is accompanied by related audio from the speaker 111. The successful reading indication 354 may encourage a user to continue reading (e.g., attempting to correctly pronounce) subsequent text content. In some implementations, the electronic device 100 displays the successful reading indication 354 in response to a correct pronunciation of a sufficiently complex word(s). For example, in some implementations, the electronic device 100 displays the successful reading indication 354 when a correctly pronounced word has sufficiently more letters than the average number of letters of a given word in the displayed text. As another example, in some implementations, the electronic device 100 displays the successful reading indication 354 when a correctly pronounced word or phrase is known to be difficult to pronounce, such as a tongue twister or a multi-syllabic word. In some implementations, the electronic device 100 displays the successful reading indication 354 in response to pronunciation of successive words that satisfy a fluency criterion, such as a relatively few number of stutters and/or a relatively fast reading speed.

Figure 3K:
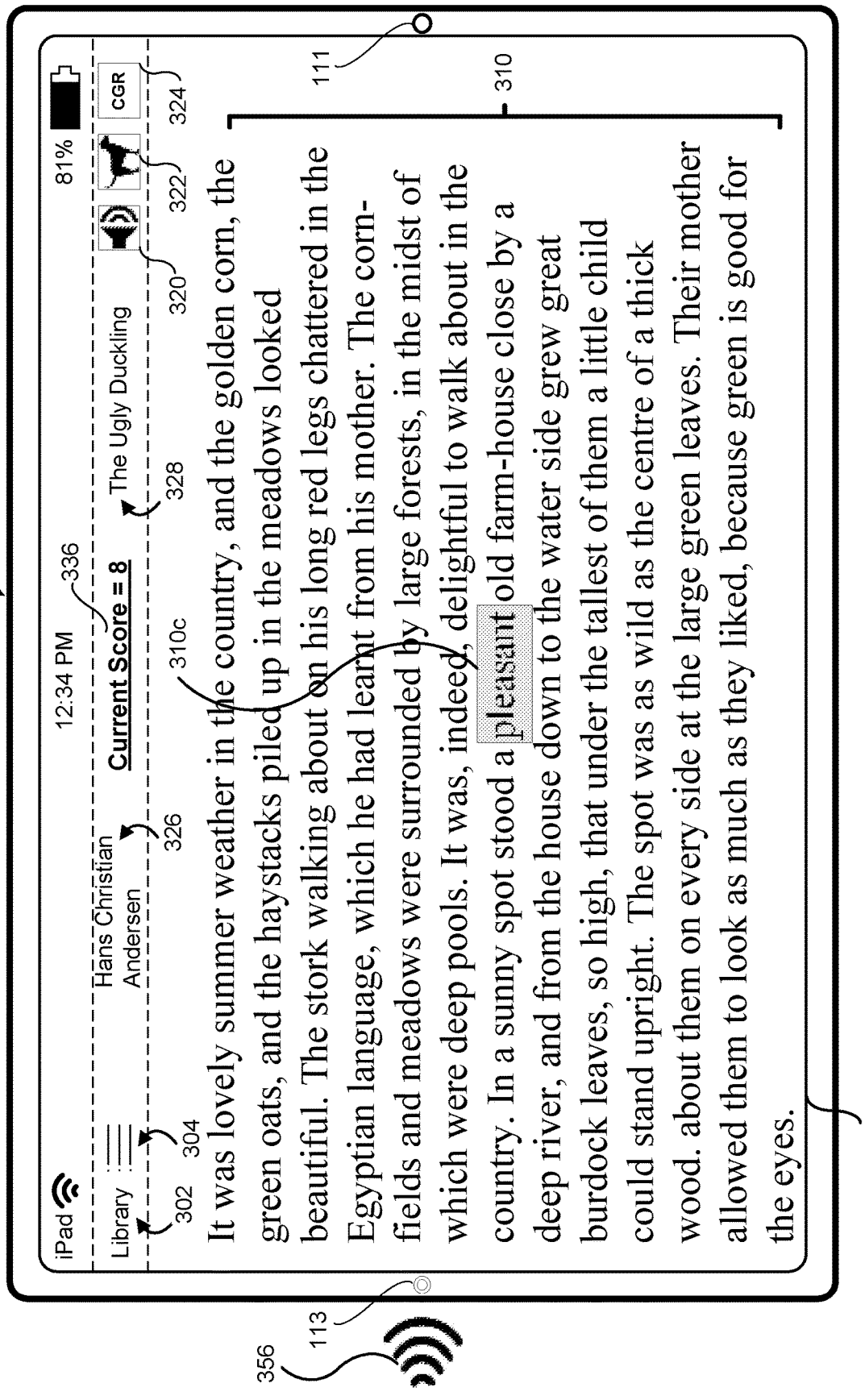
Figure 3L:
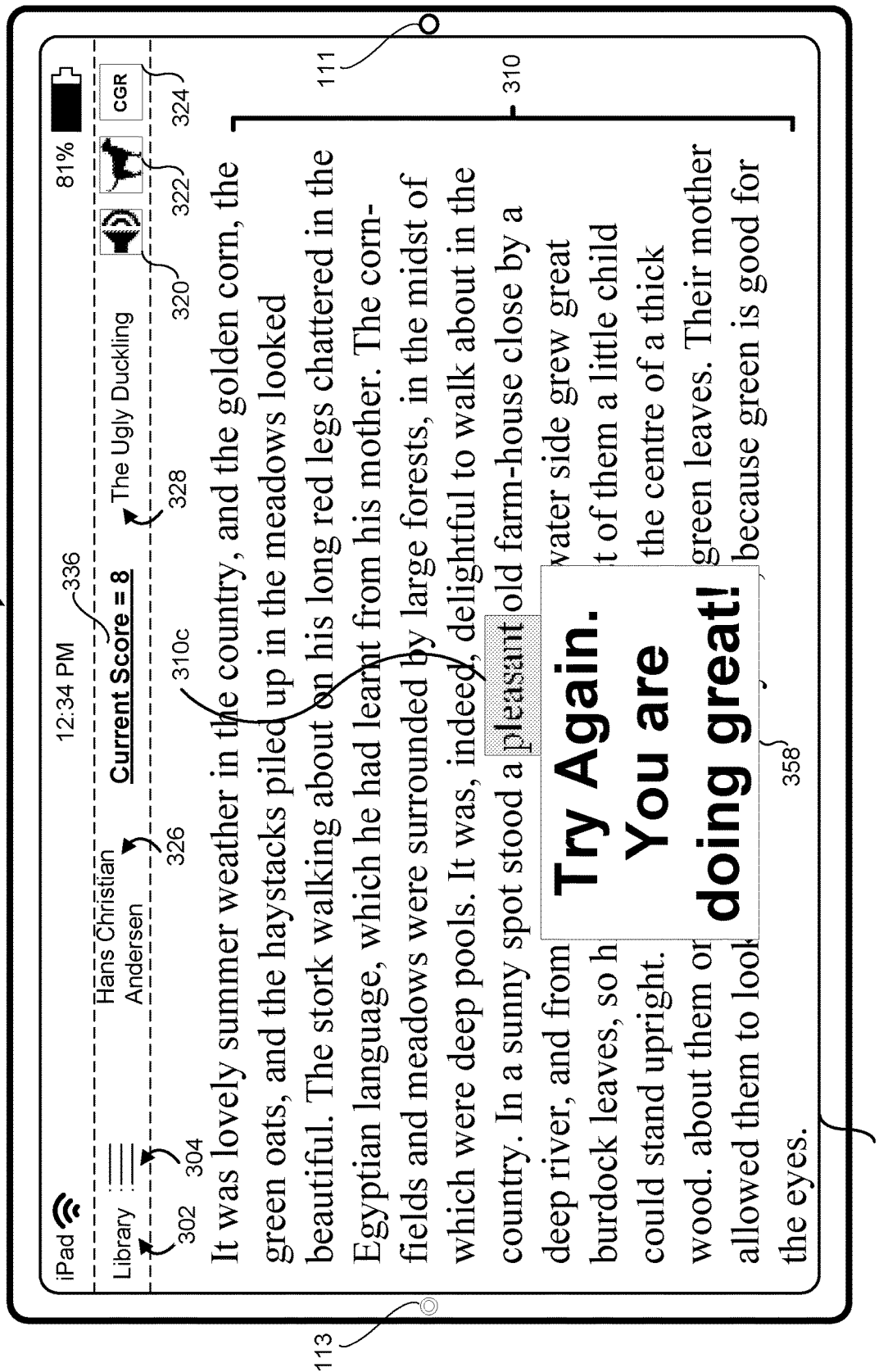

Subsequently, as illustrated in FIG. 3K, the electronic device 100 displays a third appearance of a third portion of the set of text content 310 that corresponds to text "pleasant" 310c. As further illustrated in FIG. 3K, the electronic device 100 displays text "pleasant" 310c as having a distinguished appearance from the remainder of the set of text content 310. Moreover, based on correct pronunciations of certain words, the electronic device 100 has increased the score value to "8," as indicated by the score indicator 336.

As further illustrated in FIG. 3K, the audio sensor 113 of the electronic device 100 obtains speech data 356 corresponding to an incorrect pronunciation of the text "pleasant" 310c. In response to determining speech data 356 is an incorrect pronunciation, the electronic device 100 displays an unsuccessful reading indication 358 to encourage the user to "Try Again" in FIG. 3L. As with the gamification feature implemented via the score indicator 336 and the successful reading indication 354, the unsuccessful reading indication 358 encourages a user to continue reading the set of text content 310. Accordingly, the electronic device 100 expends fewer processing and memory resources because the electronic device 100 obtains fewer input requests to terminate the reading assistant, switch to another application, and/or restart the reading assistant. One of ordinary skill in the art will appreciate that, in some implementations, the unsuccessful reading indication 358 is accompanied by related audio from the speaker 111.

Figure 4:
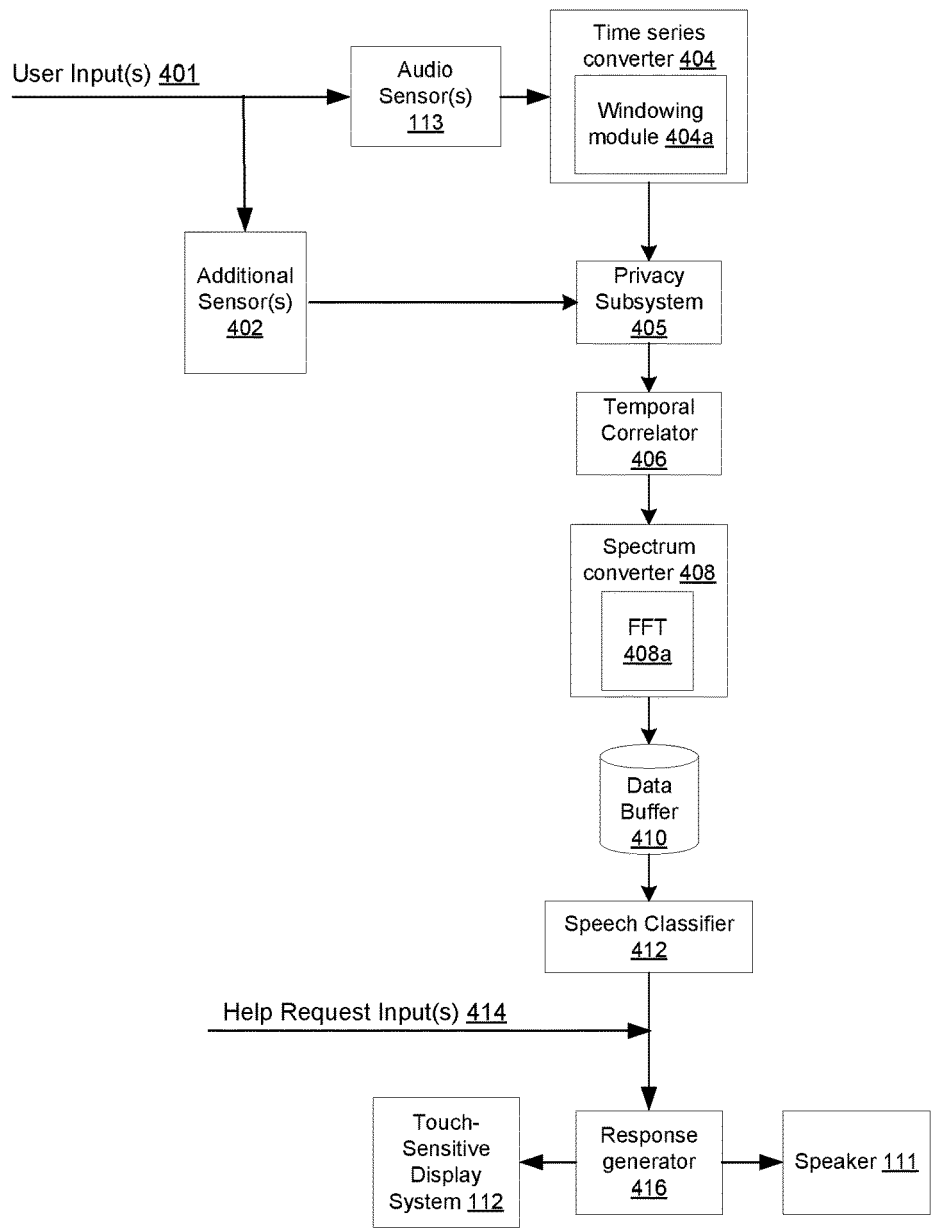
FIG. 4 is a block diagram of a reading assistant operating in run-time mode in accordance with some implementations.

FIG. 4 is a block diagram 400 of a reading assistant operating in run-time mode in accordance with some implementations. In various implementations, the block diagram 400 includes some or all of the components of the electronic device 100 in FIG. 1. For example, in some implementations, the additional sensor(s) 402 of the block diagram 400 include one or more of the touch-sensitive display system 112, image sensor(s) 143, contact intensity sensor(s) 165, eye tracking sensor(s) 164, or other input or control devices 116 in FIG. 1. As another example, in some implementations, the block diagram 400 includes a memory 102, a peripherals interface 118, processing unit(s) 120, and a memory controller 122 for processing and storage resources. These processing and storage resources facilitate, for example, obtaining and storing data, determining a reading proficiency value based on the data, and changing displayed text content in order to change a difficulty level associated with the text content.

In various implementations, the block diagram 400 or portions thereof are included in a device or system enabled with one or more machine-listening applications, such as a communication device included in an autonomous vehicle, a computer; a laptop computer; a tablet device; a mobile phone; a smartphone; a wearable (e.g., a smart watch); a gaming device; a hearing aid; an Internet-of-things (IoT) device; a computer generated reality (CGR) device (e.g., HMD, heads-up display) that displays CGR content, such as augmented reality (AR) content, virtual reality (VR) content, and/or mixed-reality content (MR) content; and/or the like.

While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the block diagram 400 can be combined into one or more systems and/or further sub-divided into additional subsystems; and, that the functionality described below is provided as merely one example configuration of the various aspects and functions described herein.

To that end, as a non-limiting example, the block diagram 400 includes one or more audio sensors 113, the additional sensor(s) 402, a time series converter 404, a privacy subsystem 405, a temporal correlator 406, a spectrum converter 408, a data buffer 410, a speech classifier 412, help request input(s) 414, a response generator 416, a touch-sensitive display system 112, and a speaker 111.

The audio sensor(s) 113 (e.g., microphone(s)) detect speech inputs corresponding to sound, such as human speech. The speech inputs are included in user input(s) 401. The audio sensor(s) 113 are provided to receive and convert the sound into speech data that can be stored in a non-transitory memory, which hereinafter is sometimes referred to as audible signal data. In some situations, audible signal data (e.g., speech data) is captured from within an adverse acoustic environment, and thus likely includes ambient noise, interfering sounds, background chatter, and/or the like in addition to a target voice of interest.

In many applications, the audio sensor(s) 113 provide the audible signal data as an ongoing or continuous time series of values. In turn, the times series converter 404 is configured to generate two or more temporal frames of audible signal data from a continuous stream of audible signal data. Each temporal frame of audible signal data includes a temporal portion of the audible signal received by the audio sensor(s) 113. In some implementations, the times series converter 404 includes a windowing module 404a that is configured to mark and separate one or more temporal frames or portions of the audible signal data for times t1, t2, . . . , tn. In some implementations, each temporal frame of the audible signal data is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of the audible signal data. Additionally and/or alternatively, in some implementations, the windowing module 404a is configured to retrieve the audible signal data from a non-transitory memory. Additionally and/or alternatively, in some implementations, pre-filtering includes filtering the received audible signal using a low-noise amplifier (LNA) in order to substantially set a noise floor for further processing. In some implementations, a pre-filtering LNA is arranged between the audio sensor(s) 113 and the time series converter 404. Those of ordinary skill in the art will appreciate that numerous other pre-filtering techniques may be applied to the received audible signal, and those highlighted herein are merely examples of numerous pre-filtering options available.

The one or more additional sensor(s) 402 detect corresponding one or more additional user inputs included in the user input(s) 401. The additional sensor(s) 402 may include one or more of the touch-sensitive display system 112, the image sensor(s) 143, the contact intensity sensor(s) 165, the eye tracking sensor(s) 164, or the other input or control devices 116 in FIG. 1. For example, in some implementations, the additional sensor(s) 402 include downward or exterior-facing image sensor(s) (e.g., camera(s)) that detect body language of a user, such as body pose information and facial expressions and features of the user. Body language may be indicative of a user's level of engagement with displayed text content. For example, crossed-arms sometimes indicate that the user is uncomfortable with a situation, and therefore may be unmotivated to read the text content. Accordingly, the reading assistant may change difficulty of displayed text content. As another example, a smile may indicate that the user is enjoying reading the text content.

In some implementations, the additional sensor(s) 402 include an eye tracking sensor that detects eye movements of the user. The block diagram 400 may utilize eye position, eye movements, and/or eye movement patterns of the user in order to determine the extent to which the user is focused on the displayed text content. Moreover, eye movements may indicate a reading style of a user, such as whether and how much a user is scanning past the distinguished (e.g., highlighted) text content.

In various implementations, the block diagram 400 includes a privacy subsystem 405 that includes one or more privacy setting filters associated with user information, such as information included in the user input(s) 401, and/or identifying information. In some implementations, the privacy subsystem 405 selectively prevents and/or limits the block diagram 400 or portions thereof from obtaining and/or transmitting the user information. To this end, the privacy subsystem 405 receives user preferences and/or selections from the user in response to prompting the user for the same. In some implementations, the privacy subsystem 405 prevents the block diagram 400 from obtaining and/or transmitting the user information unless and until the privacy subsystem 405 obtains informed consent from the user. In some implementations, the privacy subsystem 405 anonymizes (e.g., scrambles or obscures) certain types of user information. For example, the privacy subsystem 405 receives user inputs designating which types of user information the privacy subsystem 405 anonymizes. As another example, the privacy subsystem 405 anonymizes certain types of user information likely to include sensitive and/or identifying information, independent of user designation (e.g., automatically).

The temporal correlator 406 is provided to correlate speech data provided by the audio sensor(s) with additional data provided by the additional sensor(s) 402. In some implementations, the temporal correlator 406 correlates speech data with video data, such as body language video data, and/or gaze-tracking data.

In some implementations, the temporal correlator 406 cooperates with the times series converter 404 in correlating speech data with other data. For example, in some implementations, the temporal correlator 406 generates two or more temporal frames of correlated data from a continuous stream of various types of data, including audible signal data, eye gaze data, body language data, and/or the like. In some implementations, the temporal correlator 406 utilizes the temporal frames of audible signal data generated by the times series converter 404. Utilizing video inputs that are provided concurrently with or contemporaneously with audio inputs (e.g., speech) may aid the speech classifier 412 in determining in a more accurate determined reading proficiency value than by utilizing audio inputs divorced from the video inputs. For example, a user may make a certain facial tic when reading a certain phoneme, which may help to inform the reading proficiency value.

The spectrum converter 408 operates to generate a corresponding frequency domain representation for each of the one or more correlated temporal frames generated by the temporal correlator 406, so that one or more spectral characteristics of the correlated data can be determined for each frame. In some implementations, the frequency domain representation of a temporal frame includes at least one of a plurality of sub-bands contiguously distributed throughout the frequency spectrum associated with voiced sounds. In some implementations, for example, the spectrum converter 408 includes a Fast Fourier Transform (FFT) sub-block 408a. In some implementations, a 32-point short-time FFT is used for conversion into the frequency domain. Those of ordinary skill in the art will appreciate that any number of FFT implementations are used in various implementations. In various implementations, the FFT module 408a may also be replaced with a Goertzel module. Additionally and/or alternatively, the FFT module 408a may also be replaced with any suitable implementation of a wavelet decomposition module, constant-Q transform and/or a set of redundant basis function modules configured to capture pertinent spectral characteristics of the input signal. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame in the frequency domain. The frequency domain representations of the one or more frames are stored in the data buffer 410.

The speech classifier 412 determines one or more linguistic features within the speech data (e.g., the audible signal data) associated with a set of text content. According to various implementations, the linguistic features include a phoneme, a syllable, a word, multiple words, a phrase, an excerpt, and/or the like.

In response to completion of the speech data associated with the set of text content, the response generator 416 determines a reading proficiency value associated with the set of text content. The reading proficiency value is based on the one or more linguistic features. For example, with reference to FIGS. 2B and 2D, the response generator 416 determines a relatively low reading proficiency value because of the two incorrect pronunciations 242 and 244 of the word "sorrowful" 230b. In response to determining the relatively low reading proficiency value, the response generator 416 generates corresponding text content to be displayed via the touch-sensitive display system 112. Continuing with the previous example, the response generator 416 modifies, via the touch-sensitive display system 112, the set of text content 230 in order to reduce a difficulty associated with the set of text content 230, as is illustrated by inserted simplified text "sad" 230e in FIG. 2E. As another example, in some implementations, the response generator 416 modifies the set of text content in order to increase a difficulty associated with the set of text content. As yet another example, in some implementations, the response generator 416 plays a speech sample (e.g., the speech sample 243 in FIG. 2C), via the speaker 111, in order to provide a proper pronunciation to the user.

In some implementations, the response generator 416 utilizes help request input(s) 414. As an example, in response to obtaining an input 246 that corresponds to the CGR help affordance 224 in FIG. 2F, the response generator 416 displays, via the touch-sensitive display system 112, CGR content 247 corresponding to the highlighted word "jumped" 230d. As another example, in response to obtaining an input 262 that corresponds to text "unexpectedly" 236a in FIG. 2T, the response generator 416 displays, via the touch-sensitive display system 112, a reading assistant interface 266 in FIG. 2U that includes information to assist pronunciation.

Figure 5:
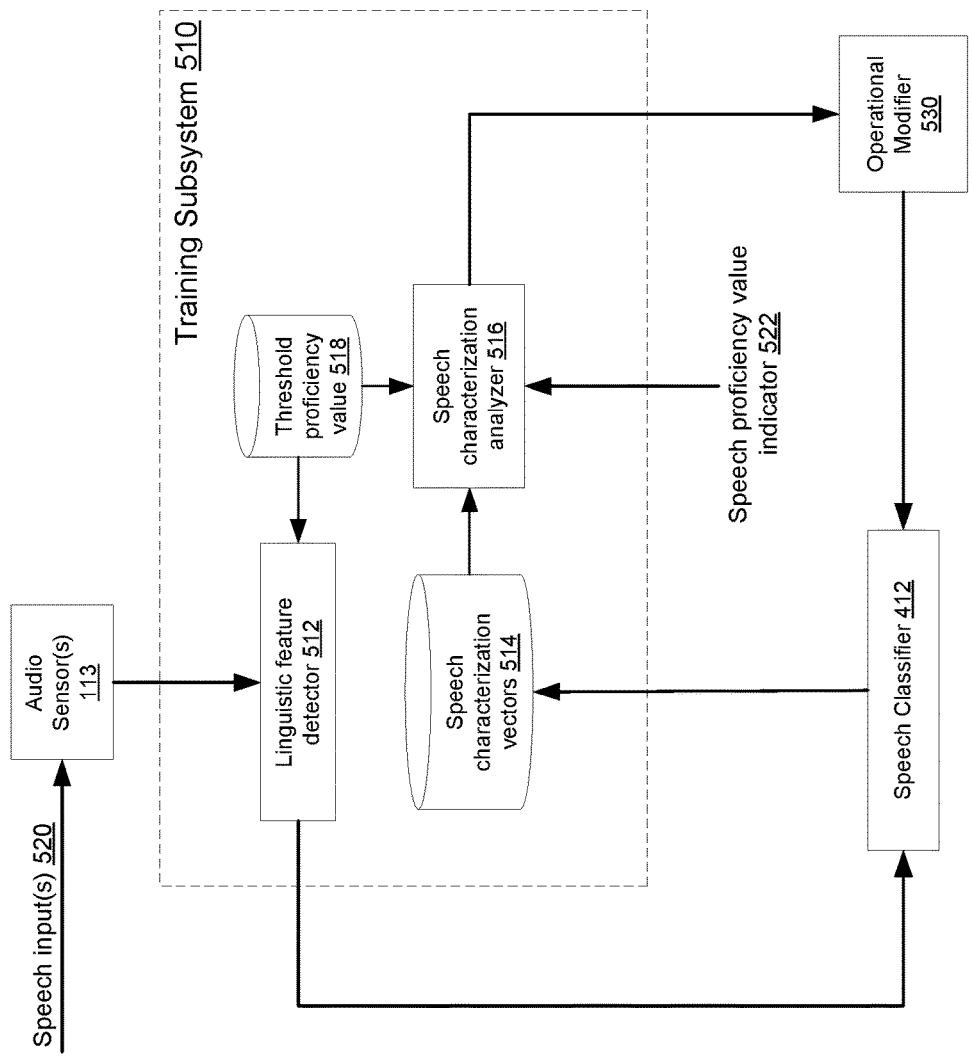
FIG. 5 is a block diagram including a training subsystem to train a speech classifier in accordance with some implementations.

FIG. 5 is a block diagram 500 including a training subsystem 510 to train the speech classifier 412 in accordance with some implementations. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the block diagram 500 can be combined into one or more systems and/or further subdivided into additional subsystems; and, that the functionality described below is provided as merely one example configuration of the various aspects and functions described herein.

To that end, as a non-limiting example, the block diagram 500 includes a training subsystem 510, speech input(s) 520, a speech proficiency value indicator 522, an operational modifier 530, and the speech classifier 412. In some implementations, the speech classifier 412 or portions thereof are similar to and adapted from the speech classifier 412 in FIG. 4.

The training subsystem 510 obtains the speech proficiency value indicator 522 that is indicative of a speech proficiency value. In some implementations, the speech proficiency value indicator 522 is indicative of a diminished speech proficiency, such as a child learning to read a native language or an adult learning to read a new language. As will be detailed below, the speech proficiency value indicator 522 may include a variety of data, such as speech data (e.g., indicating an accent); image data (e.g., indicating the user is short and thus is likely a child); context data (e.g. age information obtained from the user, the installed applications on the electronic device 100, etc.); and/or the like.

The training subsystem 510 further obtains speech data from the audio sensor(s) 113 based on the speech input(s) 520. In some implementations, the training subsystem 510 obtains the speech data in response to determining that the speech proficiency value indicator 522 satisfies a threshold proficiency value 518.

The training subsystem 510 includes a linguistic feature detector 512. The linguistic feature detector 512 detects linguistic features within the speech data. In some implementations, the linguistic feature detector 512 detects the linguistic features in response to determining that the speech proficiency value indicator 522 satisfies the threshold proficiency value 518. In some implementations, the linguistic feature detector 512 includes a speech detector and/or an automatic speech recognizer. Although not illustrated in FIG. 5, in some implementations, the linguistic feature detector 512 or portions thereof are included in (e.g., integrated within) the speech classifier 412. The linguistic feature detector 512 may provide the linguistic features to the speech classifier 412.

The speech classifier 412 classifies the speech data provided by the audio sensor(s) 113. Namely, the speech classifier 412 generates speech characterization vectors (optionally stored in datastore 514) based on the linguistic features within with the speech data. For example, with reference to FIG. 6, the speech classifier 412 generates a speech characterization vector 610-1. The speech characterization vector 610-1 includes a first speech data portion 620-1 corresponding to a word, words, or part of a word, and includes various values that characterize the first speech data portion 620-1. Additional details about contents of the speech characterization vectors are provided below with reference to FIG. 6. In some implementations, the speech classifier 412 corresponds to a neural network. In some implementations, the speech classifier 412 utilizes natural language processing (NLP) in order to generate the speech characterization vectors based on the speech data.

The training subsystem 510 includes a speech characterization analyzer 516. In some implementations, the speech characterization analyzer 516 generates speech characterization values based on a speech proficiency value as indicated by the speech proficiency value indicator 522. For example, in some implementations, in response to determining that the speech proficiency value indicator 522 indicates a diminished speech proficiency (e.g., a young child, a user with speech impediments, a non-native language speaker), the speech characterization analyzer 516 generates correspondingly low speech characterization values. For example, the speech characterization analyzer 516 generates a relatively low speech fluency value based on image data and/or speech data indicating that the user is a child.

In some implementations, the speech characterization analyzer 516 generates speech characterization values based on the values within the speech characterization vectors 514 generated by the speech classifier 412. For example, the speech characterization analyzer 516 generates speech characterization values associated with particular categories (e.g., fluency, accent, intonation, accuracy, etc.) that are associated with the values within the speech characterization vectors.

In some implementations, the speech characterization analyzer 516 compares the speech characterization vectors 514 and the speech characterization values. Based on the comparison, the speech characterization analyzer 516 directs the operational modifier 530 to adjust one or more operational values of the speech classifier 412. In some implementations, the speech characterization analyzer 516 directs the operational modifier 530 to adjust the one or more operational values of the speech classifier 412 in response to determining that the speech proficiency value indicator 522 satisfies a threshold proficiency value 518.

The operational modifier 530 adjusts the one or more operational values of the speech classifier 412 based on the comparison between the one or more speech characterization vectors 514 and the speech proficiency value. Adjusting the one or more operational values of the speech classifier 412 effectively trains the speech classifier 412.

FIG. 6 are examples of representations 600 of speech characterization vectors 610-1, . . . , 610-M according to some implementations. Each of the speech characterization vectors 610-1, . . . , 610-M quantitatively characterizes a corresponding portion of speech data. With reference to FIG. 5, above, in some training-mode implementations, the speech classifier 412 generates speech characterization vectors based on corresponding speech data obtained from the audio sensor(s) 113.

Each of the speech characterization vectors 610-1, . . . , 610-M is associated with a corresponding portion of speech data, as well as a plurality of values and/or sub-values that quantitatively characterizes the corresponding portion of speech data. The speech data may include a portion of a word (e.g., syllable, phoneme), a word, or multiple words (e.g., a phrase, idiom, or the like). As an example, the speech characterization vector 610-2 is associated with speech data "um, the co-co-co-cookie is bbbbroown." The speech characterization vector 610-2 includes a low fluency value 630a-2 and a low articulation value 630c-2 because of the extraneous word ("um"), prolongation ("bbbbroown"), and stuttering ("co-co-co-cookie"). As another example, the speech characterization vector 610-3 is associated with speech data "what is your name?" The speech characterization vector 610-3 includes a high fluency value 630a-3 and a high articulation value 630c-3, and an intonation value 630b-3 that indicates an upward inflection that characterizes the inquisitive nature of the speech data.

Figure 7A:
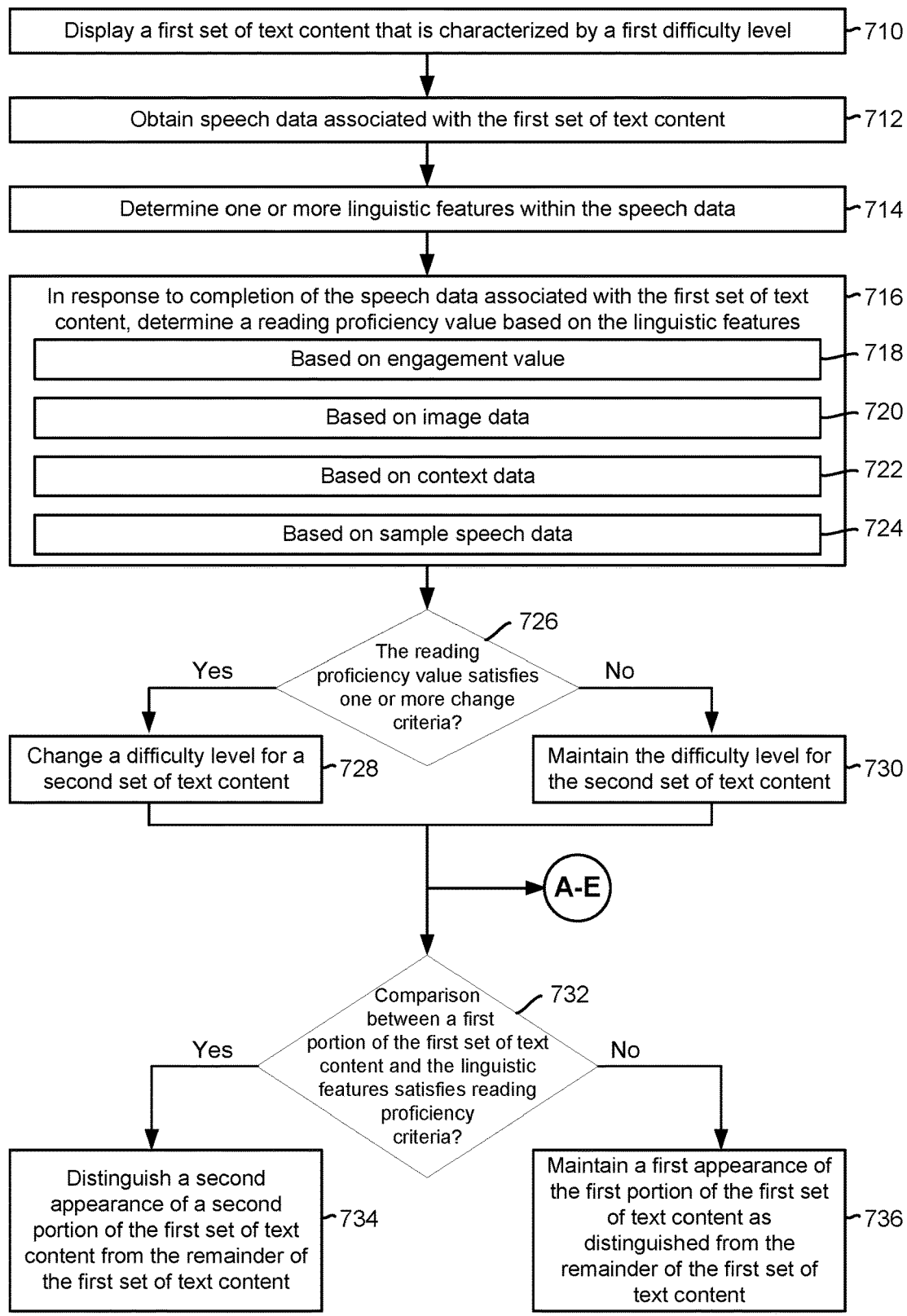
FIGS. 7A and 7B are a flow diagram of a method of providing reading assistance according to some implementations.
Figure 7B:
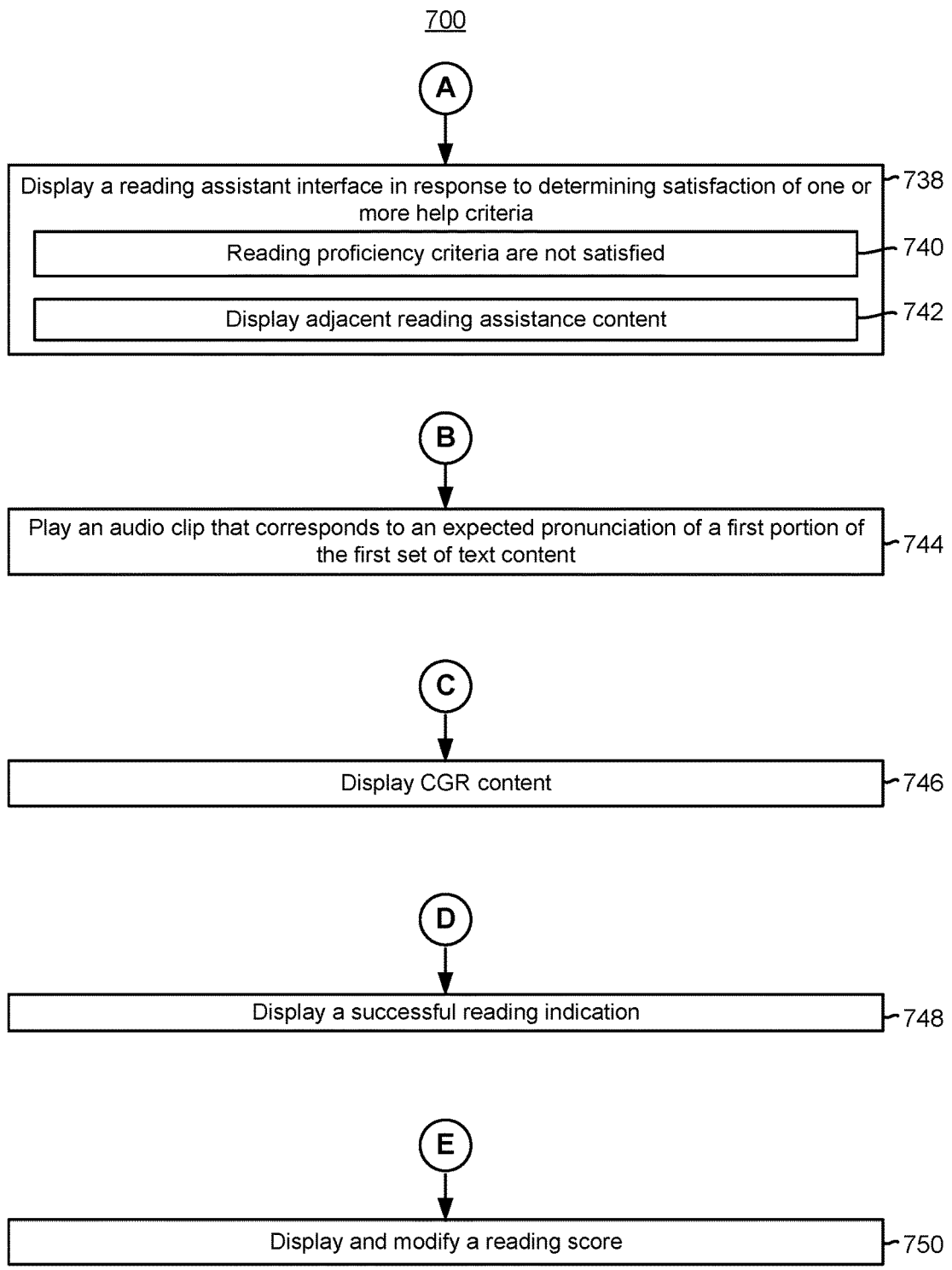

FIGS. 7A and 7B are a flow diagram of a method 700 of a reading assistant according to some implementations. In various implementations, the method 700 or portions thereof are performed by the block diagram 400 in FIG. 4. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes utilizing a reading proficiency value to affect a difficulty level associated with displayed text content.

With reference to FIG. 7A, as represented by block 710, the method 700 includes displaying, via a display device, a first set of text content that is characterized by a first difficulty level. The first set of text content may correspond to portions of a story, a poem, an online article, and/or the like. In some implementations, the first set of text content is displayed within a user interface, such as within the user interface 200 in FIG. 2A. As one example, with reference to FIG. 2A, the first set of text content corresponds to a portion of "Puss in Boots" 230.

As represented by block 712, the method 700 includes obtaining speech data associated with the first set of text content from an audio sensor. As one example, with reference to FIG. 2J, the audio sensor 113 of the electronic device 100 obtains speech data 250 corresponding the set of text content 232, and specifically, a first portion of the set of text content 232 that corresponds to text content "wonderful" 232a. The text "wonderful" 232a has a first appearance that is distinguished from the remainder of the set of text content 232.

As represented by block 714, the method 700 includes determining one or more linguistic features within the speech data. The linguistic features may be a combination of words, sentences, paragraphs, syllables, phonemes, etc. In some implementations, a speech classifier (e.g., the speech classifier 412 in FIG. 4) determines the linguistic features.

As represented by block 716, the method 700 includes, in response to completion of the speech data associated with the first set of text content, determining a reading proficiency value associated with the first set of text content. The reading proficiency value is based on the one or more linguistic features. In some implementations, a response generator (e.g., the response generator 416 in FIG. 4) determines the reading proficiency value. According to a variety of implementations, the reading proficiency value is based on linguistic features of a distinguished (e.g., highlighted, underlined, italicized, etc.) portion of a set of text content. In some implementations, detected speech impediments (e.g., stuttering, stammering, extraneous words ("um," "uh," etc.)) affect the speech proficiency value. The speech impediments may be detected by comparing the distinguished text content with the corresponding linguistic feature, such as comparing "cat" versus "c-c-c-cat." In some implementations, the electronic device determines a fluency value within with the speech data. For example, a relatively high reading speed or relatively constant reading speed results in a relatively high fluency value. In some implementations, the linguistic features indicate an accent, and the accent affects the reading proficiency value. For example, if the detected accent is French, but the displayed text is English, the electronic device determines a lower reading proficiency value than had the accent language matched the displayed text language.

As represented by block 718, in some implementations, the reading proficiency value is based on an engagement value. The engagement value quantitatively characterizes a level of engagement with the first set of text content. For example, the electronic device determines a low reading proficiency value based on a low engagement value and accordingly modifies displayed text content in order to reduce difficulty of the text. In this way, a user may be encouraged to continue utilizing the reading application rather than leaving the reading application due to boredom. As a result, resource utilization of the electronic device is reduced due to fewer shutdowns and restarts of the reading assistant.

According to various implementations, the electronic device determines an engagement value based on a combination of one or more of the speech data, image data (e.g., obtained via a downward or exterior-facing image sensor, such as 143 in FIG. 1), or gaze data (e.g., obtained via eye tracking sensor(s) 164 in FIG. 1). For example, in some implementations, the electronic device determines a reading speed value based on determined linguistic features within the speech data and utilizes the reading speed in order to determine how engaged a user is with displayed text. As another example, if the electronic device does not detect speech data for a threshold amount of time, the electronic device reduces the engagement value. As yet another example, based on the gaze data indicating that the user is not looking at the displayed text, the electronic device reduces the engagement value.

As represented by block 720, in some implementations, the reading proficiency value is based on image data, such as obtained via a downward or exterior-facing image sensor (e.g., the image sensor(s) 143 in FIG. 1). In some implementations, the electronic device utilizes an image recognition application applied to the image data. For example, the electronic device determines that the image data indicates that the user is a child, and determines a lower reading proficiency value as compared with an adult user.

As represented by block 722, in some implementations, the reading proficiency value is based on context data. In some implementations, the context data is based on a user input, such as in response to a prompt. For example, with reference to FIGS. 3C-3F, the electronic device 100 obtains an age input 342 and a native language input 348, and the electronic device 100 sets the reading proficiency value based at least in part on the age input 342 and the native language input 348. One of ordinary skill in the art will also appreciate that a variety of information may be obtained from the user, such as whether the user has a speech impediment. In some implementations, the context data is based on stored information on the electronic device, such as content of text messages, search queries, visited webpages, and/or the like. For example, if text messages are primarily in a particular language, the electronic device infers that the particular language is a user's native language. Whether the native language matches the displayed text language affects the reading proficiency value. In some implementations, the context data is based on device status information, such as currently set system language, GPS information, and/or the like. For example, if GPS information indicates that the device is in Germany for most of the time, the electronic device infers that the user is likely fluent in speaking German. In some implementations, the context data includes application information. For example, the application information indicates which applications are installed on the device.

As represented by block 724, in some implementations, the reading proficiency value is based on sample speech data. In some implementations, the electronic device obtains, via an audio sensor, sample speech data associated with a user in response to displaying a prompt. For example, the prompt invites the user to answer a question or requests the user to read a portion of text. In some implementations, the sample speech data indicates an accent, intonation patterns, speech impediment(s), and/or the like. In some implementations, the sample speech data indicates undeveloped or underdeveloped vocal features, such as those of a child. For example, the sample speech data indicates an undeveloped/underdeveloped vocal tract, including larynx, pharynx, oral cavity, nasal cavity, etc. As another example, speech sample data characterized by a higher pitch sound may indicate a child's voice. As yet another example, lower volume speech indicates a child's voice.

As represented by block 726, the method 700 includes determining whether or not the reading proficiency value satisfies one or more change criteria. The one or more change criteria include a combination of metrics relating to speech proficiency, including but not limited to a combination of one or more of: fluency (e.g., speed, variations in speed, number of stutters, etc.); elocution; number of incorrectly pronounced words or ratio between correctly and incorrectly pronounced words; engagement with displayed text; articulation accuracy metric; and/or the like. In accordance with a determination that the reading proficiency value satisfies the one or more change criteria, the method 700 continues to a portion of the method 700 represented by block 728. On the other hand, in accordance with a determination that the reading proficiency value does not satisfy the one or more change criteria, the method 700 continues to a portion of the method 700 represented by block 730.

As represented by block 728, the method 700 includes changing a difficulty level for a second set of text content in accordance with a determination that the reading proficiency value satisfies the one or more change criteria. After changing the difficulty level for the second set of text content, the second set of text content corresponds to a second difficulty level that is different from the first difficulty level associated with the first set of text content. In some implementations, changing the difficult level includes an animation, such as previous text fading away before the new text is inserted. In some implementations, changing the difficulty level for the second set of text content is based on predetermined text content (e.g., a word bank), such as predetermined words, paragraph, etc. In some implementations, changing the difficulty level for the second set of text content is performed by utilizing a separate application, such as an electronic thesaurus that provides synonymous words. A synonymous word of shorter length or having fewer syllables than a currently displayed word may be inferred to be easier to pronounce, whereas a synonymous word of longer length or having more syllables than a currently displayed word may be inferred to be more difficult to pronounce.

According to various implementations, changing the difficulty level for the second set of text content corresponds to increasing the difficulty level for the second set of text content. After increasing the difficulty level, the second set of text content corresponds to the second difficulty level that is greater than the first difficulty level associated with the first set of text content. For example, in some implementations, increasing the difficulty level corresponds to changing to a different, more advanced story. As one example, in response to determining the reading proficiency value satisfies one or more change criteria in FIG. 2R, the electronic device 100 replaces the text 234 associated with "Humpty Dumpty" 216 with text 236 associated with a more advanced story, "The Lion & the Mouse" 219, as illustrated in FIG. 2S. As another example, in some implementations, increasing the difficult level corresponds to changing to a more advanced version of same story, such as with bigger words, more words, longer sentences, bigger paragraphs, more literary devices, more complex plot, etc. As one example, in response to determining the reading proficiency value satisfies one or more change criteria in FIG. 2X, the electronic device 100 changes portions of text 236 of the same story "The Lion & the Mouse" 219 in order to increase the difficulty of the portions of the text 236. Namely, as illustrated in the transition between FIGS. 2X and 2Y, the electronic device 100 changes text "begged" to text "pleaded" 236, text "generous" to text "compassionate" 236e, and text "let the Mouse go" to text "released the Mouse" 236f.

According to various implementations, changing the difficulty level for the second set of text content corresponds to decreasing the difficulty level for the second set of text content. After decreasing the difficulty level, the second set of text content corresponds to the second difficulty level that is less than the first difficulty level associated with the first set of text content. For example, in some implementations, decreasing the difficulty level corresponds to changing to a different, less advanced story. As one example, in response to determining the reading proficiency value satisfies one or more change criteria in FIG. 2N, the electronic device 100 replaces the text 232 associated with "Puss in Boots" 212 with text 234 associated a less advanced story, "Humpty Dumpty" 216, as illustrated in FIG. 2O. As another example, in some implementations, decreasing the difficult level corresponds to changing to a less advanced version of same story, such as with smaller words, fewer words, shorter sentences, smaller paragraphs, fewer literary devices, less complex plot, etc. As one example, in response to determining the reading proficiency value satisfies one or more change criteria in FIG. 2D, electronic device 100 changes portions of text 230 of the same story "Puss in Boots" 212 in order to decrease the difficulty of the portions of the text 230. Namely, the electronic device 100 changes text "sorrowful" 230b in FIG. 2D to text "sad" 230c in FIG. 2E.

According to various implementations, each of the first difficulty level and the second difficulty level is associated with at least one of a complexity metric or a vocabulary metric. In some implementations, the complexity metric is based on a combination of one or more of: unabridged versus abridged story; amount and type of literary devices (e.g., irony, imagery, allusion, metaphor, foreshadowing, stream of consciousnesses, etc.); nature of literary elements (e.g., plot, subplot, subtext, setting, protagonist/antagonist, dialogue, narration, etc.); grammatical style (e.g., sentence syntax, length of sentence, punctuation, etc.); and/or the like. For example, a first difficulty level of text "sorrowful" 230b in FIG. 2D is higher than a second difficulty level of text "sad" 230c because "sad" has fewer letters and syllables than "sorrowful." As another example, a second difficulty level of text 232h in FIG. 2N is lower than a first difficulty level of a corresponding paragraph of text 232 in FIG. 2L because the text 232h is characterized by shorter sentences, shorter words, and less complex grammatical features.

As represented by block 730, the method 700 includes maintaining the difficulty level for the second set of text content at the first difficulty level associated with the first set of text content in accordance with a determination that the reading proficiency value does not satisfy the one or more change criteria. For example, in response to determining that the reading proficiency value associated with correctly pronounced speech 352 does not satisfy the one or more change criteria in FIG. 3I, the electronic device 100 maintains the difficulty level for the remainder of the text content 310 in FIG. 3J.

As represented by block 732, in some implementations, the method 700 includes determining whether or not a comparison between a first portion of the first set of text content and the one or more linguistic features satisfies one or more reading proficiency criteria. In some implementations, the first portion of the first set of text content has an appearance that is distinguished or emphasized with respect to the remainder of the text content, such as highlighted text "310a" of text content 310 in FIG. 3G. The first portion of the first set of text content may be distinguished in a variety of ways, including but not limited to being highlighted, underlined, italicized, bolded, different text size or different text style, displayed adjacent to an object (e.g., a ball bouncing from word to word), and/or the like. According to a variety of implementations, the one or more reading proficiency criteria include fluency, attempts per word, ratio of correctly to incorrectly pronounced words, speed (e.g., low speed could indicate boredom), stuttering/slurring, gaze (e.g., not looking at the words) indicates boredom and/or text that is too difficult, articulation accuracy metric, total number of mistakes, and/or the like. In some implementations, the comparison is in response to completion of the first set of text content.

In accordance with a determination that the comparison satisfies the one or more reading proficiency criteria, the method 700 continues to a portion of the method 700 represented by block 734. On the other hand, in accordance with a determination that the comparison does not satisfy the one or more reading proficiency criteria, the method 700 continues to a portion of the method 700 represented by block 736.

As represented by block 734, in some implementations, the method 700 includes distinguishing a second appearance of a second portion of the first set of text content from the remainder of the first set of text content in accordance with a determination that the comparison between the first portion of the first set of text content and the one or more linguistic features satisfies the one or more reading proficiency criteria. For example, with reference to FIG. 3I, the electronic device 100 determines that a comparison between linguistic features within speech data 352 and corresponding highlighted text "surrounded" 310b satisfies one or more reading proficiency criteria because the speech data 352 corresponds to a correct pronunciation of highlighted text "surrounded" 310b. In response to making the determination, the electronic device 100 highlights the next word, "by," and removes highlighting of the text "surrounded" 310b in FIG. 3J. In some implementations, distinguishing the second appearance of the second portion of the first set of text content includes an animation.

As represented by block 736, in some implementations, the method 700 includes maintaining a first appearance of the first portion of the first set of text content as distinguished from the remainder of the first set of text content in accordance with a determination that a comparison between a first portion of the first set of text content and the one or more linguistic features does not satisfy one or more reading proficiency criteria. For example, with reference to FIG. 2B, the electronic device 100 determines that a comparison between linguistic features within speech data 242 and corresponding highlighted text "sorrowful" 230b does not satisfy one or more reading proficiency criteria because the speech data 242 corresponds to a incorrect pronunciation of highlighted text "sorrowful" 230b. In response to making the determination, the electronic device 100 maintains highlighting on the text "sorrowful" 230b in FIG. 2C.

Turning to FIG. 7B, in some implementations, as represented by block 738, the method 700 includes displaying, via the display device, a reading assistant interface in response to determining satisfaction of one or more help criteria. In some implementations, as illustrated in interface 266 in FIG. 2U, the interface 266 includes text that provides a proper pronunciation of a particular word and/or usage of the word in a sentence. In some implementations, the reading assistant interface includes text that provides one or more of: a definition of a word, origin of the word, root of the word, etc. In some implementations, the one or more help criteria are satisfied in accordance with a determination that an engagement criterion is satisfied, such as eye gaze data indicating that a user has not been viewing displayed text content for a sufficiently long period of time.

According to various implementations, the one or more help criteria are satisfied in response to obtaining certain help input(s). For example, in some implementations, as illustrated in FIGS. 2T and 2U, the electronic device 100 displays the interface 266 in response to obtaining a help input that satisfies the one or more help criteria, such as touch-input 262 in FIG. 2T. As another example, in some implementations, the help input corresponds to detection of an audio input that satisfies the one or more help criteria, such as "I need help."

As represented by block 740, in some implementations, the one or more help criteria are satisfied in accordance with a determination that a comparison between a first portion of the first set of text content and the one or more linguistic features within the speech data does not satisfy one or more reading proficiency criteria. Examples of the reading proficiency criteria include, but are not limited to: fluency, articulation, accuracy, attempts per word, ratio of correctly to incorrectly pronounced words, speed (low speed could indicate boredom), stuttering/slurring, gaze (e.g., not looking at the words) indicates boredom and/or too difficult, total number of mistakes, and/or the like. For example, with reference to FIGS. 2B-2D, the electronic device 100 determines the one or more help criteria are satisfied in response to determining two successive mispronunciations (242 and 244) of the text "sorrowful" 230b. Containing with this example, although not depicted, in some implementations, in response to determining the one or more help criteria are satisfied, the electronic device 100 displays a reading assistant interface in FIG. 2E corresponding to text "sorrowful" 230b.

As represented by block 742, in some implementations, displaying the reading assistance interface includes displaying reading assistance content that is adjacent to the first portion of the first set of text content. In some implementations, the reading assistant content includes text content, such as in the interface 266 in FIG. 2U. In some implementations, the reading assistant content includes image content, such as the boot image 249 in FIG. 2I that is adjacent to the corresponding text content "boot" 230E.

As represented by block 744, in some implementations, the method 700 includes playing an audio clip that corresponds to an expected pronunciation of a first portion of the first set of text content. As an example, with reference to FIG. 2C, the electronic device 100 plays, via the speaker 111, a speech sample 243 that corresponds to the text "sorrowful" 230b in order to aid a user in pronouncing "sorrowful" 230b. In some implementations, the expected pronunciation is generated via a speech-to-text synthesizer. In some implementations, the expected pronunciation is prerecorded or pregenerated.

As represented by block 746, in some implementations, the method 700 includes displaying computer-generated reality (CGR) content overlaid on a user interface. The CGR content corresponds to at least a first portion of the first set of text content. The CGR content may include a combination of augmented reality (AR), virtual reality (VR), and/or mixed reality (MR). The CGR content may also include companion content, such as a natural habitat of a tiger when the highlighted text is "tiger." In some implementations, the CGR content is adjacent to distinguished (e.g., highlighted) text.

As an example, the CGR content corresponds to AR content corresponding to highlighted text, wherein the AR content interacts with the real-world. For example, with reference to FIG. 2G, the CGR content 247 corresponds to a cat jumping onto a real-word (e.g., physical) table 290. The electronic device 100 obtains pass-through image data corresponding to the real word environment, which includes the table 290, and detects the table 290 within the environment. Accordingly, the electronic device 100 renders and displays a representation of a cat jumping onto the table 290 in order to assist the reader.

In some implementations, displaying the CGR content is in response to determining that a comparison between the first portion of the first set of text content and the one or more linguistic features within the speech data does not satisfy the one or more reading proficiency criteria. In other words, the electronic device displays the CGR content automatically (e.g., without user intervention) based on the user struggling with and/or not being sufficiently engaged with the text content. In some implementations, displaying the CGR content is in response to determining that a comparison between the first portion of the first set of text content and the one or more linguistic features within the speech data satisfies the one or more reading proficiency criteria. For example, in response to determining satisfaction of one or more reading proficiency criteria related to text "surrounded" 310b in FIG. 3I, the electronic device 100 displays CGR content 354 in FIG. 3J in order to encourage the user to keep reading.

As represented by block 748, in some implementations, the method 700 includes displaying, via the display device, a successful reading indication in response to determining that a comparison between a first portion of the first set of text content and the one or more linguistic features satisfies the one or more reading proficiency criteria. In some implementations, the successful reading indication is overlaid on a user interface. For example, in response to determining that the comparison between linguistic features determined within the speech 352 and highlighted corresponding text "surrounded" 310*b* in FIG. 3I, the electronic device 100 displays a successful reading indication 354 in FIG. 3J.

As represented by block 750, in some implementations, the method 700 includes displaying, via the display device, a reading score. Changes to the reading score are based on whether or not a comparison between a first portion of the first set of text content and the one or more linguistic features satisfies one or more reading proficiency criteria. In some implementations, the reading score changes on a word-by-word basis based on whether a particular word is correctly or incorrectly pronounced. In some implementations, the reading score changes based on multiple words (e.g., a sentence) being correctly or incorrectly pronounced. In some implementations, changes to the reading score include an animation, such as displaying flashing lights while increasing in the reading score. As one example, in response to determining that a relatively difficult word "surrounded" 310*b* is correctly pronounced in FIG. 3I, the electronic device 100 increases the value of the score indicator 336 from "4" to "5" in FIG. 3J.

Figure 8:
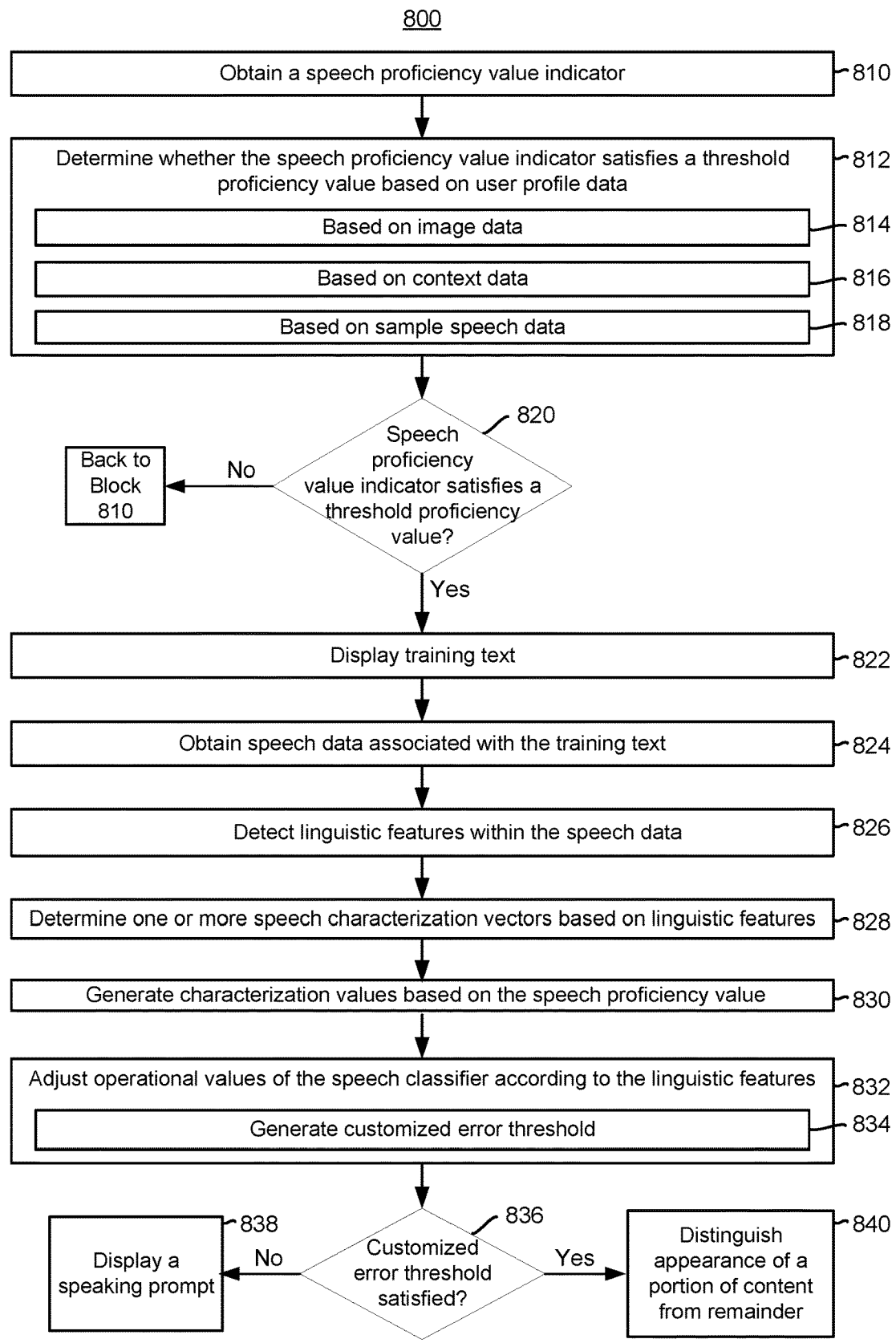
FIG. 8 is a flow diagram of a method of training a speech classifier according to some implementations.

FIG. 8 is a flow diagram of a method 800 of training a speech classifier according to some implementations. In various implementations, the method 800 or portions thereof are performed by the block diagram 500 in FIG. 5. In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, the method 800 includes utilizing a threshold proficiency value to enable changing operational values of a speech classifier in order to train the speech classifier.

As represented by block 810, the method 800 includes obtaining a speech proficiency value indicator indicative of a speech proficiency value associated with a user of an electronic device. For example, with reference to FIG. 5, the training subsystem 510 obtains the speech proficiency value indicator 522. According to various implementations, whether the speech proficiency value satisfies a threshold proficiency value determines whether operational values of a speech classifier (e.g., the speech classifier 412 in FIG. 5) are modified.

As represented by block 812, in some implementations, the method 800 includes determining whether or not the speech proficiency value satisfies the threshold proficiency value based on user profile data. For example, user profile data may indicate whether a user of the electronic device is a child or adult, such as via application data indicating that a number of games geared towards children are installed on the electronic device. As another example, the user profile data may include whether the user is a native speaker of a language of displayed text content, such as via the language of text entered by the user into a messaging application.

In some implementations, as represented by block 814, the user profile data includes image data. For example, in some implementations, a forward-facing camera of an electronic device obtains image data associated with a user, and the electronic device determines whether the image data satisfies the threshold proficiency value. As one example, the electronic device determines an approximate height of the user from the image data and infers an age of the user based on the height. As another example, the electronic device determines dimensions of a user's facial features and infers an age and/or ethnicity (and thus native language) based on the facial features.

In some implementations, as represented by block 816, the user profile data includes context data. For example, in some implementations, an electronic device obtains context data and determines whether the context data satisfies the threshold proficiency value. In some implementations, the context data is obtained in response to a prompt provided by the electronic device, such as with reference to FIGS. 3C-3F. As another example, the context data includes the content of text messages, Internet searches, content of visited Webpages. For example, the context data may indicate frequent visits to child-friendly websites, suggesting the user is a child. As yet another example, the context data includes settings or status information regarding the electronic device, such as the currently set language, GPS information, application information (e.g., which applications are currently installed), and/or the like.

In some implementations, as represented by block 818, the user profile data includes sample speech data. For example, in some implementations, an electronic device obtains sample speech data and determines whether the sample speech data satisfies the threshold proficiency value. The sample speech data may indicate a number of characteristics of a user. For example, the sample speech data may indicate the presence of an accent, speech impediment, frequency (e.g., pitch) of the speech, rhythms or speed of the speech, and/or the like. As another example, the sample speech data may indicate physical characteristics of the user, such as an undeveloped/underdeveloped vocal tract.

As represented by block 820, in some implementations, in response to determining that the speech proficiency value indicator does not satisfy the threshold proficiency value, the method 800 reverts back to the portion of the method 800 represented by block 810. On the other hand, in response to determining that the speech proficiency value satisfies the threshold proficiency value, the method 800 continues to a portion of the method 800 represented by block 822.

As represented by block 822, the method 800 includes displaying training text, via the display device, in response to determining that the speech proficiency value satisfies the threshold proficiency value. In some implementations, the training text corresponds to a portion of text that the electronic device instructs the user to utter. In some implementations, the training text corresponds to a query to which the user is instructed to respond.

As represented by block 824, the method 800 includes obtaining, from an audio sensor, speech data associated with the training text in response to determining that the speech proficiency value satisfies the threshold proficiency value. The speech data is characterized by the speech proficiency value. In some implementations, the speech data corresponds to a calibration sequence. In some implementations, the speech data is characterized by a diminished speech proficiency level as compared with a speech proficiency level of a native language speaker, such as in the case of a non-native speaking adult or a toddler.

As represented by block 826, in some implementations, the method 800 includes detecting linguistic features within the speech data. In some implementations, a training system (e.g., the training system 500 in FIG. 5) includes a speech detector and/or voice recognition subsystem that detects the linguistic features within the speech data. For example, in some implementations, the speech classifier 412 in FIG. 5 includes the speech detector and/or the voice recognition subsystem (not illustrated).

As represented by block 828, the method 800 includes determining, using a speech classifier, one or more speech characterization vectors for the speech data based on linguistic features within the speech data. For example, with reference to FIG. 6, the speech characterization vector 610-3 is associated with the expression "toe the line" 620-3 and includes a fluency value 630a-3 indicating that the expression is uttered very slowly but smoothly and an articulation value 630c-3 indicating that the expression is uttered moderately clearly (e.g., clarity level of 5 (out of 10)). In some implementations, the one or more speech characterization vectors provide speech-style values characterizing the speech data. For example, with reference to FIG. 6, the speech characterization vector 610-1 includes a fluency value 630-1, an intonation value 630b-1, an articulation value 630c-1, and other (not illustrated) sub-values such as volume level, tonal level, pitch level, nasality level, frequency level, accent level, dialect level, cadence level, and/or the like.

As represented by block 830, in some implementations, the method 800 includes generating one or more speech characterization values based on the speech proficiency value. For example, with reference to FIG. 5, the speech characterization analyzer 516 generates the one or more speech characterization values based on the speech proficiency value indicated by the speech proficiency value indicator 522. In some implementations, the speech characterization analyzer 516 generates one or more speech characterization values that correspond to sub-values within the one or more speech characterization vectors.

As represented by block 832, the method 800 includes adjusting one or more operational values of the speech classifier based on the one or more speech characterization vectors and the speech proficiency value. In some implementations, the method 800 includes comparing the one or more speech characterization vectors and the one or more speech characterization values in order to adjust the one or more operational values of the speech classifier. In some implementations, with reference to FIG. 5, the speech characterization analyzer 516 directs the operational modifier 530 to adjust the one or more operational values of the speech classifier 412 in response to determining that that the speech proficiency value satisfies a threshold proficiency value 518.

As represented by block 834, in some implementations, a customized error threshold for the user is generated by adjusting the one or more operational values of the speech classifier. The customized error threshold enables the reading assistant to be tailored to a particular user. For example, if the linguistic features indicate that the user is a child native speaker, an electronic device sets the customized error threshold to be higher than had the user been an adult native speaker.

As represented by block 836, in some implementations, the method 800 includes determining whether or not a difference between the linguistic features and expected linguistic features (e.g., correct pronunciations) satisfies the customized error threshold. In some implementations, the expected linguistic features are generated via a speech-to-text synthesizer. In some implementations, the expected linguistic features are pregenerated or prerecorded. In accordance with a determination that the difference between the linguistic features and the expected linguistic features does not satisfy the customized error threshold, the method 800 continues to a portion of the method 800 represented by block 838. On the other hand, in accordance with a determination that the difference between the linguistic features and the expected linguistic features satisfies the customized error threshold, the method 800 continues to a portion of the method 800 represented by block 840.

As represented by block 838, in some implementations, the method 800 includes displaying, via the display device, a speaking prompt in order to obtain additional speech data from the audio sensor. For example, after generating a customized error threshold associated with an adult native English speaker, the electronic device 100 determines that a difference between the speech data 242 in FIG. 2B and expected (e.g., proper) pronunciation of the word "sorrowful" 230b does not satisfy the customized error threshold. In response, although not illustrated, the electronic device 100 displays a speaking prompt asking the user to again try pronouncing the word "sorrowful" 230b.

As represented by block 840, in some implementations, the method 800 includes distinguishing, via the display device, an appearance of a portion of text content from the remainder of the text content. In some implementations, the portion of the text content corresponds to word(s) directly following a currently distinguished appearance of another portion of the text content. For example, in some implementations, distinguishing the appearance of the portion includes matching the appearance of the portion to the remainder of the text content. As one example, in FIG. 3I the electronic device 100 determines that a difference between linguistic features within speech data 352 corresponding to a first portion of text "surrounded" 310b in FIG. 3I and corresponding expected linguistic features satisfies a customized error threshold. In response, the electronic device 100 highlights a second portion of text "by" and matches the appearance of the first portion of text "surrounded" 310b with the remainder of text 310 in FIG. 3J by removing the highlighting of the text "surrounded" 310b.

Figure 9:
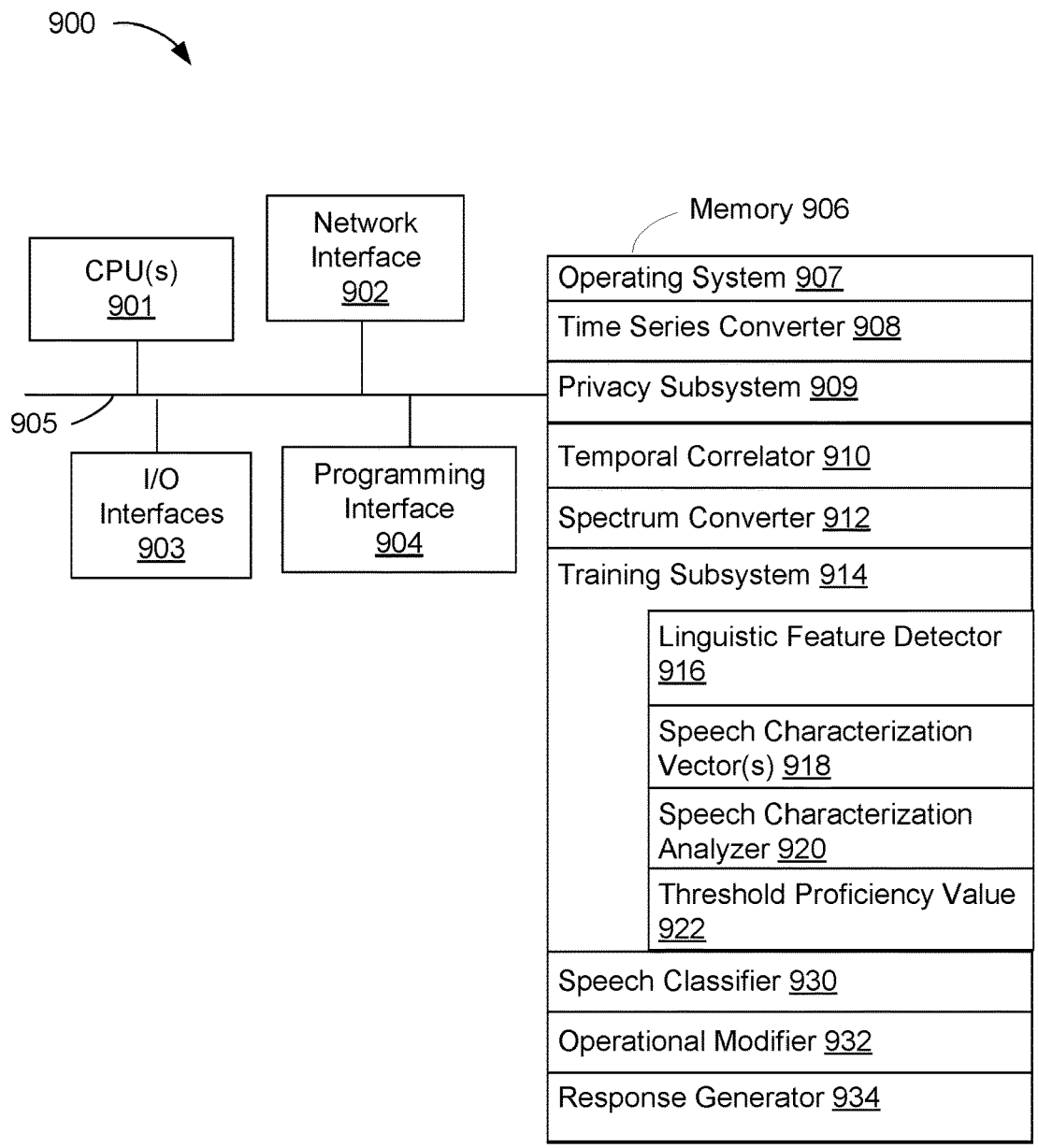
FIG. 9 is a block diagram of an example of an electronic device according to some implementations.

FIG. 9 is a block diagram 900 of an example of an electronic device according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the electronic device includes one or more processing units (CPUs) 901, a network interface 902, one or more input/output (I/O) devices 903, a programming interface 904, a memory 906, and one or more communication buses 905 for interconnecting these and various other components. In some implementations, the communication buses 905 include circuitry that interconnects and controls communications between system components.

The memory 906 includes high-speed random-access memory, such as DRAM, SRAM, DDR RAM or other random-access solid-state memory devices, and may include non-volatile memory, such as one or more magnetic disk storage devices, optical disk storage devices, flash memory devices, or other non-volatile solid state storage devices. The memory 906 optionally includes one or more storage devices remotely located from the one or more processing units 901. The memory 906 comprises a non-transitory computer readable storage medium.

In some implementations, the memory 906 or the non-transitory computer readable storage medium of the memory 906 stores the following programs, modules and data structures, or a subset thereof including an optional operating system 907, a times series converter 908 (e.g., the times series converter 404 in FIG. 4), a privacy subsystem 909 (e.g., the privacy subsystem 405 in FIG. 4), a temporal correlator 910 (e.g., temporal correlator 406 in FIG. 4), a spectrum converter 912 (e.g., the spectrum converter 408 in FIG. 4), a training subsystem 914, a speech classifier 930 (e.g., the speech classifier 412 in FIG. 4 and FIG. 5), an operational modifier 932 (e.g., the operational modifier 530 in FIG. 5), and a response generator 934 (e.g., the response generator 416 in FIG. 4).

In some implementations, the training subsystem 914 includes a linguistic feature detector 916, one or more speech characterization vectors 918, a speech characterization analyzer 920, and a threshold proficiency value 922. In some implementations, the linguistic feature detector 916 is configured to detect linguistic features within speech data according to the or more speech characterization vectors 918.

In some implementations, the speech classifier 930 is configured to determine (e.g., detect) linguistic features within obtained speech data. In some implementations, the speech classifier 930 is configured to determine a reading proficiency value. In some implementations, the speech classifier 930 is configured to generate one or more speech characterization vectors and provide the one or more speech characterization vectors to the training subsystem 914.

In some implementations, the speech characterization analyzer 920 generates speech characterization values based on a speech proficiency value as indicated by the speech proficiency value indicator and/or the one or more speech characterization vectors. According to various implementations, the speech characterization analyzer 920 directs the operational modifier 932 to adjust one or more operational values of the speech classifier 930. The operational modifier 932 is configured to adjust the one or more operational values of the speech classifier 930 based on the one or more speech characterization vectors and the speech proficiency value.

In some implementations, the response generator 934 is configured to modify difficulty level of text content based on whether or not a reading proficiency value satisfies one or more change criteria. In some implementations, the response generator 934 is configured to modify an appearance of displayed text content in order to change which portion of the text content is distinguished from the remainder of the text content. In some implementations, the response generator 934 is configured to display a reading assistant interface, play an audio clip, and/or display CGR content in order to assist a user with pronunciations of word(s). In some implementations, the response generator 934 is configured to display a reading prompt.

Moreover, FIG. 9 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device including one or more processors, a non-transitory memory, a display device, and an audio sensor:
  displaying, via the display device, a first set of text content that is characterized by a first difficulty level;

obtaining speech data associated with the first set of text content from the audio sensor;

determining one or more linguistic features within the speech data;

in response to completion of the speech data associated with the first set of text content, determining a reading proficiency value associated with the first set of text content, wherein the reading proficiency value is based on the one or more linguistic features;

in accordance with a determination that the reading proficiency value satisfies one or more change criteria, changing a difficulty level for a second set of text content, wherein, after changing the difficulty level for the second set of text content, the second set of text content corresponds to a second difficulty level that is different from the first difficulty level associated with the first set of text content; and in accordance with a determination that the reading proficiency value does not satisfy the one or more change criteria, maintaining the difficulty level for the second set of text content at the first difficulty level associated with the first set of text content.

2. The method of claim 1, wherein changing the difficulty level for the second set of text content corresponds to increasing the difficulty level for the second set of text content, wherein, after increasing the difficulty level, the second set of text content corresponds to the second difficulty level that is greater than the first difficulty level associated with the first set of text content.

3. The method of claim 1, wherein changing the difficulty level for the second set of text content corresponds to decreasing the difficulty level for the second set of text content, wherein, after decreasing the difficulty level, the second set of text content corresponds to the second difficulty level that is less than the first difficulty level associated with the first set of text content.

4. The method of claim 1, wherein each of the first difficulty level and the second difficulty level is associated with at least one of a complexity metric or a vocabulary metric.

5. The method of claim 1, further comprising:
in accordance with a determination that a comparison between a first portion of the first set of text content and the one or more linguistic features does not satisfy one or more reading proficiency criteria, maintaining a first appearance of the first portion of the first set of text content as distinguished from the remainder of the first set of text content; and
in accordance with the determination that the comparison between the first portion of the first set of text content and the one or more linguistic features satisfies the one or more reading proficiency criteria, distinguishing a second appearance of a second portion of the first set of text content from the remainder of the first set of text content.

6. The method of claim 1, further comprising:
in response to determining that a comparison between a first portion of the first set of text content and the one or more linguistic features satisfies one or more reading proficiency criteria, displaying, via the display device, a successful reading indication.

7. The method of claim 1, further comprising:
displaying, via the display device, a reading score, wherein changes to the reading score are based on whether or not a comparison between a first portion of the first set of text content and the one or more linguistic features satisfies one or more reading proficiency criteria.

8. The method of claim 1, further comprising:
determining an engagement value based on a combination of one or more of the speech data, image data, or gaze data, wherein the engagement value quantitatively characterizes a level of engagement with the first set of text content;
wherein determining the reading proficiency value is based on the engagement value.

9. The method of claim 1, further comprising:
obtaining, from an image sensor, image data associated with a user;
wherein determining the reading proficiency value is based on the image data.

10. The method of claim 1, further comprising:
obtaining context data associated with a user;
wherein determining the reading proficiency value is based on the context data.

11. The method of claim 1, further comprising:
in response to displaying a prompt, obtaining, via the audio sensor, sample speech data associated with a user;
wherein determining the reading proficiency value is based on the sample speech data.

12. The method of claim 1, further comprising:
displaying, via the display device, a reading assistant interface in response to determining satisfaction of one or more help criteria.

13. The method of claim 12, wherein the one or more help criteria are satisfied in accordance with a determination that a comparison between a first portion of the first set of text content and the one or more linguistic features within the speech data does not satisfy one or more reading proficiency criteria.

14. The method of claim 13, wherein displaying the reading assistant interface includes displaying, via the display device, reading assistance content that is adjacent to the first portion of the first set of text content.

15. The method of claim 1, further comprising:
playing an audio clip that corresponds to an expected pronunciation of a first portion of the first set of text content.

16. The method of claim 1, further comprising:
displaying, via the display device, computer-generated reality (CGR) content overlaid on a user interface, wherein the CGR content corresponds to at least a first portion of the first set of text content.

17. The method of claim 16, wherein displaying the CGR content is in response to determining that a comparison between the first portion of the first set of text content and the one or more linguistic features within the speech data does not satisfy the one or more reading proficiency criteria.

18. The method of claim 16, wherein displaying the CGR content is in response to determining that a comparison between the first portion of the first set of text content and the one or more linguistic features within the speech data satisfies the one or more reading proficiency criteria.

19. An electronic device comprising:
one or more processors;
a non-transitory memory;
a display device;
an audio sensor; and
one or more programs, wherein the one or more programs are stored in the non-transitory memory and configured to be executed by the one or more processors, the one or more programs including instructions for:

displaying, via the display device, a first set of text content that is characterized by a first difficulty level;

obtaining speech data associated with the first set of text content from the audio sensor;

determining one or more linguistic features within the speech data;

in response to completion of the speech data associated with the first set of text content, determining a reading proficiency value associated with the first set of text content, wherein the reading proficiency value is based on the one or more linguistic features;

in accordance with a determination that the reading proficiency value satisfies one or more change criteria, changing a difficulty level for a second set of text content, wherein, after changing the difficulty level for the second set of text content, the second set of text content corresponds to a second difficulty level that is different from the first difficulty level associated with the first set of text content; and in accordance with a determination that the reading proficiency value does not satisfy the one or more change criteria, maintaining the difficulty level for the second set of text content at the first difficulty level associated with the first set of text content.

20. A non-transitory computer readable storage medium storing one or more programs, the one or more programs comprising instructions, which, when executed by an electronic device with one or more processors, a display device, and an audio sensor, cause the electronic device to:

display, via the display device, a first set of text content that is characterized by a first difficulty level;

obtain speech data associated with the first set of text content from the audio sensor;

determine one or more linguistic features within the speech data;

in response to completion of the speech data associated with the first set of text content, determine a reading proficiency value associated with the first set of text content, wherein the reading proficiency value is based on the one or more linguistic features;

in accordance with a determination that the reading proficiency value satisfies one or more change criteria, change a difficulty level for a second set of text content, wherein, after changing the difficulty level for the second set of text content, the second set of text content corresponds to a second difficulty level that is different from the first difficulty level associated with the first set of text content; and in accordance with a determination that the reading proficiency value does not satisfy the one or more change criteria, maintain the difficulty level for the second set of text content at the first difficulty level associated with the first set of text content.

\* \* \* \* \*